(12) United States Patent
Yamanaka et al.

(10) Patent No.: US 7,738,738 B2
(45) Date of Patent: Jun. 15, 2010

(54) MEAN PRESERVING INTERPOLATION CALCULATION CIRCUIT, PIXEL INTERPOLATION CIRCUIT, MEAN PRESERVING INTERPOLATION METHOD, AND PIXEL INTERPOLATION METHOD

(75) Inventors: Satoshi Yamanaka, Tokyo (JP); Yoshiaki Okuno, Tokyo (JP); Jun Someya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1072 days.

(21) Appl. No.: 10/578,686

(22) PCT Filed: Jun. 18, 2004

(86) PCT No.: PCT/JP2004/008608

§ 371 (c)(1),
(2), (4) Date: May 9, 2006

(87) PCT Pub. No.: WO2005/045758

PCT Pub. Date: May 19, 2005

(65) Prior Publication Data

US 2007/0092156 A1    Apr. 26, 2007

(30) Foreign Application Priority Data

Nov. 10, 2003  (JP) ............................. 2003-379414

(51) Int. Cl.
*G06K 9/32* (2006.01)
(52) U.S. Cl. .................................................. 382/300
(58) Field of Classification Search ................. 382/300
See application file for complete search history.

(56) References Cited

U.S. PATENT DOCUMENTS

| | | | | | |
|---|---|---|---|---|---|
| 5,481,311 | A | * | 1/1996 | Boie | 348/448 |
| 5,832,143 | A | * | 11/1998 | Suga et al. | 382/300 |
| 6,091,862 | A | * | 7/2000 | Okisu | 382/300 |

(Continued)

FOREIGN PATENT DOCUMENTS

JP    2000-196835 A    7/2000

(Continued)

OTHER PUBLICATIONS

Hong et al., Hefei University of Technology, Institute of Computer and Information, Hefei 230009, pp. 82-84, 2002.

*Primary Examiner*—Samir A Ahmed
*Assistant Examiner*—Jayesh Patel
(74) *Attorney, Agent, or Firm*—Birch, Stewart, Kolasch & Birch, LLP

(57) ABSTRACT

Missing-pixel interpolation data are obtained such that the mean value of a plurality of pixels constituting a group of pixels including a missing pixel is equal to the mean value of a plurality of pixels constituting a group of pixels not including the missing pixel. For example, missing-pixel interpolation data are obtained by (1) obtaining a sum (SL) of the values of pixels other than the missing pixel (L) in the k pixels constituting the group (LC) of pixels including the missing pixel, (2) obtaining a sum (SA) of the values of k pixels constituting a group (NA) of pixels not including the missing pixel, and (3) taking the difference between these sums. This makes it possible to reduce interpolation error when a highly periodic image with missing pixels is interpolated.

20 Claims, 44 Drawing Sheets

U.S. PATENT DOCUMENTS

| | | | |
|---|---|---|---|
| 6,570,616 B1 * | 5/2003 | Chen | 348/272 |
| 6,744,916 B1 * | 6/2004 | Takahashi | 382/162 |
| 6,768,512 B1 * | 7/2004 | Hsieh | 348/246 |
| 6,810,156 B1 * | 10/2004 | Itoh | 382/300 |
| 6,912,004 B1 * | 6/2005 | Knudsen et al. | 348/273 |
| 7,102,673 B2 * | 9/2006 | Kimura | 348/246 |
| 7,136,541 B2 * | 11/2006 | Zhang et al. | 382/300 |
| 7,206,021 B2 * | 4/2007 | Sasaki et al. | 348/277 |
| 2002/0167602 A1 * | 11/2002 | Nguyen | 348/280 |
| 2003/0016854 A1 | 1/2003 | Inoue et al. | |
| 2004/0208384 A1 * | 10/2004 | Lin et al. | 382/254 |

FOREIGN PATENT DOCUMENTS

| | | |
|---|---|---|
| JP | 2002-247352 A | 8/2002 |
| JP | 2003-037777 A | 2/2003 |
| JP | 2003-101724 A | 4/2003 |

* cited by examiner

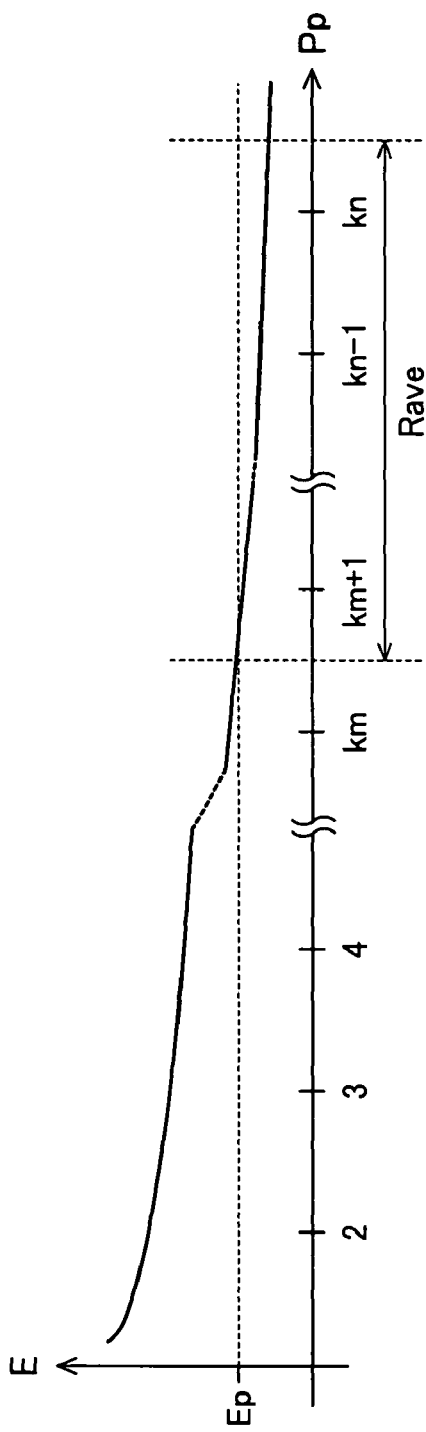
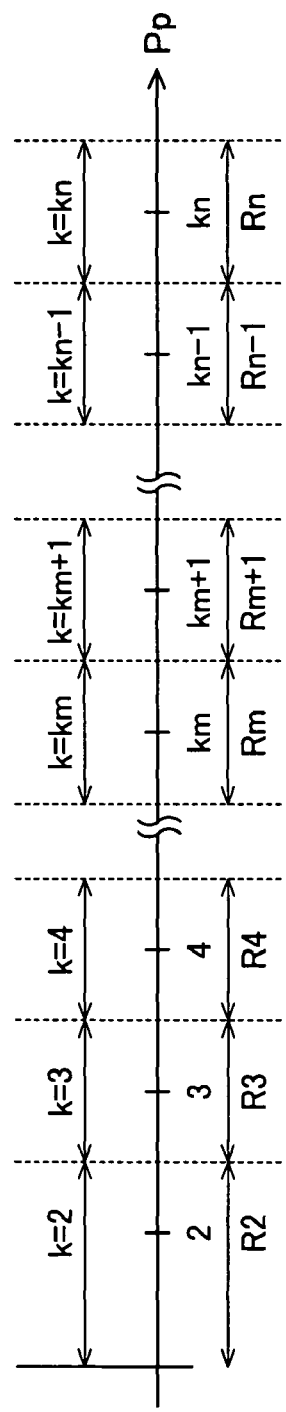
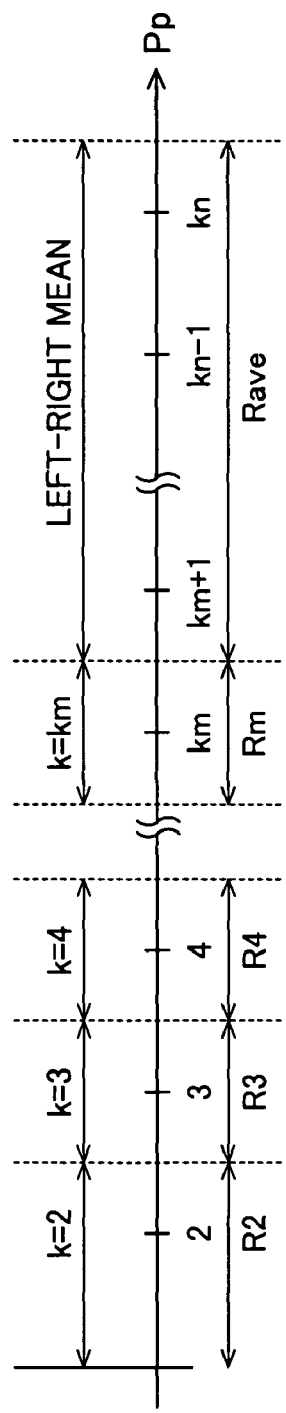
FIG.24(a)
FIG.24(b)
FIG.24(c)

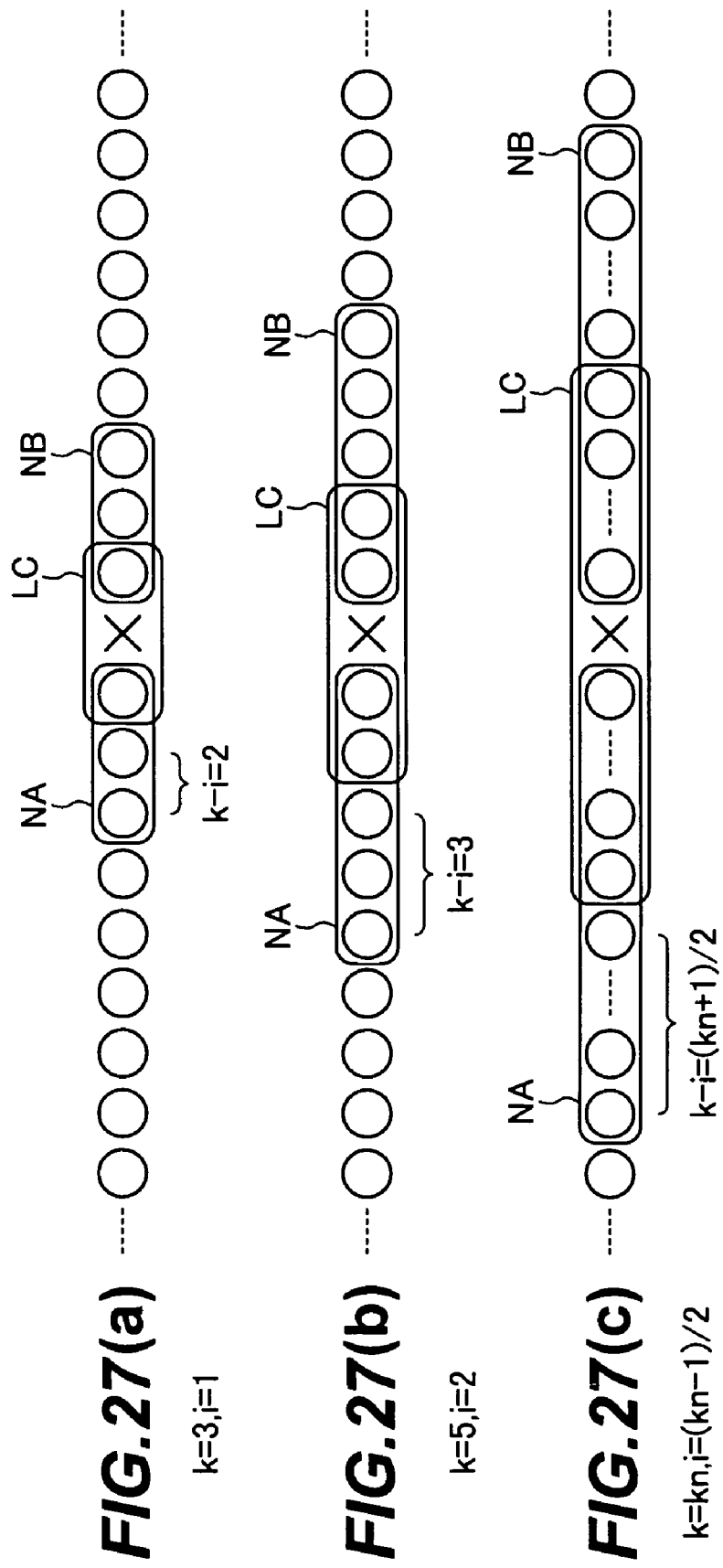

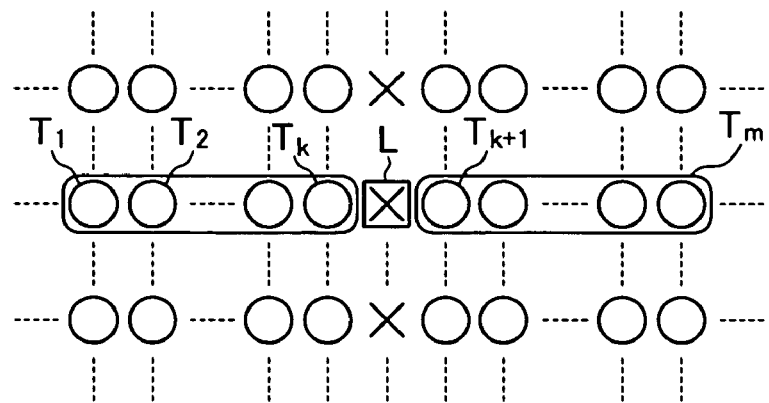
FIG.30(a)
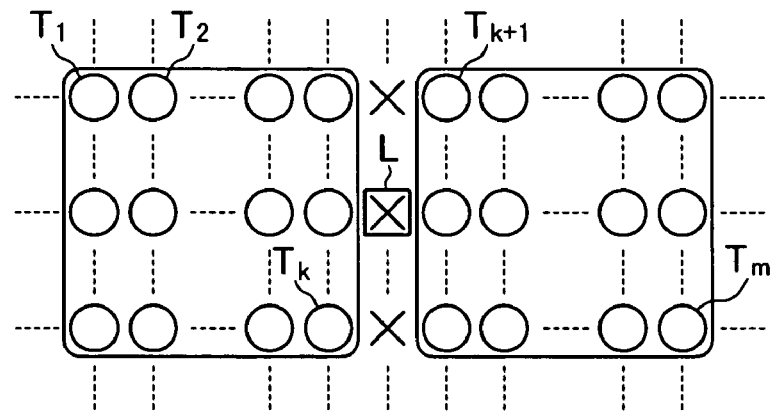
FIG.30(b)
FIG.31
|  | $T_1$ | $T_2$ | -------- | $T_m$ |
|---|---|---|---|---|
| LEFT-RIGHT MEAN INTERPOLATION CALCULATION CIRCUIT | M0[$T_1$] | M0[$T_2$] | -------- | M0[$T_m$] |
| 1ST MEAN PRESERVING INTERPOLATION CALCULATION CIRCUIT | M1[$T_1$] | M1[$T_2$] | -------- | M1[$T_m$] |
| ⋮ | ⋮ | ⋮ | ⋮ | ⋮ |
| nTH MEAN PRESERVING INTERPOLATION CALCULATION CIRCUIT | Mn[$T_1$] | Mn[$T_2$] | -------- | Mn[$T_m$] |

FIG.39

|    | T1 | T2 | T3 | T4 |
|----|----|----|----|----|
| M0 | 0  | 56 | 26 | 30 |
| M1 | 0  | 0  | 0  | 0  |
| M2 | 69 | 69 | 26 | 69 |

FIG.40

| S0 | 112 |
|----|-----|
| S1 | 0   |
| S2 | 233 |

FIG.42

|     | T1  | T2  | T3  | T4 |
| --- | --- | --- | --- | --- |
| M0  | 13  | 4.5 | 71  | 8  |
| M1  | 143 | 35  | 143 | 35 |
| M2  | 0   | 0   | 0   | 0  |

FIG.43

| S0 | 96.5 |
| --- | --- |
| S1 | 356 |
| S2 | 0 |

|    | T1  | T2  | T3  | T4  |
|----|-----|-----|-----|-----|
| M0 | 3.5 | 8.5 | 1.5 | 0   |
| M1 | 91  | 152 | 91  | 152 |
| M2 | 191 | 269 | 86  | 191 |

| S0 | 13.5 |
|----|------|
| S1 | 486  |
| S2 | 737  | ized
MEAN PRESERVING INTERPOLATION CALCULATION CIRCUIT, PIXEL INTERPOLATION CIRCUIT, MEAN PRESERVING INTERPOLATION METHOD, AND PIXEL INTERPOLATION METHOD

FIELD OF THE INVENTION

The present invention relates to an interpolation calculation circuit, a pixel interpolation circuit, an interpolation calculation method, and a pixel interpolation method for interpolating missing pixels in a digital image.

BACKGROUND ART

Methods employed in conventional pixel interpolation circuits to calculate interpolation data for missing pixels include a method in which the mean of the values of the pixels adjacent to a missing pixel is used as the interpolation data, a method in which a regression line is found for the pixels adjacent to a missing pixel by use of the least squares method and the interpolation data are calculated from the regression line, and a method in which a quartic curve is found from the four pixels adjacent to a missing pixel and the interpolation data are calculated from its quartic equation (see, for example, Patent Document 1).

Patent Document 1: Japanese Patent Application Publication No. 2003-101724 (paragraphs 0040 to 0066, FIGS. 3 to 5)

DISCLOSURE OF THE INVENTION

Problems to be Solved by the Invention

When the conventional interpolation calculation circuits carry out linear interpolation or interpolation using higher-degree functions, increased error occurs in the interpolation of missing pixels in a highly periodic image.

This invention addresses the above problem, with the object of obtaining an interpolation calculation circuit and method and a pixel interpolation circuit and method that can properly interpolate missing pixels in highly periodic images.

Means of Solution of the Problems

This invention provides a mean preserving interpolation calculation circuit that finds interpolation data for a missing pixel such that the mean value of a plurality of pixels constituting a group of pixels including the missing pixel is equal to the mean value of a plurality of pixels constituting a group of pixels not including the missing pixel.

Effect of the Invention

The interpolation calculation circuit of the present invention, which finds interpolation data for missing pixels such that the mean value of a pixel sequence including a missing pixel is equal to the mean value of a pixel sequence not including the missing pixel, enables proper interpolation of data, such as periodic data, in which the mean value of a pixel sequence including a missing pixel is equal to the mean value of a pixel sequence not including the missing pixel.

BRIEF DESCRIPTION OF THE DRAWINGS

FIGS. 24(a) to 24(c) illustrate relationships between pixel period and interpolation error in the interpolation calculation circuits of the pixel interpolation circuit in the fifth embodiment.

FIGS. 27(a) to 27(c) show pixel sequences processed in the pixel interpolation circuit in the fifth embodiment.

FIGS. 30(a) and 30(b) shows pixel sequences and pixel groups processed in the sixth embodiment.

FIG. 31 is a table showing evaluation results for the interpolation calculation circuits when a plurality of test pixels are interpolated by the pixel interpolation circuit in the sixth embodiment.

FIG. 39 is a table showing evaluation results for the interpolation calculation circuits when a plurality of test pixels are interpolated in the pixel interpolation circuit in the sixth embodiment.

FIG. 40 is a table showing summarized evaluation results for the interpolation calculation circuits in the pixel interpolation circuit in the sixth embodiment.

FIG. 42 is a table showing evaluation results for the interpolation calculation circuits when a plurality of test pixels are interpolated in the pixel interpolation circuit in the sixth embodiment.

FIG. 43 is a table showing summarized evaluation results for the interpolation calculation circuits in the pixel interpolation circuit in the sixth embodiment.

Figure 1:
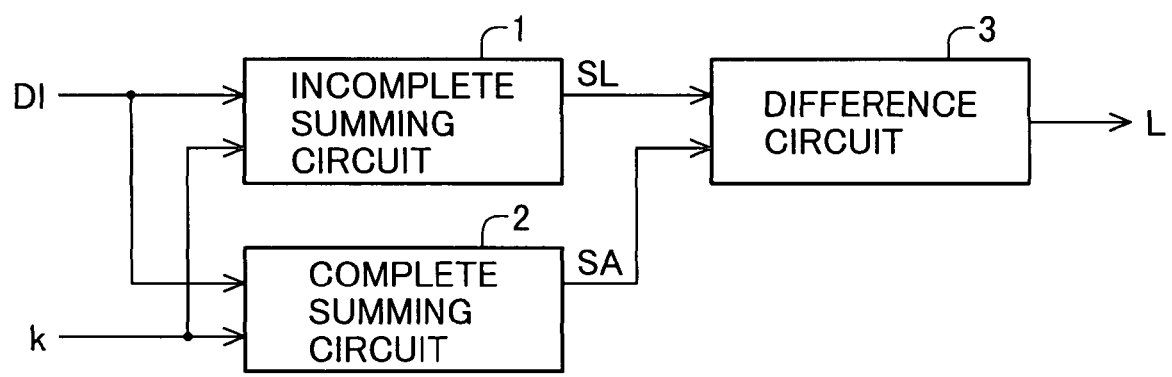
FIG. 1 is a block diagram showing the structure of an interpolation calculation circuit according to a first embodiment of the invention.

EXPLANATION OF REFERENCE CHARACTERS 1 incomplete summing circuit, 1(1) first incomplete summing circuit, 1(2) second incomplete summing circuit, 2 complete summing circuit, 2(1) first complete summing circuit, 2(2) second complete summing circuit, 3 difference circuit, 4 averaging circuit, 5 output circuit, 6(0) left-right mean interpolation calculation circuit, 6(1) first mean preserving interpolation calculation circuit, 6(2) second mean preserving interpolation calculation circuit, 6($n-1$) ($n-1$)th mean preserving interpolation calculation circuit, 6($n$) nth mean preserving interpolation calculation circuit, 6($m-1$) ($m-1$)th mean preserving interpolation calculation circuit, 7 management circuit, 8 marking circuit, 9 selection signal generator, 10 output range generating circuit, 11 limiting circuit, 12 mean preserving interpolation calculation circuit, 13 output limiter, 15 period detection circuit, 17 complete total calculation circuit, 18 averaging circuit, 19 incomplete total calculation circuit, 20 control circuit, 21 image data memory.

BEST MODE OF PRACTICING THE INVENTION

Embodiments of the invention will now be described with reference to the attached drawings.

In the following embodiments, a series of pixels with a missing pixel at a known position is processed. Examples include a series of pixels obtained when image information is captured by an imaging device with a linear array of chips, as shown in the above Patent Document 1; in this case, when the pitch between adjacent pixels separated by a boundary between adjacent chips is wider than (for example, double) the pitch between pixels in the same chip, missing pixel interpolation is carried out.

When the missing pixel position is not known in advance, a circuit for detecting missing pixel positions may be added.

Some of the embodiments of the present invention are effective for periodic series of pixels.

Some of these embodiments produce the best effect by assuming a known period and setting parameters corresponding to the period.

When the periodicity is unknown, a circuit for detecting the period may be added.

First Embodiment

FIG. 1 shows the structure of an interpolation calculation circuit according to the present invention.

The inventive interpolation calculation circuit has an incomplete summing circuit 1, a complete summing circuit 2, and a difference circuit 3. As described in detail later, in a series of pixels, the incomplete summing circuit 1 obtains the sum (SL) of the values of pixels other than a missing pixel in a group of k pixels including the missing pixel. The complete summing circuit 2 obtains the sum of the values of k pixels in a group not including the missing pixel. The difference circuit 3 obtains missing-pixel interpolation data (L) by subtracting the output (SL) of the incomplete summing circuit 1 from the output (SA) of the complete summing circuit 2.

Figure 2:
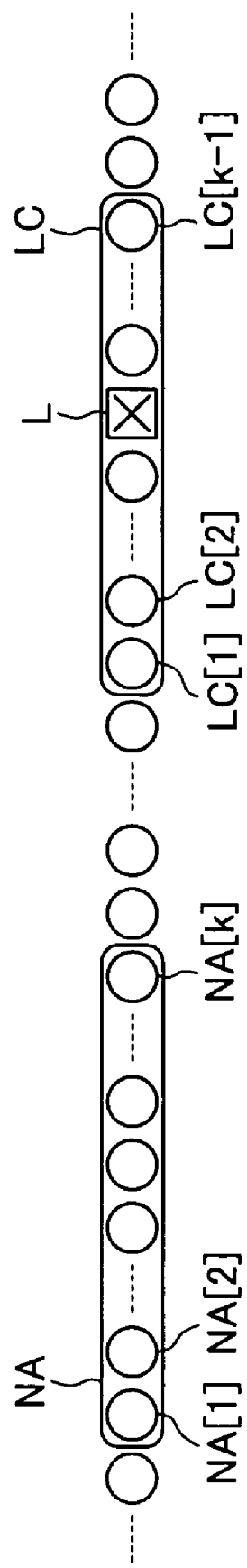
FIG. 2 shows a pixel sequence processed by the interpolation calculation circuit in the first embodiment.

FIG. 2 shows a portion of an input image DI and the positional relationship between two pixel sequences the mean values of which are calculated by the inventive interpolation calculation circuit. In the following description, it is assumed that the missing pixel position is known in advance. A circle indicates an existing (non-missing) pixel; a cross (X) indicates a missing pixel. The symbols LC and NA each indicate a one-dimensional sequence of k consecutive pixels included in the series of pixels. Pixel sequences LC and NA are non-overlapping. Pixel sequence LC includes a missing pixel; pixel sequence NA does not include a missing pixel.

The operation of the inventive interpolation calculation circuit will now be described with reference to FIGS. 1 and 2.

In the interpolation calculation circuit according to this embodiment the missing pixel is interpolated so that the mean value of the pixel sequence LC with the missing pixel L is equal to the mean value of the pixel sequence NA without the missing pixel L. The input image DI is input to the incomplete summing circuit 1 and the complete summing circuit 2. The parameter k is the number of pixels averaged by the inventive interpolation calculation circuit, indicating the number of pixels in pixel sequences LC and NA. First, from the k pixels (LC[1], LC[2], ..., LC[k−1], L) included in pixel sequence LC, the incomplete summing circuit 1 outputs the sum of the values of pixels other than the missing pixel L as partial sum data SL. The partial sum SL can be expressed as follows:

$$SL = LC[1] + LC[2] + \ldots + LC[k-1]$$

The partial sum data SL are input to the difference circuit 3.

The complete summing circuit 2 outputs the sum of the values of the k pixels (NA[1] to NA[k]) in pixel sequence NA as partial sum data SA. The partial sum SA can be represented as follows:

$$SA = NA[1] + NA[2] + \ldots + NA[k]$$

The partial sum data SA are input to the difference circuit 3.

The difference circuit 3 generates an equation by using the partial sum data SL and SA so that the mean values of pixel sequences LC and NA are equal, and thereby obtains the interpolation data for the missing pixel L. The equation is:

$$(SL+L)/k = SA/k$$

The value of the missing pixel L is:

$$L = SA - SL$$

The interpolation calculation circuit according to this embodiment can correctly interpolate a missing pixel in image data having the property that the mean values of the pixel sequence LC including the missing pixel L and the pixel sequence NA not including the missing pixel L are equal.

The interpolation calculation circuit according to this embodiment calculates missing-pixel interpolation data so that the mean pixel value of a pixel sequence including the missing pixel is equal to the mean pixel value of a pixel sequence not including the missing pixel; the interpolation calculation circuit according to this embodiment will accordingly be referred to below in this specification as a mean preserving interpolation calculation circuit. In the following description, for simplicity, the mean value of the pixels in a pixel sequence will also be referred to as the mean value of the pixel sequence. Similarly, a sum or total of pixel values will also be referred to as a sum or total of pixels.

Figure 3:
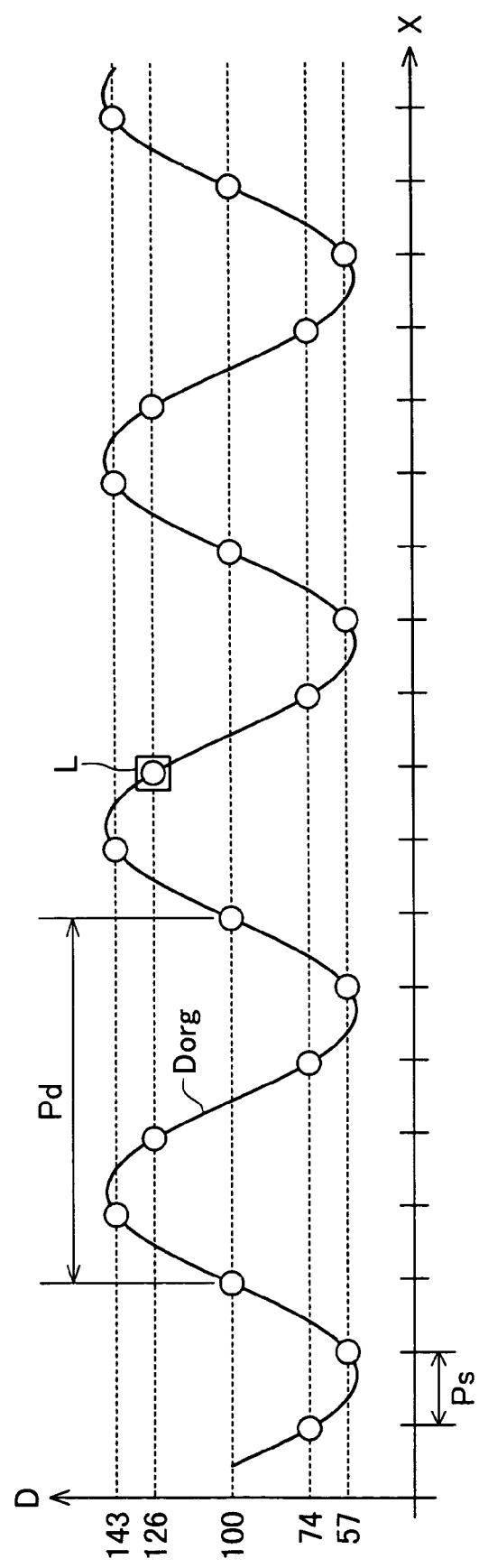
FIG. 3 is a waveform diagram showing exemplary pixel data processed by the interpolation calculation circuit in the first embodiment.

Next, an example of missing pixel interpolation for periodic image data will be described. FIG. 3 represents exemplary periodic image data. The horizontal axis indicates pixel position; the vertical axis indicates pixel intensity.

The periodic image data will now be described.

The image data in FIG. 3 are obtained by discretizing data Dorg that repeat the same variations with a constant period Pd, using a sampling period Ps. In FIG. 3, since Pd is five times Ps (Pd=5 Ps), the pixel period Pp of the image data is five (Pp=Pd/Ps=5). The pixel period Pp indicates the number of samples per period. That is, the pixel period is the pixel count of the image variation period. In FIG. 3, it is assumed that the data repeat the values 100, 143, 126, 74, and 57 in each data period Pd.

First, an example of missing pixel interpolation for image data with a pixel period of five (Pp=5) by the mean preserving interpolation calculation circuit (FIG. 1) with k set to five (k=5) will be shown.

Figure 4:
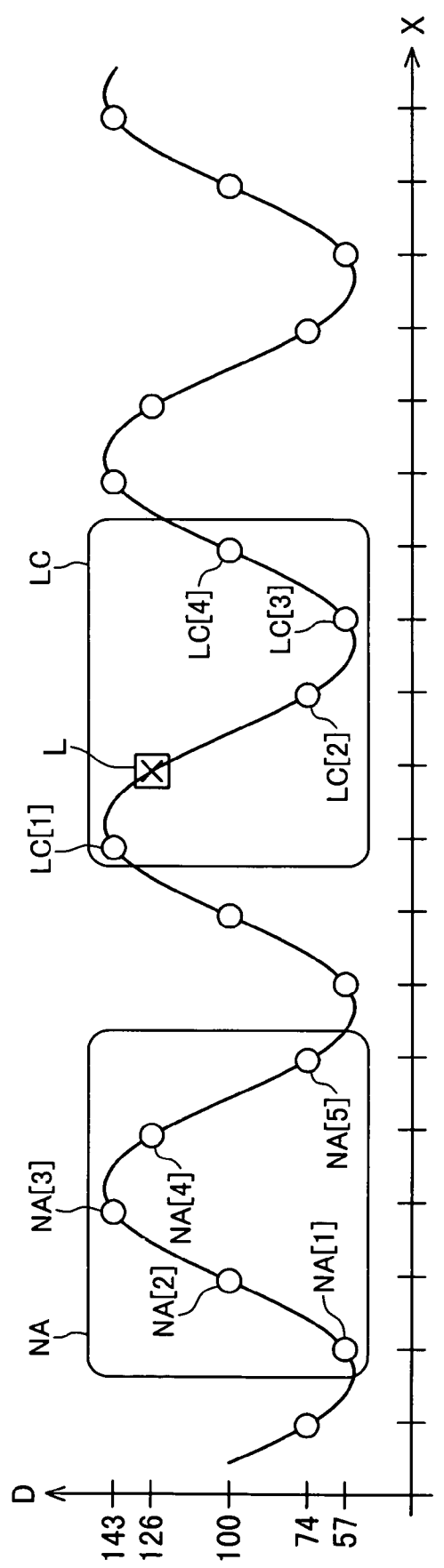
FIG. 4 is another waveform diagram showing the exemplary pixel data processed in the interpolation calculation circuit in the first embodiment.

FIG. 4 shows image data similar to the image data in FIG. 3 but with pixel L missing, and indicates the corresponding positional relationship (FIG. 2) between the pixel sequences LC and NA for which mean values are calculated in the mean preserving interpolation calculation circuit (with k=5).

Since the mean preserving interpolation calculation circuit has the same structure as in FIG. 1 with k set to five, a description will be omitted.

The operation of the mean preserving interpolation calculation circuit (with k=5) will be described with reference to FIGS. 1 and 4.

From the five pixels (LC[1] to LC[4] and L) included in pixel sequence LC, the incomplete summing circuit 1 outputs the sum of the values of pixels other than the missing pixel L as partial sum data SL. Since LC[1]=143, LC[2]=74, LC[3]=57, and LC[4]=100, the partial sum SL is:

$$SL = LC[1] + LC[2] + LC[3] + LC[4]$$
$$= 143 + 74 + 57 + 100$$
$$= 374$$

The complete summing circuit 2 outputs the sum of the values of the five pixels (NA[1] to NA[5]) included in pixel sequence NA as partial sum data SA. Since NA[1]=57, NA[2]=100, NA[3]=143, and NA[4]=126, and NA[5]=74, the partial sum SA is:

$$NA = NA[1] + NA[2] + NA[3] + NA[4] + NA[5]$$
$$= 57 + 100 + 143 + 126 + 74$$
$$= 500$$

The difference circuit 3 generates an equation from the partial sum data SL and SA that makes the mean values of pixel sequences LC and NA equal, and solves it to calculate the interpolation data of the missing pixel L. The equation is:

(SL+L)/5=SA/5

Therefore, the value of the missing pixel L is:

$$L = SA - SL$$
$$= 500 - 374$$
$$= 126$$

As shown in FIG. 3, the original data value of the missing pixel L is 126, so the interpolation data obtained in the mean preserving interpolation calculation circuit with k set to five (k=5) are free of error with respect to the original data. With k set to five, the mean preserving interpolation calculation circuit can correctly carry out missing pixel interpolation for image data with a five-pixel period.

Next, an example of missing pixel interpolation in the mean preserving interpolation calculation circuit with k set to three (k=3) for image data with a pixel period of five (Pp=5) will be shown.

Figure 5:
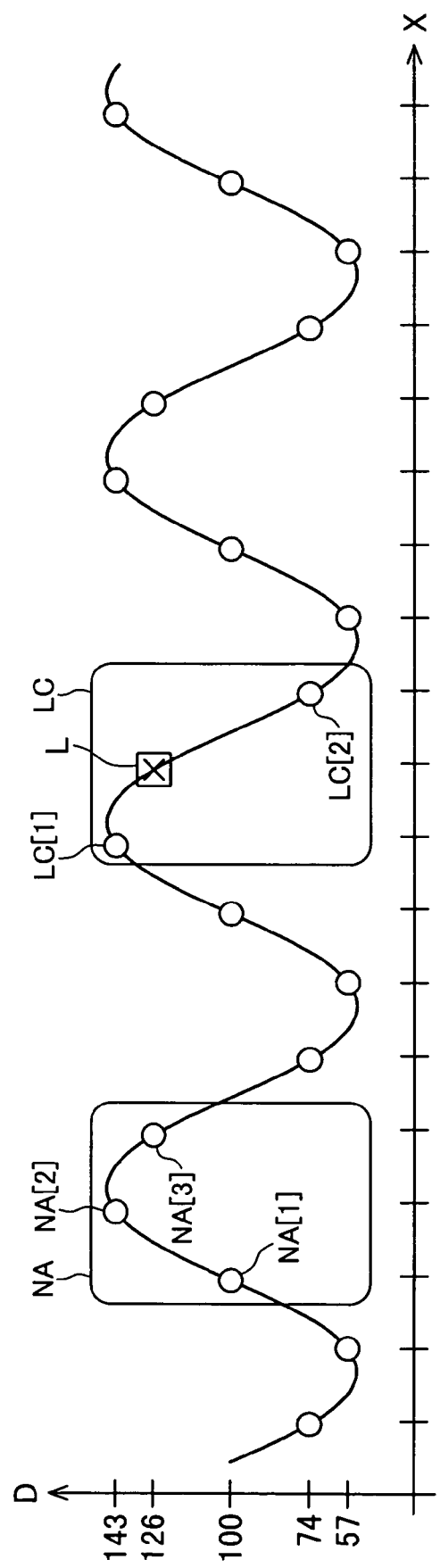
FIG. 5 is another waveform diagram showing the exemplary pixel data processed in the interpolation calculation circuit in the first embodiment.

FIG. 5 shows image data similar to the image data in FIG. 3 but with pixel L missing, and indicates the corresponding positional relationship (FIG. 2) between the pixel sequences LC and NA for which mean values are calculated in the mean preserving interpolation calculation circuit (with k=3).

Since the mean preserving interpolation calculation circuit has the same structure as in FIG. 1 with k set to three, a description will be omitted.

The operation of the mean preserving interpolation calculation circuit (with k=3) will be described with reference to FIGS. 1 and 5.

From the three pixels (LC[1], LC[2], and L) included in pixel sequence LC, the incomplete summing circuit 1 outputs the sum of the values of pixels other than the missing pixel L as partial sum data SL. Since LC[1]=143 and LC[2]=74, the partial sum SL is:

$$SL = LC[1] + LC[2]$$
$$= 143 + 74$$
$$= 217$$

The complete summing circuit 2 outputs the sum of the values of the three pixels (NA[1] to NA[3]) included in pixel sequence NA as partial sum data SA. Since NA[1]=100, NA[2]=143, and NA[3]=126, the partial sum SA is:

$$SA = NA[1] + NA[2] + NA[3]$$
$$= 100 + 143 + 126$$
$$= 369$$

The difference circuit 3 generates an equation from the partial sum data SL and SA that makes the mean values of pixel sequences LC and NA equal, and solves it to calculate the interpolation data of the missing pixel L. The equation is:

(SL+L)/3=SA/3

Therefore, the value of the missing pixel L is:

$$L = SA - SL$$
$$= 369 - 217$$
$$= 152$$

As shown in FIG. 3, the original data value of the missing pixel L is 126, so the interpolation data obtained in the mean preserving interpolation calculation circuit with k set to three (k=3) are in error by |152−126|=26 with respect to the original data.

The image data in FIG. 5 take data values of 100, 143, 126, 74, and 57 periodically with a pixel period of five (Pp=5), so the mean value of any five consecutive pixels in the image data is always:

(100+143+126+74+57)/5=100

Similarly, the mean value over any integer multiple N*Pp of the pixel period Pp is always:

N*(100+143+126+74+57)/(N*5)=100

(where N is a positive integer).

In the example of the mean preserving interpolation calculation circuit with the parameter k set to five (k=5) in FIG. 4, since the value of k equals the value of the pixel period Pp, both the mean value of the pixel sequence LC including the missing pixel and the mean value of the pixel sequence NA not including the missing pixel are 100, and accordingly the missing-pixel interpolation data can be correctly obtained from the equation used in the difference circuit 3.

In the example of the mean preserving interpolation calculation circuit with the parameter k set to three (k=3) in FIG. 5, since k is not an integer multiple of the pixel period Pp, the missing-pixel interpolation data include error.

Figure 6:
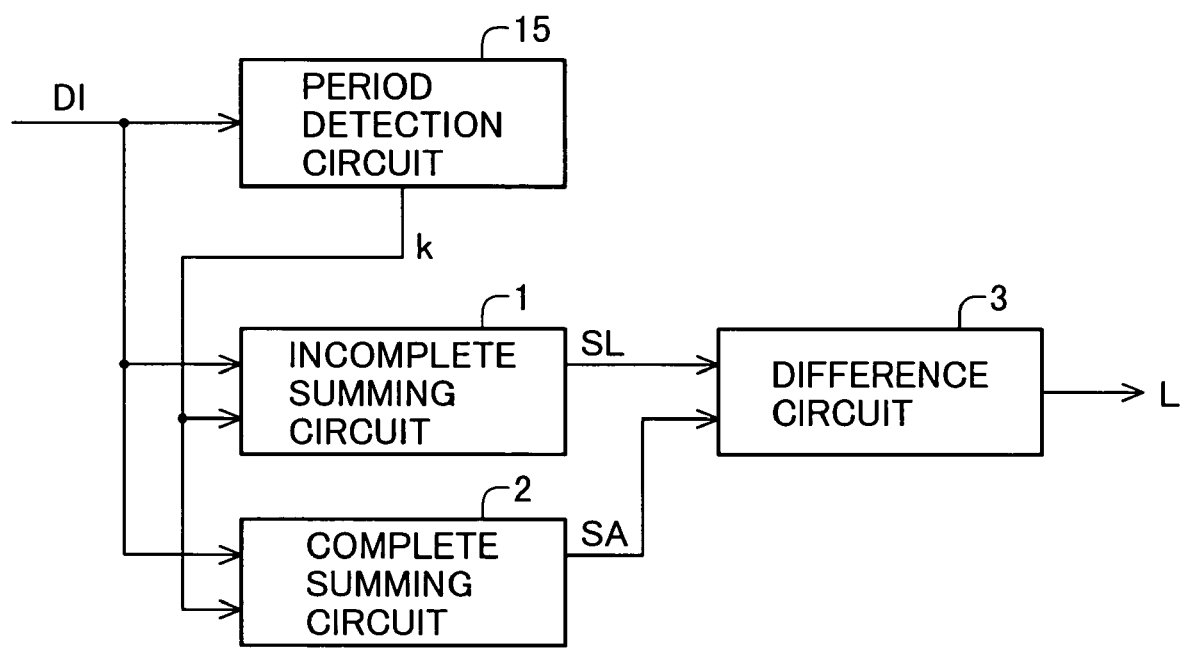
FIG. 6 is a block diagram showing an exemplary structure of a pixel interpolation circuit having a period detection circuit.

In the mean preserving interpolation calculation circuit, as described above, the error in the interpolation data decreases as the value of parameter k becomes closer to an integer multiple of the value of the pixel period Pp, so a period detection circuit 15 may be added as shown in FIG. 6 to detect the pixel period Pp on reception of the image data DI and determine the value of the parameter k from the detected pixel period Pp.

In the above description, the position of the missing pixel is assumed to be known in advance; when the position of the missing pixel is not known in advance, a circuit may be added to detect the position of the missing pixel. A known error correcting circuit, for example, may be used for this purpose.

As described above, missing pixel interpolation can be carried out properly when the value of the parameter k in the mean preserving interpolation calculation circuit equals the value of the pixel period Pp. Similarly, when the value of k is an integer multiple of the pixel period Pp (k=N*Pp), the mean values of a pixel sequence including a missing pixel and a pixel sequence not including the missing pixel become equal, and correct missing-pixel interpolation data can be obtained from the equation used in the difference circuit 3.

If the interpolation calculation circuit is configured as in the embodiment above so that both the pixel sequence LC including the missing pixel L and the pixel sequence NA not including the missing pixel L consist of k pixels, if the incomplete summing circuit 1 obtains the sum of the values of the pixels other than the missing pixel in the pixel sequence LC including the missing pixel L, and if the complete summing circuit 2 obtains the sum of the values of the pixels constituting the pixel sequence NA not including the missing pixel L, then if missing-pixel interpolation data are obtained by taking the difference between these sums, the mean values of the two pixel sequences become equal. That is, it is possible to determine pixel interpolation data that yield identical mean values for each pixel sequence without having to calculate the mean values.

Second Embodiment

Figure 7:
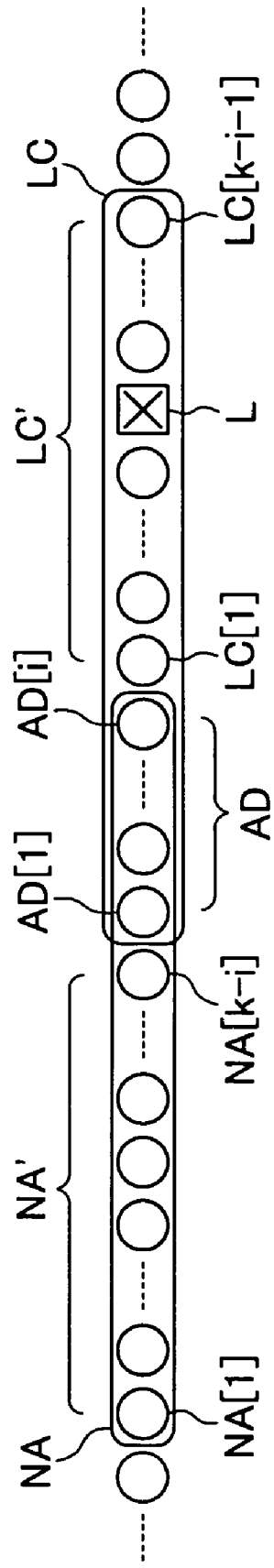
FIG. 7 shows a pixel sequence processed by an interpolation calculation circuit according to a second embodiment.

FIG. 7, like FIG. 2, shows a portion of an input image DI and the positional relationship between two pixel sequences the mean values of which are calculated by the inventive interpolation calculation circuit. The symbols LC and NA each indicate a one-dimensional sequence of k consecutive pixels included in the series of pixels. Pixel sequences LC and NA overlap by i pixels. Pixel sequence LC includes a missing pixel; pixel sequence NA does not include a missing pixel. The symbol NA' indicates a region or portion of pixel sequence NA not overlapping pixel sequence LC; the symbol LC' indicates a portion of pixel sequence LC not overlapping pixel sequence NA; and the symbol AD indicates the overlapping portion of pixel sequences NA and LC.

As shown, the pixel sequences are configured so that the missing pixel L is not included in the overlapping portion AD.

Although the pixel sequence including the missing pixel overlaps the pixel sequence not including the missing pixel, the structure and operation of the mean preserving interpolation calculation circuit are the same as the structure and operation in FIGS. 1 and 2, so a description will be omitted.

The mean preserving interpolation calculation circuit wherein the pixel sequence including a missing pixel and the pixel sequence not including the missing pixel overlap can correctly interpolate the missing pixel in the same way as the mean preserving interpolation calculation circuit described in the first embodiment, wherein the pixel sequence including the missing pixel and the pixel sequence not including the missing pixel are non-overlapping, when the value of k is an integer multiple of the pixel period Pp (k=N*Pp), by making the mean value of the pixel sequence LC including the missing pixel equal to the mean value of the pixel sequence NA not including the missing pixel.

In addition, as described in detail below, the missing pixel can be interpolated correctly when the value obtained by subtracting the number of overlapping pixels (i) from parameter k is an integer multiple of the pixel period Pp ((k−i)=N*Pp)), by making the mean value of the pixel sequence LC including the missing pixel equal to the mean value of the pixel sequence NA not including the missing pixel.

As shown in FIG. 7, the partial sum SL of pixel sequence LC can be expressed using the partial sum SL' of pixel sequence LC' and the partial sum SAD of pixel sequence AD as follows:

$SL=SL'+SAD$

The partial sum SA of pixel sequence NA can be expressed using the partial sum SA' of pixel sequence NA' and the partial sum SAD of pixel sequence AD as follows:

$SA=SA'+SAD$

An equation that makes the mean values of pixel sequences LC and NA equal is:

$(SL+L)/k=SA/k$

Substitution of the above expressions for the partial sums SL and SA gives:

$(SL'+SAD+L)/k=(SA'+SAD)/k$

Since the pixel sequence including the missing pixel and the pixel sequence not including the missing pixel overlap, the partial sums SAD of pixel sequence NA cancel out, and the equation becomes:

$(SL'+L)/k=SA'/k$

If both sides are multiplied by k/(k−i), the equation becomes $(SL'+L)/(k-i)=SA'/(k-i),$ showing that the mean value of the (k−i) pixels in the non-overlapping portion NA' of pixel sequence NA and the mean value of the (k−i) pixels in the non-overlapping portion LC' of pixel sequence LC are equal.

Thus when the pixel sequence including the missing pixel and the pixel sequence not including the missing pixel overlap, the mean preserving interpolation calculation circuit can correctly interpolate the missing pixel in image data having the property that the mean values of the pixel sequences NA' and LC' are equal.

First, an example of missing pixel interpolation for image data with a pixel period of five (Pp=5) by a mean preserving interpolation calculation circuit with k set to nine (k=9) and with the pixel sequence including the missing pixel and the pixel sequence not including the missing pixel overlapping by four pixels will be shown.

Figure 8:
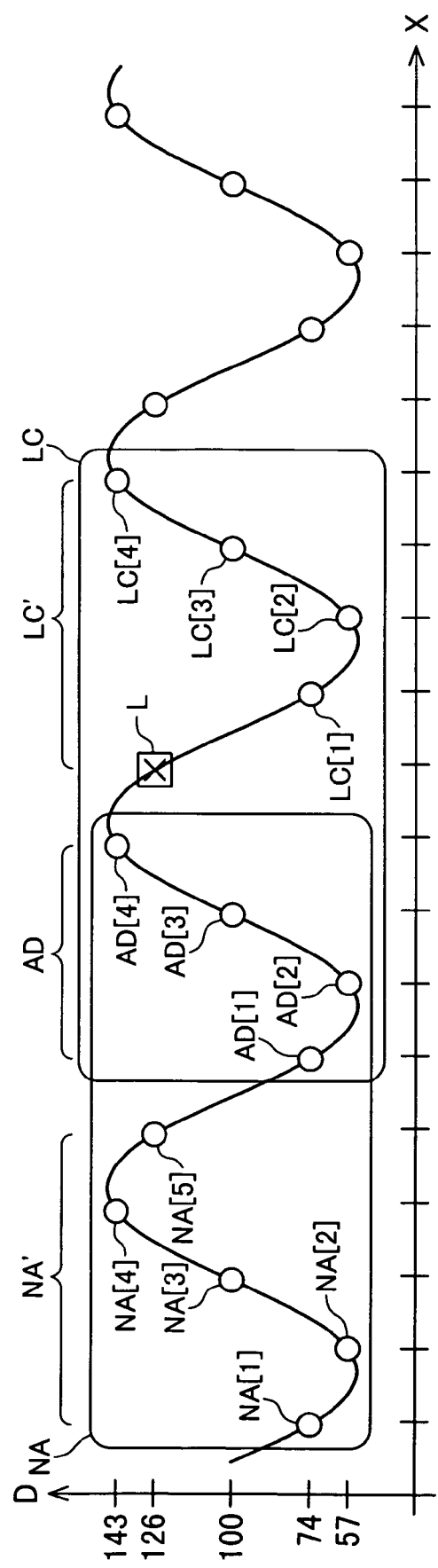
FIG. 8 is a waveform diagram showing exemplary pixel data processed in the interpolation calculation circuit in the second embodiment.

FIG. 8 shows image data similar to the image data in FIG. 3 but with pixel L missing, and indicates the corresponding positional relationship between the pixel sequences LC and NA (FIG. 7) for which mean values are calculated in the mean preserving interpolation calculation circuit (with k=9) when the pixel sequence including the missing pixel and the pixel sequence not including the missing pixel overlap by four pixels.

Since the mean preserving interpolation calculation circuit has the same structure as in FIG. 1 with k set to nine, a description will be omitted.

The operation of the mean preserving interpolation calculation circuit (with k=9) when the pixel sequence including a missing pixel and the pixel sequence not including the missing pixel overlap by four pixels will be described with reference to FIGS. 1 and 8.

From the nine pixels (AD[1] to AD[4], L, and LC[1] to LC[4]) included in pixel sequence LC, the incomplete summing circuit 1 outputs the sum of the values of pixels other than the missing pixel L as partial sum data SL. Since AD[1]=74, AD[2]=57, AD[3]=100, AD[4]=143, LC[1]=74, LC[2]=57, LC[3]=100, and LC[4]=143, the partial sum SL is:

$$SL = AD[1] + AD[2] + AD[3] + AD[4] +$$
$$LC[1] + LC[2] + LC[3] + LC[4]$$
$$= 74 + 57 + 100 + 143 + 74 + 57 + 100 + 143$$
$$= 748$$

The complete summing circuit 2 outputs the sum of the nine pixels (NA[1] to NA[5] and AD[1] to AD[4]) included in pixel sequence NA as partial sum data SA. From NA[1]=74, NA[2]=57, NA[3]=100, NA[4]=143, NA[5]=126, AD[1]=74, AD[2]=57, AD[3]=100, and AD[4]=143, it follows that:

$$SA = NA[1] + NA[2] + NA[3] + NA[4] + NA[5] +$$
$$AD[1] + AD[2] + AD[3] + AD[4]$$
$$= 74 + 57 + 100 + 143 + 126 + 74 + 57 + 100 + 143$$
$$= 874$$

The difference circuit 3 generates an equation from the partial sum data SL and SA that makes the mean values of pixel sequences LC and NA equal, and solves it to calculate the interpolation data of the missing pixel L. The equation is:

$$(SL+L)/9 = SA/9$$

Therefore, the value of the missing pixel L is:

$$L = SA - SL$$
$$= 874 - 748$$
$$= 126$$

As shown in FIG. 3, the original data value of the missing pixel L is 126, so the interpolation data obtained in the mean preserving interpolation calculation circuit with k set to nine (k=9) and with the-pixel sequence including the missing pixel and the pixel sequence not including the missing pixel overlapping by four pixels are free of error with respect to the original data. With k set to nine, if the pixel sequence including a missing pixel and the pixel sequence not including the missing pixel overlap by four pixels, the mean preserving interpolation calculation circuit can correctly carry out missing pixel interpolation for image data with a five-pixel period.

Next, an example of missing pixel interpolation for image data with a pixel period of five (Pp=5) by the mean preserving interpolation calculation circuit with k set to nine (k=9) and with the pixel sequence including a missing pixel and the pixel sequence not including the missing pixel overlapping by five pixels will be shown.

Figure 9:
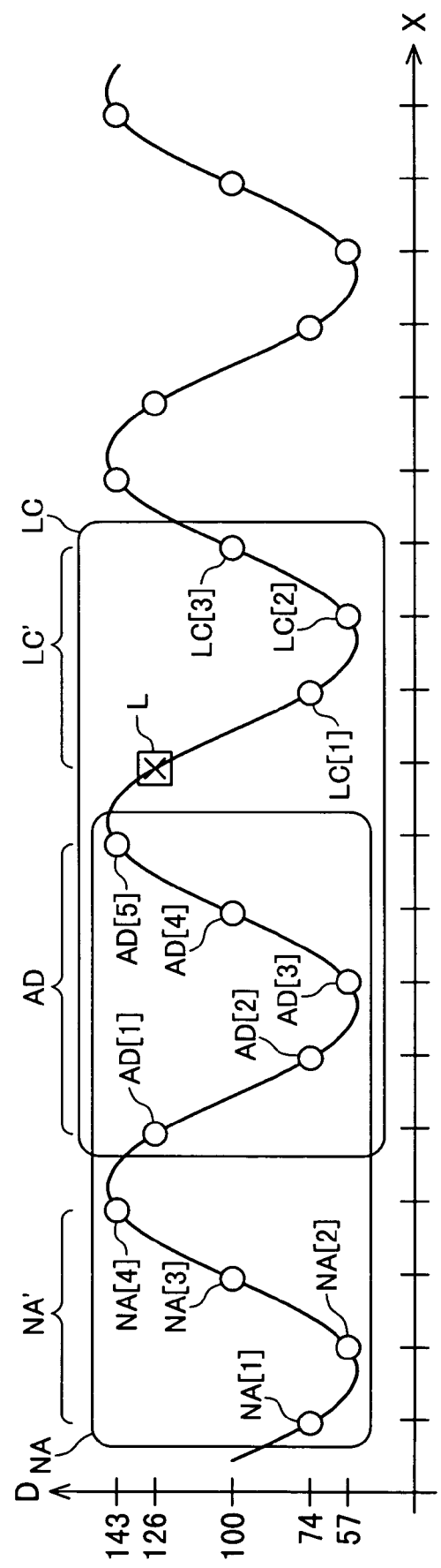
FIG. 9 is another waveform diagram showing the exemplary pixel data processed in the interpolation calculation circuit in the second embodiment.

FIG. 9 shows image data similar to the image data in FIG. 3 but with pixel L missing, and indicates the corresponding positional relationship between the pixel sequences LC and NA (FIG. 7) for which mean values are calculated in the mean preserving interpolation calculation circuit (with k=9) when the pixel sequence including a missing pixel and the pixel sequence not including the missing pixel overlap by five pixels.

Since the mean preserving interpolation calculation circuit has the same structure as in FIG. 1 with k set to nine, a description will be omitted.

The operation of the mean preserving interpolation calculation circuit (with k=9) will be described with reference to FIGS. 1 and 9.

From the nine pixels (AD[1] to AD[5], L, and LC[1] to LC[3]) included in pixel sequence LC, the incomplete summing circuit 1 outputs the sum of the values of pixels other than the missing pixel L as partial sum data SL. Since AD[1]=126, AD[2]=74, AD[3]=57, AD[4]=100, AD[5]=143, LC[1]=74, LC[2]=57, and LC[3]=100, the partial sum SL is:

$$SL = AD[1] + AD[2] + AD[3] + AD[4] + AD[5] +$$
$$LC[1] + LC[2] + LC[3]$$
$$= 126 + 74 + 57 + 100 + 143 + 74 + 57 + 100$$
$$= 731$$

The complete summing circuit 2 outputs the sum of the values of the nine pixels (NA[1] to NA[4] and AD[1] to AD[5]) included in pixel sequence NA as partial sum data SA. Since NA[1]=74, NA[2]=57, NA[3]=100, NA[4]=143, AD[1]=126, AD[2]=74, AD[3]=57, AD[4]=100, and AD[5]=143, the partial sum SA is:

$$SA = NA[1] + NA[2] + NA[3] + NA[4] + AD[1] + AD[2] + AD[3] +$$
$$AD[4] + AD[5]$$
$$= 74 + 57 + 100 + 143 + 126 + 74 + 57 + 100 + 143$$
$$= 874$$

The difference circuit 3 generates an equation from the partial sum data SL and SA that makes the mean values of pixel sequences LC and NA equal, and solves it to calculate the interpolation data of the missing pixel L. The equation is:

$$(SL+L)/9 = SA/9$$

Therefore, the value of the missing pixel L is:

$$L = SA - SL$$
$$= 874 - 731$$
$$= 143$$

As shown in FIG. 3, the original data value of the missing pixel L is 126, so when the pixel sequence including the missing pixel and the pixel sequence not including the missing pixel overlap by five pixels, the interpolation data obtained in the mean preserving interpolation calculation circuit with k set to nine (k=9) are in error by |143−126|=17 with respect to the original data.

When the pixel sequence including a missing pixel and the pixel sequence not including the missing pixel overlap, the mean preserving interpolation calculation circuit can correctly interpolate the missing pixel in the same way as described in the first embodiment, in which the pixel sequence including the missing pixel and the pixel sequence not including the missing pixel are non-overlapping, if the value of k is an integer multiple of the pixel period Pp (k=N*Pp).

Moreover, in the example of the mean preserving interpolation calculation circuit with k set to nine (k=9) and the pixel sequence including the missing pixel overlapping the pixel sequence not including the missing pixel by four pixels as shown in FIG. 8, since the number of pixels in the non-overlapping portions of the pixel sequences LC and NA equals the value of the pixel period Pp, the mean values of the non-overlapping portions LC' and NA' of pixel sequences LC and NA are both 100, and accordingly the missing-pixel interpolation data can be obtained correctly by the difference circuit 3.

In the example of the mean preserving interpolation calculation circuit with k set to nine (k=9) and the pixel sequence including the missing pixel overlapping the pixel sequence not including the missing pixel by five pixels as shown in FIG. 9, since the number of pixels in the non-overlapping portions of the pixel sequences LC and NA is not an integer multiple of the pixel period Pp, the missing-pixel interpolation data include error.

As described above, missing pixel interpolation can be carried out properly when the number of pixels in the non-overlapping portions of the pixel sequence including the missing pixel and the pixel sequence not including the missing pixel equals the value of the pixel period Pp. Similarly, when the number of pixels in the non-overlapping portions of the pixel sequence including the missing pixel and the pixel sequence not including the missing pixel is an integer multiple of the pixel period Pp (k−i=N*Pp), after correct interpolation, the mean values of the non-overlapping portions of the pixel sequence including the missing pixel and the pixel sequence not including the missing pixel become equal, so missing pixel interpolation can be carried out correctly.

In the mean preserving interpolation calculation circuit, as described above, the error in the interpolation data decreases as the number of pixels in the non-overlapping portions (k−i) becomes closer to an integer multiple of the value of the pixel period Pp, so a period detection circuit 15 may be added in the same way as shown in FIG. 6, for example, to detect the pixel period Pp on reception of the image data DI and determine the values of the parameters k and i from the detected pixel period Pp.

Third Embodiment

Figure 10:
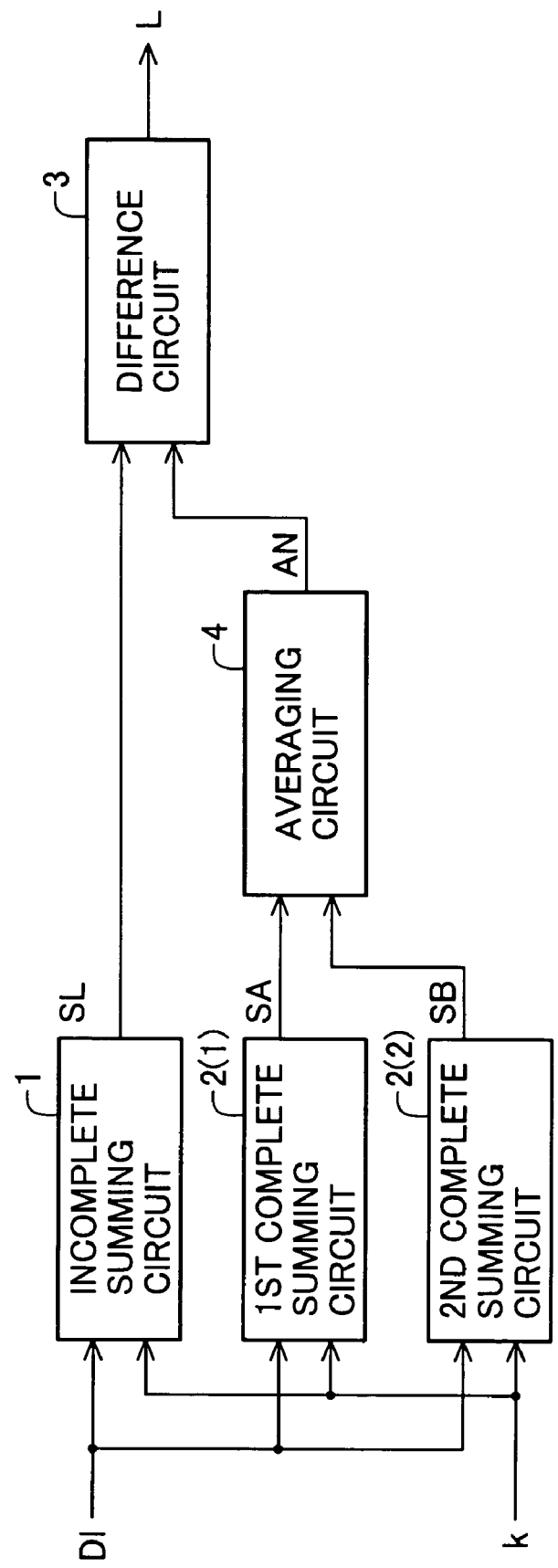
FIG. 10 is a block diagram showing the structure of an interpolation calculation circuit according to a third embodiment.

FIG. 10 shows the structure of a mean preserving interpolation calculation circuit that interpolates a missing pixel so that the mean value of a pixel sequence including the missing pixel is equal to the mean value of two pixel sequences not including the missing pixel.

The mean preserving interpolation calculation circuit that makes the mean value of the pixel sequence including the missing pixel equal to the mean value of two pixel sequences not including the missing pixel has an incomplete summing circuit 1, a first complete summing circuit 2(1), a second complete summing circuit 2(2), a difference circuit 3, and an averaging circuit 4.

Figure 11:
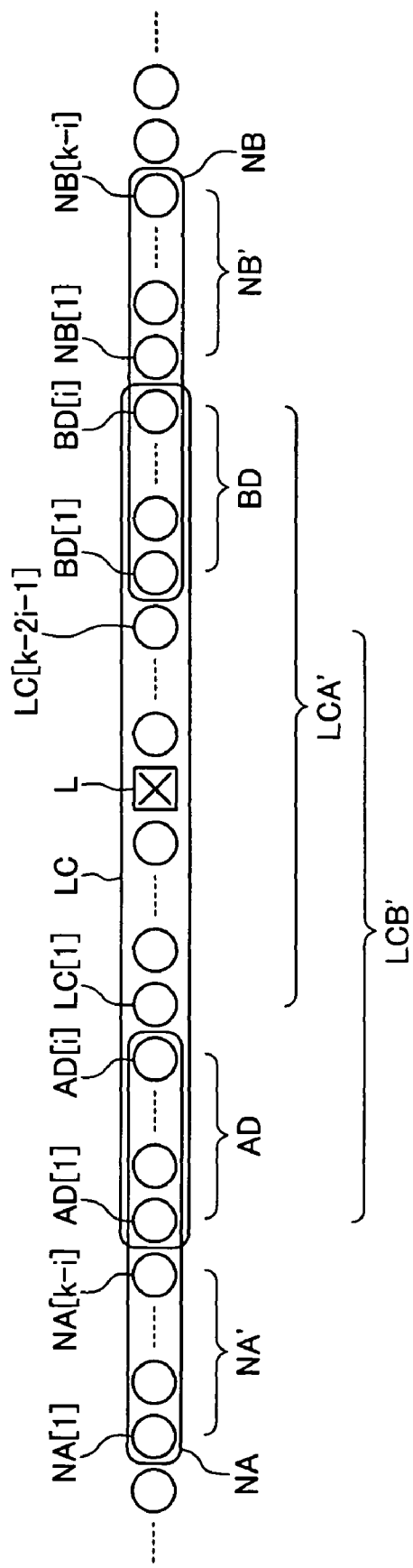
FIG. 11 shows a pixel sequence processed by the interpolation calculation circuit in the third embodiment.

FIG. 11, which is similar to FIG. 2, shows a portion of an input image DI and the positional relationship among the three pixel sequences the mean values of which are calculated by the mean preserving interpolation calculation circuit. Pixel sequences LC, NA, and NB are one-dimensional sequences of k consecutive pixels each; pixel sequences LC and NA and pixel sequences LC and NB each overlap by i pixels. Pixel sequence LC includes a missing pixel; pixel sequences NA and NB do not include a missing pixel. The symbol NA' indicates the portion of pixel sequence NA not overlapping pixel sequence LC; the symbol NB' indicates the portion of pixel sequence NB not overlapping pixel sequence LC; the symbol LCA' indicates the portion of pixel sequence LC not overlapping pixel sequence NA; and the symbol LCB' indicates the portion of pixel sequence LC not overlapping pixel sequence NB. The symbol AD indicates the overlapping portion of pixel sequences NA and LC; the symbol BD indicates the overlapping portion of pixel sequences NB and LC.

Figure 12:
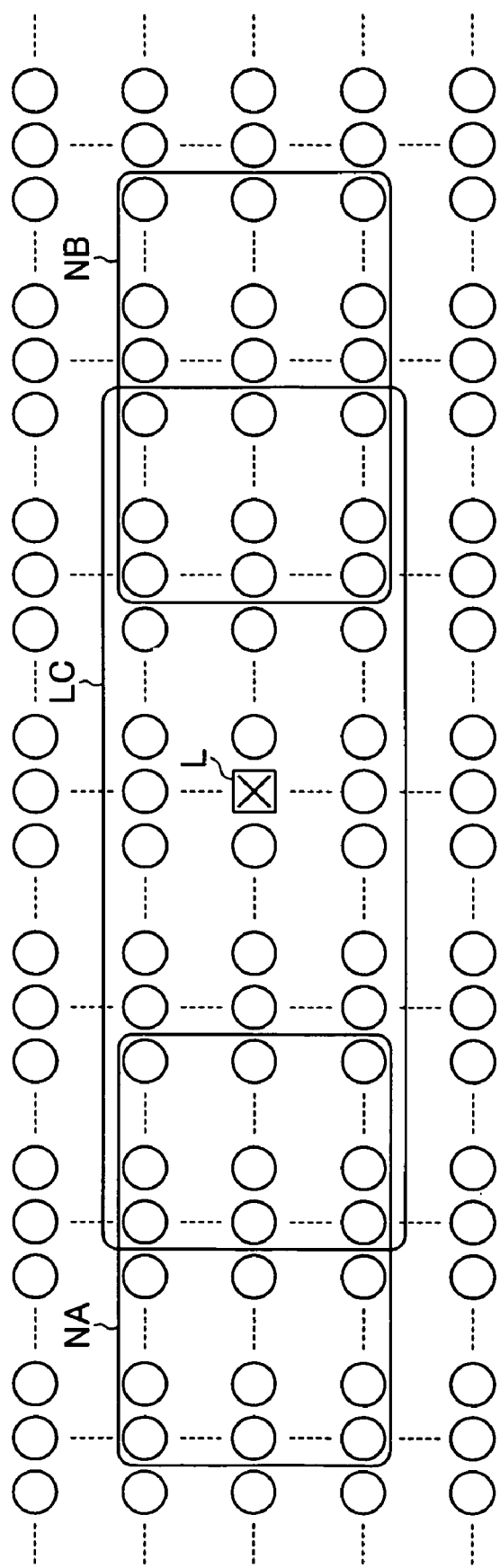
FIG. 12 shows a group of pixels divided into multiple rows for processing by the interpolation calculation circuit according to the third embodiment.

The pixel sequence LC including the missing pixel and the pixel sequences NA and NB not including the missing pixel may be two-dimensional, as shown in FIG. 12.

More specifically, as shown in FIG. 12, the series of pixels may be divided into multiple rows arranged in a matrix, and a plurality of pixel sequences in a plurality of rows, each sequence consisting of consecutive pixels in one row, may constitute a group of pixels. In this case, the mean values of each group of pixels, instead of the mean values of the pixel sequences, are made equal. FIGS. 2 and 11 show examples in which each group of pixels consists of one pixel sequence.

Figure 13:
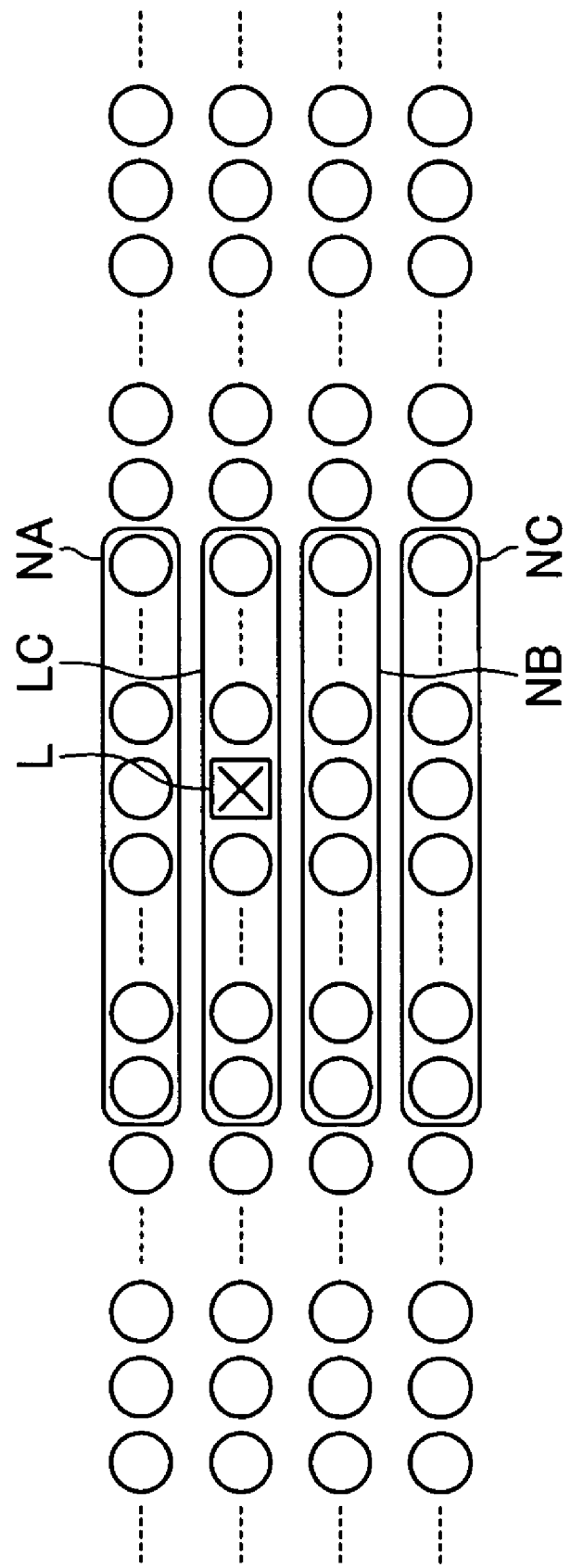
FIG. 13 shows pixel sequences positioned in multiple rows for processing by an interpolation calculation circuit of the present invention.

As shown in FIG. 13, for example, it is possible to set a plurality of non-overlapping pixel sequences not including the missing pixel. It is also possible to offset the pixel sequences not including the missing pixel from the pixel sequence including the missing pixel. More specifically, the plurality of pixel sequences (NA, NB, and NC) not including the missing pixel may be disposed in different rows. FIG. 13 shows three pixel sequences not including the missing pixel; in this case, three complete summing circuits 2 (similar to the two complete summing circuits 2(1) and 2(2) in FIG. 10) may be provided in FIG. 10 and the mean value of all of their outputs may be taken.

The operation of a mean preserving interpolation calculation circuit that makes the mean value of the pixel sequence including a missing pixel equal to the mean value of two pixel sequences not including the missing pixel will be described with reference to FIGS. 10 and 11.

In the mean preserving interpolation calculation circuit that makes the mean values of the pixel sequence including a missing pixel and two pixel sequences not including the missing pixel equal, the missing pixel L is interpolated so that the mean value of the pixel sequence LC including the missing pixel L is equal to the mean value of the pixel sequences NA and NB not including the missing pixel L. The input image DI is input to the incomplete summing circuit 1, the first complete summing circuit 2(1), and the second complete summing circuit 2(2). A parameter k denoting the number of pixels averaged by the mean preserving interpolation calculation circuit is input to the incomplete summing circuit 1, the first complete summing circuit 2(1), and the second complete summing circuit 2(2) as in FIG. 1. First, from the k pixels (AD[1] to AD[i], LC[1] to LC[k−2i−1], and BD[1] to BD[i]) included in pixel sequence LC, the incomplete summing circuit 1 outputs the sum of the values of pixels other than the missing pixel L as partial sum data SL. The partial sum SL can be expressed as follows:

$$SL = AD[1] + \ldots + AD[i] + LC[1] + \ldots + LC[k-2i-1] + BD[1] + \ldots + BD[i]$$

The partial sum data SL are input to the difference circuit 3.

The first complete summing circuit 2(1) outputs the sum of the values of the k pixels (NA[1] to NA[k−i] and AD[1] to AD[i]) in pixel sequence NA as partial sum data SA. The partial sum SA can be represented as follows:

$$SA = NA[1] + \ldots + NA[k-i] + AD[1] + \ldots + AD[i]$$

The partial sum data SA are input to the averaging circuit 4.

The second complete summing circuit 2(2) outputs the sum of the values of the k pixels (BD[1] to BD[i] and NB[1] to NB[k−i]) in pixel sequence NB as partial sum data SB. The partial sum SB can be represented as follows:

$$SB = BD[1] + \ldots + BD[i] + NB[1] + \ldots + NB[k-i]$$

The partial sum data SB are input to the averaging circuit 4.

The averaging circuit 4 outputs the mean value of the partial sum data SA and SB of the two pixel sequences not including the missing pixel as mean value data AN. The mean value AN can be expressed as follows:

$$AN=(SA+SB)/2$$

The difference circuit 3 obtains the interpolation data for the missing pixel L by using the partial sum data SL and the mean value data AN to equalize the mean values of pixel sequences LC, NA, and NB. The equation $$(SL+L)/k=(SA/k+SB/k)/2$$

can be rearranged as follows:

$$(SL+L)/k=AN/k$$

Therefore, the value of the missing pixel L is:

$$L=AN-SL$$

The mean preserving interpolation calculation circuit that makes the mean values of a pixel sequence including a missing pixel and two pixel sequences not including the missing pixel equal can correctly interpolate the missing pixel in image data having the property that the mean values of the pixel sequence LC including the missing pixel and the two pixel sequences NA and NB not including the missing pixel are equal. Moreover, the mean preserving interpolation calculation circuit can correctly interpolate the missing pixel in the same way as described in the second embodiment, in which the pixel sequence including the missing pixel overlaps the pixel sequence not including the missing pixel, in image data having the property that the mean values of the non-overlapping portions of the pixel sequence including the missing pixel and the pixel sequences not including the missing pixel are equal; that is the mean values of non-overlapping portions NA' and LCA are equal, and the mean values of non-overlapping portions NB' and LCB' are equal. Obtaining the mean values of two pixel sequences not including the missing pixel reduces interpolation error due to noise or the like, and improves interpolation accuracy.

An example of missing pixel interpolation for image data with a pixel period of five (Pp=5) by a mean preserving interpolation calculation circuit with k set to nine (k=9) and with the pixel sequence including the missing pixel overlapping each of the two pixel sequences not including the missing pixel by four pixels will be shown.

Figure 14:
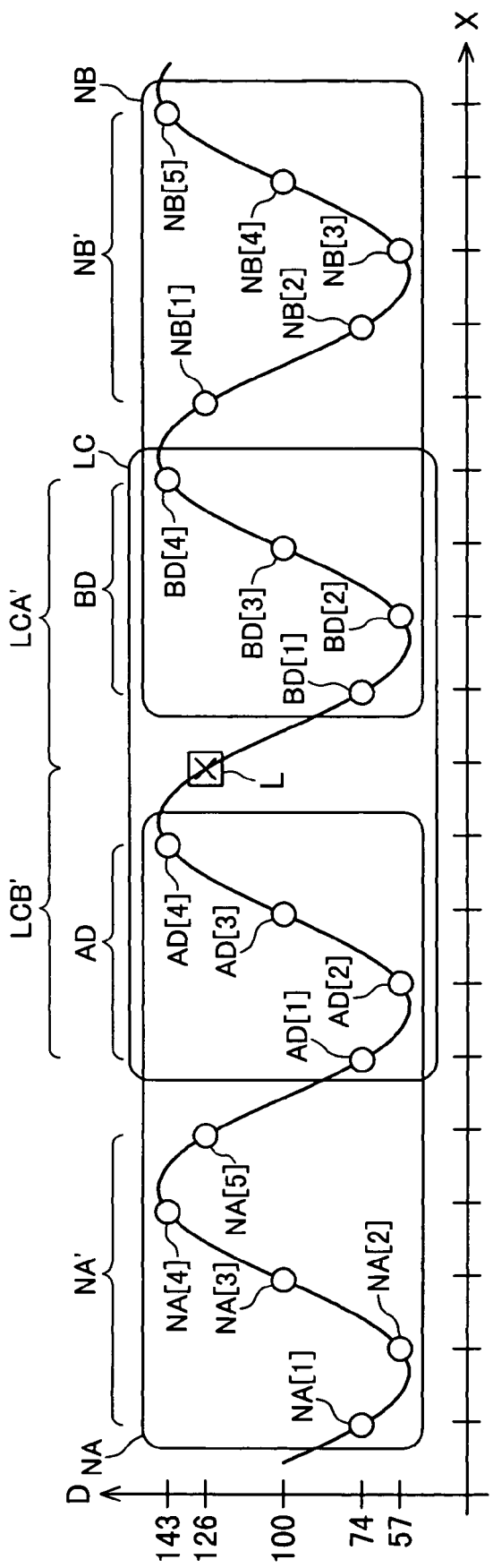
FIG. 14 is a waveform diagram showing exemplary pixel data processed in the interpolation calculation circuit in the third embodiment.

FIG. 14 shows image data similar to the image data in FIG. 3 but with pixel L missing, and indicates the corresponding positional relationship among the pixel sequences LC, NA, and NB (FIG. 11) for which mean values are calculated in the mean preserving interpolation calculation circuit (with k=9) wherein the mean values of the pixel sequence including the missing pixel and the two pixel sequences not including the missing pixel are made equal. Pixel sequences LC and NA and pixel sequences LC and NB each overlap by four pixels.

Since the mean preserving interpolation calculation circuit with k set to nine (k=9) and with the pixel sequence including the missing pixel overlapping each of the two pixel sequences not including the missing pixel by four pixels has the same structure as in FIG. 10 with k set to nine, a description will be omitted.

The operation of the mean preserving interpolation calculation circuit (with k=9) when the pixel sequence including a missing pixel overlaps each of the two pixel sequences not including the missing pixel by four pixels will be described with reference to FIGS. 10 and 14.

From the nine pixels (AD[1] to AD[4], L, and BD[1] to BD[4]) included in pixel sequence LC, the incomplete summing circuit 1 outputs the sum of the values of pixels other than the missing pixel L as partial sum data SL. Since AD[1]=74, AD[2]=57, AD[3]=100, AD[4]=143, BD[1]=74, BD[2]=57, BD[3]=100, and BD[4]=143, the partial sum SL is:

$$SL = AD[1] + AD[2] + AD[3] + AD[4] +$$
$$BD[1] + BD[2] + BD[3] + BD[4]$$
$$= 74 + 57 + 100 + 143 + 74 + 57 + 100 + 143$$
$$= 748$$

The first complete summing circuit 2(1) outputs the sum of the nine pixels (NA[1] to NA[5] and AD[1] to AD[4]) included in pixel sequence NA as partial sum data SA. Since NA[1]=74, NA[2]=57, NA[3]=100, NA[4]=143, NA[5]=126, AD[1]=74, AD[2]=57, AD[3]=100, and AD[4]=143, the partial sum SA is:

$$SA = NA[1] + NA[2] + NA[3] + NA[4] + NA[5] +$$
$$AD[1] + AD[2] + AD[3] + AD[4]$$
$$= 74 + 57 + 100 + 143 + 126 + 74 + 57 + 100 + 143$$
$$= 874$$

The second complete summing circuit 2(2) outputs the sum of the nine pixels (BD[1] to BD[5] and NB[1] to NB[4]) included in pixel sequence NB as partial sum data SB. Since BD[1]=74, BD[2]=57, BD[3]=100, BD[4]=143, NB[1]=126, NB[2]=74, NB[3]=57, NB[4]=100, and NB[5]=143, the partial sum SB is:

$$SB = BD[1] + BD[2] + BD[3] + BD[4] +$$
$$NB[1] + NB[2] + NB[3] + NB[4] + NB[5]$$
$$= 74 + 57 + 100 + 143 + 126 + 74 + 57 + 100 + 143$$
$$= 874$$

The averaging circuit 4 outputs the mean value of the partial sum data SA and SB as mean value data AN. The mean value AN is:

$$AN = (SA + SB)/2$$
$$= (874 + 874)/2$$
$$= 874$$

The difference circuit 3 obtains the interpolation data for the missing pixel L by using the partial sum data SL and the mean value data AN to equalize the mean values of pixel sequences LC, NA, and NB. The equation $$(SL+L)/9=(SA/9+SB/9)/2$$

can be rearranged as follows:

$$(SL+L)/9=AN/9$$

Therefore, the value of the missing pixel is:

$$L = AN - SL$$
$$= 874 - 748$$
$$= 126$$

As shown in FIG. 3, the original data value of the missing pixel L is 126, so the interpolation data obtained in the mean preserving interpolation calculation circuit with k set to nine (k=9) and with the pixel sequence including the missing pixel overlapping each of the two pixel sequences not including the missing pixel by four pixels are free of error with respect to the original data. With k set to nine, if the pixel sequence including a missing pixel overlaps each of the two pixel sequences not including the missing pixel by four pixels, the mean preserving interpolation calculation circuit can correctly carry out missing pixel interpolation for image data with a five-pixel period.

Missing pixel interpolation can be carried out correctly in this way when the number of pixels in the non-overlapping portions of the pixel sequence including the missing pixel and the two pixel sequences not including the missing pixel is an integer multiple of the pixel period Pp (k−i=N*Pp), as in the second embodiment.

Moreover, when the pixel sequence including the missing pixel overlaps the two pixel sequences not including the missing pixel, the mean preserving interpolation calculation circuit can correctly interpolate the missing pixel in the same way as in the first embodiment if the value of the parameter k is an integer multiple of the pixel period Pp (k−N*Pp).

In addition, because the mean values of two portions not including the missing pixel are calculated, even if one of the two pixel sequences NA and NB not including the missing pixel contains noise, as the noise components are also averaged by the averaging circuit 4, interpolation error due to noise or the like is decreased and interpolation accuracy is improved.

In FIG. 10, the first complete summing circuit 2(1), the second complete summing circuit 2(2), and the averaging circuit 4 constitute a complete total calculation circuit 17 for obtaining the sum of the values of k pixels in the pixel sequences not including a missing pixel.

In FIG. 1, the complete summing circuit 2 alone constitutes such a complete total calculation circuit 17.

Figure 15:
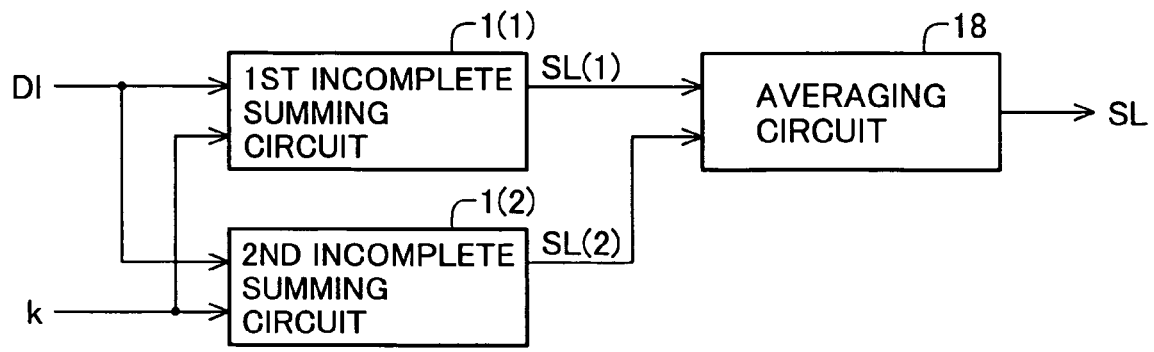
FIG. 15 is a block diagram showing an exemplary structure of an incomplete total calculation circuit having a plurality of incomplete summing circuits.

In place of the incomplete summing circuit 1 in FIG. 10, a plurality of incomplete summing circuits 1(1), 1(2) and an averaging circuit 18 for averaging their outputs may be provided as shown in FIG. 15, these circuits constituting an incomplete total calculation circuit 19 for obtaining the sum (SL) of the values of pixels other than the missing pixel in the k pixels in the pixel sequence including the missing pixel.

In FIGS. 1 and 10, the incomplete summing circuit 1 alone constitutes such an incomplete total calculation circuit 19.

Figure 16:
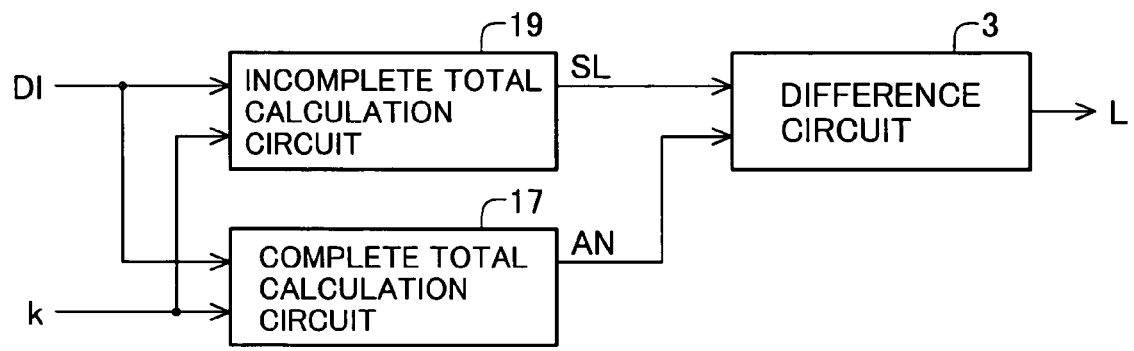
FIG. 16 is a block diagram showing an exemplary structure of a mean preserving interpolation calculation circuit.

FIG. 16 shows a generalization of the structures in FIGS. 1 and 10.

Fourth Embodiment

Figure 17:
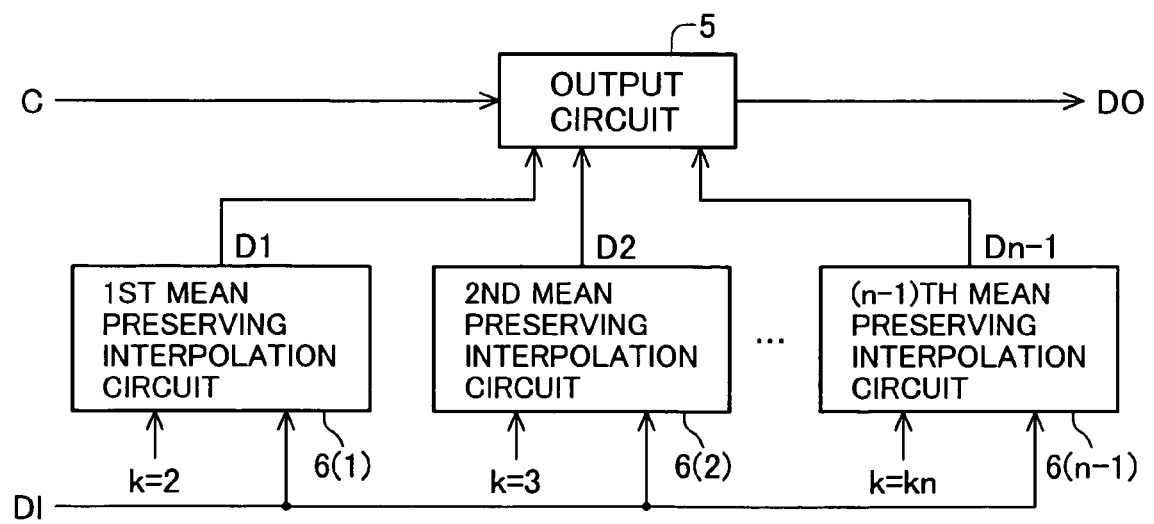
FIG. 17 is a block diagram showing the structure of a pixel interpolation circuit according to a fourth embodiment.

FIG. 17 shows the structure of a pixel interpolation circuit according to a fourth embodiment. This pixel interpolation circuit has a plurality of mean preserving interpolation calculation circuits 12 (a first mean preserving interpolation calculation circuit 6(1), a second mean preserving interpolation calculation circuit 6(2), ..., an (n−1)th mean preserving interpolation calculation circuit 6(n−1)). The parameter k or the parameter (k−i) obtained by subtracting i from k is set to different values in the mean preserving interpolation calculation circuits 6(1) to 6(n−1). For example, the parameter k may be set to two (k=2) in the first mean preserving interpolation calculation circuit 6(1), to three (k=3) in the second mean preserving interpolation calculation circuit 6(2), and so on, being set to kn (k=kn) in the (n−1)th mean preserving interpolation calculation circuit 6(n−1).

An output circuit 5 selects the interpolation data output by one of the mean preserving interpolation calculation circuits 6(1) to 6(n−1) according to, for example, a selection signal C and outputs the selected data as the interpolation data for the missing pixel.

Figure 18:
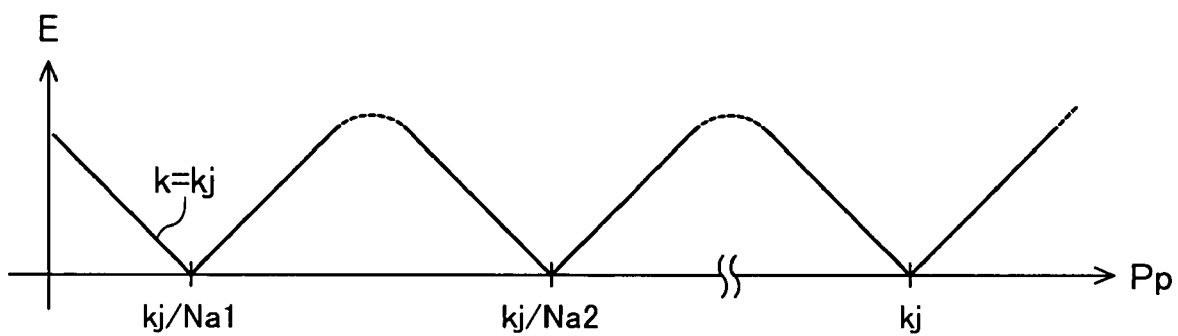
FIG. 18 illustrates the relationship between pixel period and interpolation error in the pixel interpolation circuit in the fourth embodiment.

FIG. 18 illustrates the relationship between pixel period and interpolation error in the mean preserving interpolation calculation circuit described in the first embodiment with k set to kj (k=kj) when the pixel sequence including the missing pixel and the pixel sequence not including the missing pixel are non-overlapping. The horizontal axis Pp indicates the pixel period in the periodic image data; the vertical axis E indicates interpolation error.

The relationship between pixel period and interpolation error in the mean preserving interpolation calculation circuit with k set to kj (k=kj) will now be described.

As explained in the first embodiment, when the pixel sequence including a missing pixel and the pixel sequence not including the missing pixel are non-overlapping, the mean preserving interpolation calculation circuit can correctly interpolate the missing pixel if the value of the parameter k is an integer multiple of the pixel period Pp (k=N*Pp).

Thus, as illustrated in FIG. 18, when the pixel sequence including the missing pixel and the pixel sequence not including the missing pixel are non-overlapping, the interpolation error E becomes minimal or zero when a mean preserving interpolation calculation circuit with k set to kj (k=kj) carries out missing pixel interpolation for image data with a pixel period of kj/Na1, kj/Na2, ..., kj (Pp=kj/Na1, kj/Na2, ..., kj) (Na1>Na2> ... >0, Na1, Na2, ... being divisors of kj). The interpolation error E increases as the pixel period Pp of the image data for which the missing pixel is interpolated moves away from these pixel periods of kj/Na1, kj/Na2, ..., kj.

Figure 19A:
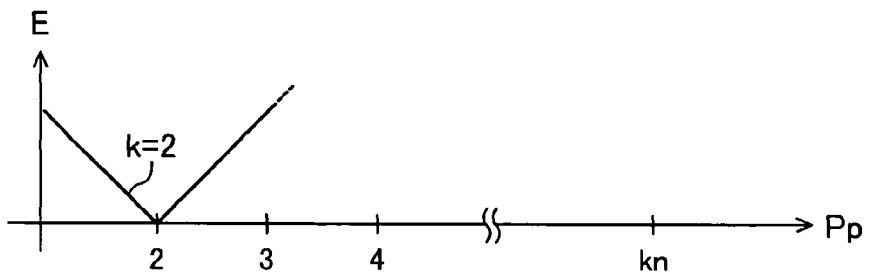
FIGS. 19(a) to 19(e) illustrate relationships between pixel period and interpolation error for different values of a parameter k in the pixel interpolation circuit in the fourth embodiment.
Figure 19B:
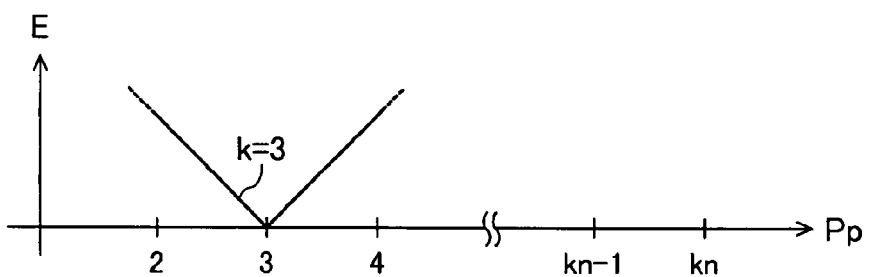
Figure 19C:
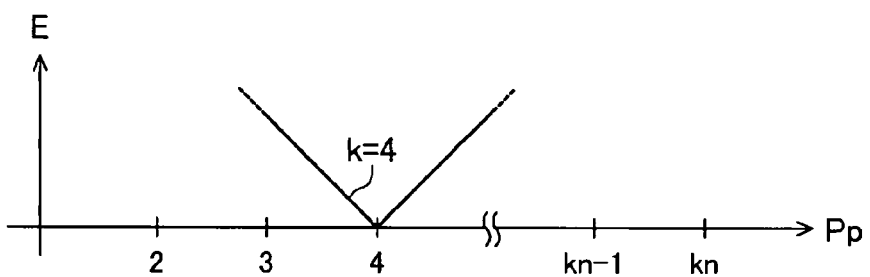
Figure 19D:
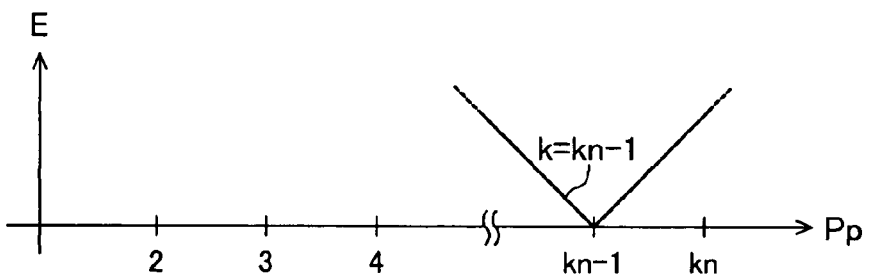
Figure 19E:
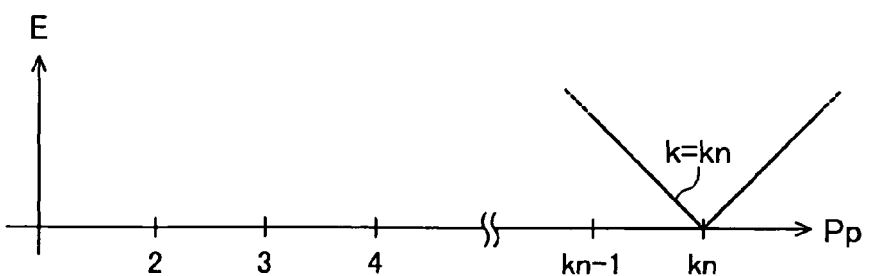

FIGS. 19(a) to 19(e) illustrate relationships between pixel period and interpolation error in the mean preserving interpolation calculation circuit with k set to two, three, four, kn−1, and kn (k=2, 3, 4, kn−1, kn) when the pixel sequence including the missing pixel and the pixel sequence not including the missing pixel are non-overlapping. FIG. 19(a) illustrates the relationship between pixel period and interpolation error in the mean preserving interpolation calculation circuit with k set to two (k=2); FIG. 19(b) illustrates the relationship between pixel period and interpolation error in the mean preserving interpolation calculation circuit with k set to three (k=3); FIG. 19(c) illustrates the relationship between pixel period and interpolation error in the mean preserving interpolation calculation circuit with k set to four (k=4); FIG. 19(d) illustrates the relationship between pixel period and interpolation error in the mean preserving interpolation calculation circuit with k set to kn−1 (k=kn−1); mean preserving interpolation calculation circuit 12. FIG. 19(e) illustrates the relationship between pixel period and interpolation error in the mean preserving interpolation calculation circuit with k set to kn (k=kn).

The relationships between pixel period and interpolation error in the mean preserving interpolation calculation circuit with k set to two, three, four, kn−1, and kn (k=2, 3, 4, kn−1, kn) will be described below.

In the mean preserving interpolation calculation circuit with k set to two (k=2), as the parameter k is a prime number, the interpolation error E becomes minimal or zero only in image data with a pixel period of two (Pp=2). Similarly, in the mean preserving interpolation calculation circuit with k set to three (k=3), the interpolation error E becomes minimal or zero only in image data with a pixel period of three (Pp=3). In the mean preserving interpolation calculation circuit with k set to four (k=4) as shown in FIG. 18, the interpolation error becomes minimal or zero in image data with a pixel period of two (Pp=2) and image data with a pixel period of four (Pp=4), making the value of the pixel period a divisor of k. To simplify the graph, only the error around the pixel period of four (Pp=4) is illustrated. Similarly, only the error around the pixel period of kn−1 (k=kn−1) is illustrated for the mean preserving interpolation calculation circuit with k set to kn−1 (k=kn−1), and only the error around the pixel period of kn (Pp=kn) is illustrated for the mean preserving interpolation calculation circuit with k set to kn (k=kn).

Figure 20A:
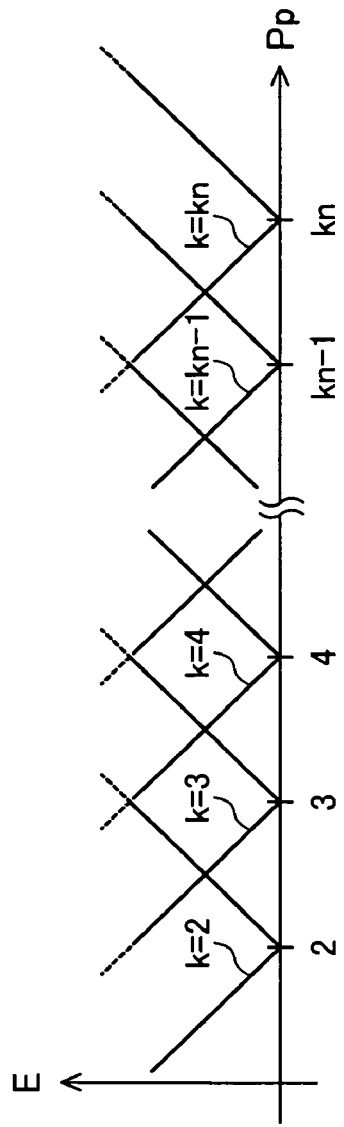
FIGS. 20(a) to 20(c) illustrate relationships between pixel period and interpolation error for different values of the parameter k in the pixel interpolation circuit in the fourth embodiment.
Figure 20B:
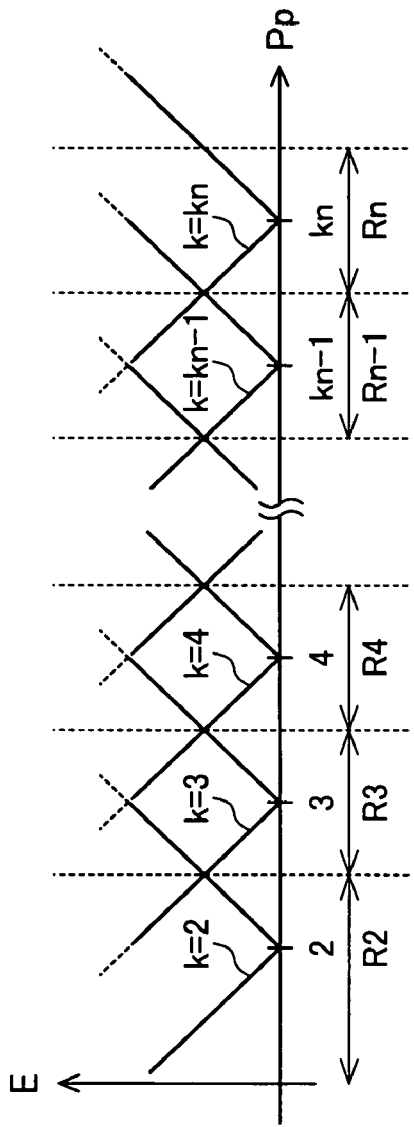
Figure 20C:
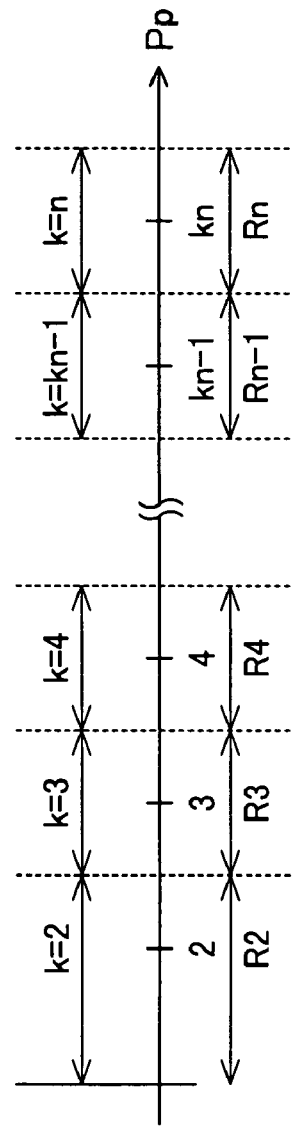

FIGS. 20(a) to 20(c) illustrate relationships between pixel period and interpolation error in the mean preserving interpolation calculation circuits with k set to two to kn (k=2 to k=kn) and indicate the ranges of pixel period Pp in which each mean preserving interpolation calculation circuit produces the best results (the least interpolation error) when the pixel sequence including the missing pixel and the pixel sequence not including the missing pixel are non-overlapping. FIG. 20(a) shows the five graphs in FIGS. 19(a) to 19(e) projected onto one coordinate axis. FIG. 20(b) illustrates ranges in which the interpolation error becomes minimal in each mean preserving interpolation calculation circuit. R2 denotes the range in which the interpolation error becomes minimal in the mean preserving interpolation calculation circuit with k set to two (k=2). R3 to Rn denote ranges in which the interpolation error becomes minimal in the mean preserving interpolation calculation circuits with k set to three to kn (k=3 to k=kn). FIG. 20(c) illustrates ranges of pixel period Pp in which the mean preserving interpolation calculation circuits with k set to two to kn (k=2 to k=kn) each produce the best results.

The pixel periods in which the mean preserving interpolation calculation circuits with k set to two to kn produce the best results will now be described.

The range R2 in which the interpolation error is least in the mean preserving interpolation calculation circuit with k set to two (k=2) is from the minimum value of the pixel period Pp to the intersection of the graph for the mean preserving interpolation calculation circuit with k set to two (k=2) and the graph for the mean preserving interpolation calculation circuit with k set to three (k=3) in FIG. 20(b). The range R3 in which the interpolation error is least in the mean preserving interpolation calculation circuit with k set to three (k=3) is from the intersection of the graphs for the mean preserving interpolation calculation circuits with k set to two and three (the graphs for k=2 and k=3 in FIG. 20(b)) to the intersection of the graphs for the mean preserving interpolation calculation circuits with k set to three and four (the graphs for k=3 and k=4 in FIG. 20(b)). Similarly, R4, Rn−1 and Rn indicate ranges in which the interpolation error is least in mean preserving interpolation calculation circuits with k set to four, kn−1, and kn.

Thus, as shown in FIG. 20(c), the pixel period (Pp) range in which each mean preserving interpolation calculation circuit produces the best results is the range in which it produces the least interpolation error.

The operation of the pixel interpolation circuit in FIG. 17 will now be described.

The input image DI is input to the first mean preserving interpolation calculation circuit 6(1) to the (n−1)th mean preserving interpolation calculation circuit 6(n−1). As described above, a parameter k equal to two (k=2), for example, may be input to the first mean preserving interpolation calculation circuit 6(1). Similarly, a parameter k equal to three (k=3) may be input to the second mean preserving interpolation calculation circuit 6(2), and so on, the parameter k equal to kn(k=kn) being input to the (n−1)th mean preserving interpolation calculation circuit 6(n−1).

The first mean preserving interpolation calculation circuit 6(1) outputs interpolation data D1 according to the input image DI and a parameter setting of two (k=2), the second mean preserving interpolation calculation circuit 6(2) outputs interpolation data D2 according to the input image DI and a parameter setting of three (k=3), and so on, the (n−1)th mean preserving interpolation calculation circuit 6(n−1) outputting interpolation data Dn−1 according to the input image DI and a parameter setting of kn (k=kn). The interpolation data D1 to Dn−1 are input to the output circuit 5. A selection signal C generated as described later, for example, is input to the output circuit 5. The output circuit 5 selects one of the interpolation data D1 to Dn−1 according to the selection signal C and outputs the selected data as the interpolation data DO for the missing pixel.

Because the pixel interpolation circuit in FIG. 17 has a plurality of mean preserving interpolation calculation circuits with different parameter settings, it can produce the interpolation error characteristics in FIG. 20(b), and can therefore be applied to image data with a wide range of repeating periods, from short to long, as shown in FIG. 20(c).

Fifth Embodiment

Figure 21:
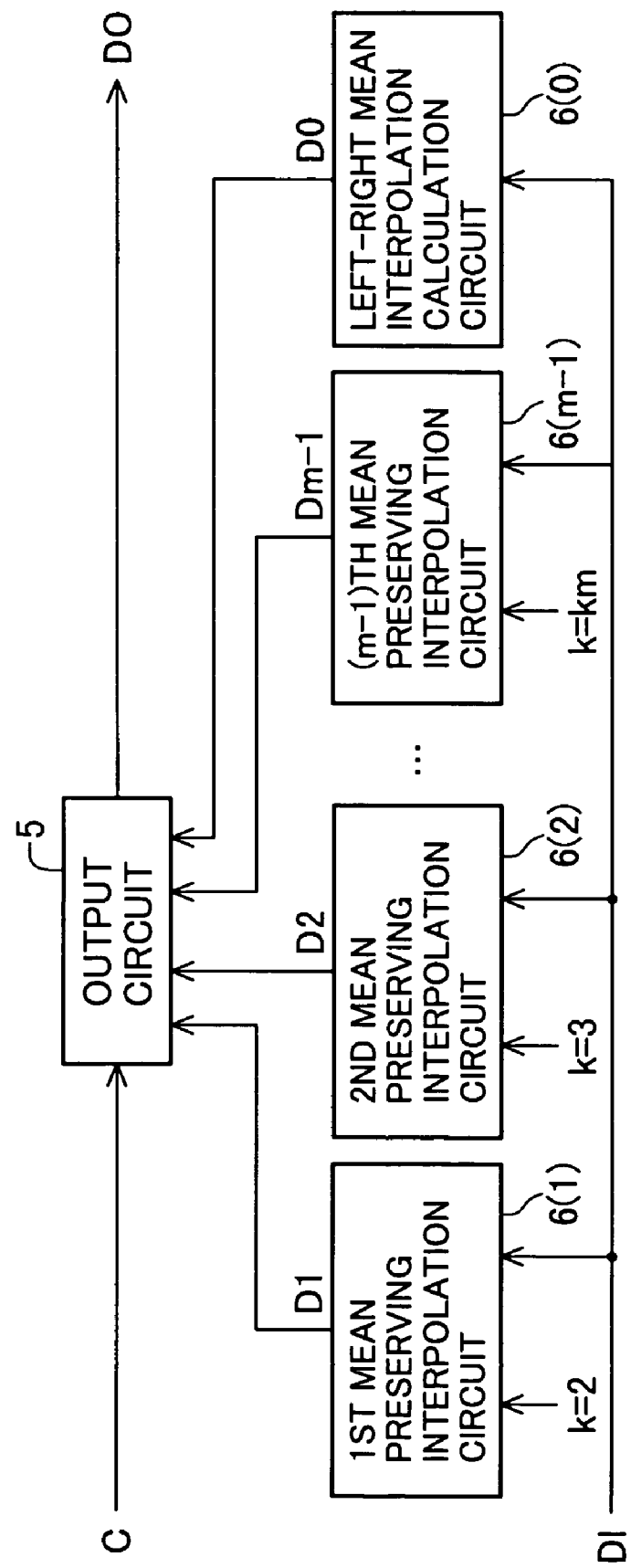
FIG. 21 is a block diagram showing the structure of a pixel interpolation circuit according to a fifth embodiment.

FIG. 21 shows the structure of a pixel interpolation circuit according to a fifth embodiment.

In this pixel interpolation circuit, a left-right mean interpolation calculation circuit 6(0) is added to the configuration in FIG. 17. The mean preserving interpolation calculation circuits 6(1) to 6(m−1) are similar to the mean preserving interpolation calculation circuits 6(1) to 6(n−1) in FIG. 17, but m−1 of them are provided. The value of m may be the same as the value of n in FIG. 17, but it may be a smaller value than n, as described later. In other words, the number of mean preserving interpolation calculation circuits can be reduced when a left-right mean interpolation calculation circuit 6(0) is provided.

The left-right mean interpolation calculation circuit 6(0) generates the mean value of the pixels adjacent to the missing pixel on the left and right as the interpolation data. The term 'on the left and right' as used herein refers to the positions on the left and right of the missing pixel if the series of pixels is lined up horizontally, and corresponds to the positions preceding and following the missing pixel if the series of pixels is received in the form of temporally sequential data.

An output circuit 5 selects one of the interpolation data values output by the plurality of mean preserving interpolation calculation circuits 6(1) to 6(m−1) and the left-right mean interpolation calculation circuit 6(0) according to, for example, a selection signal (C), and outputs the selected data as the interpolation data for the missing pixel.

FIGS. 22(a) to 22(d) illustrate pixel interpolation by the left-right mean interpolation calculation circuit in image data with pixel periods of two, three, four, and kn (Pp=2, 3, 4, kn). In FIGS. 22(a) to (d), a peak value (the peak value in each period) in a periodically varying series of pixels is interpolated. As shown, when missing pixel interpolation is carried out using the left-right mean interpolation calculation circuit, the greatest error occurs when a peak value is interpolated.

Therefore, the maximum error can be studied by examining the error that occurs when a peak value is interpolated.

Figure 22A:
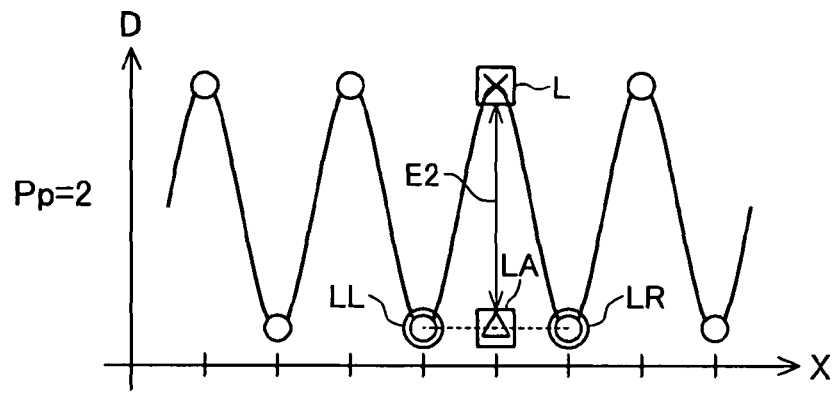
FIGS. 22(a) to 22(d) are waveforms illustrating the operation of the left-right mean interpolation calculation circuit in the pixel interpolation circuit in the fifth embodiment.
Figure 22B:
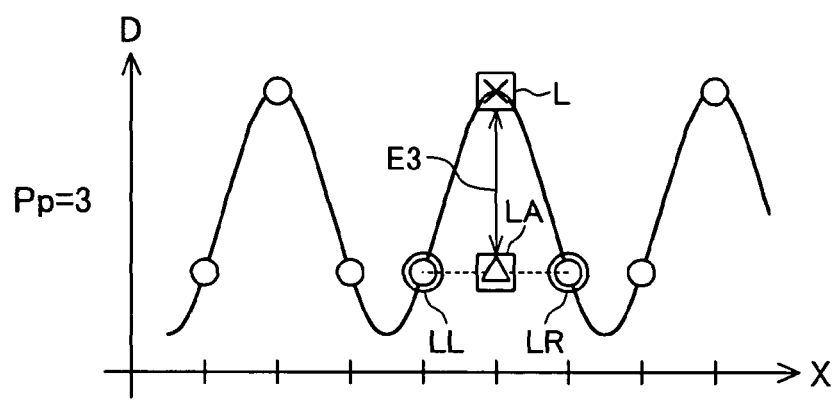
Figure 22C:
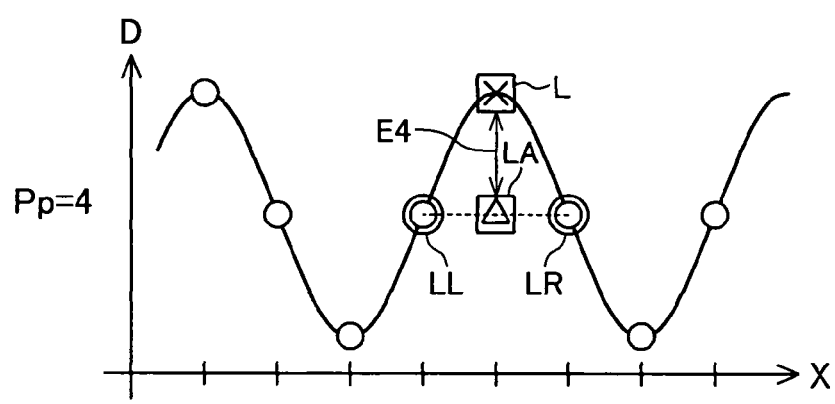
Figure 22D:
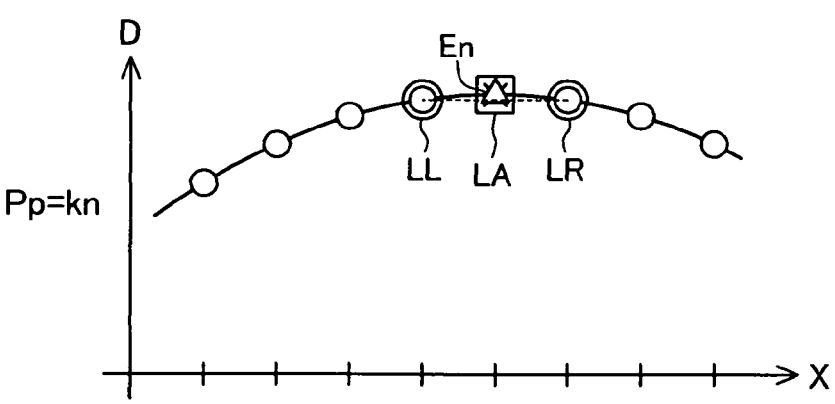

FIG. 22(a) is a waveform diagram showing image data with a pixel period of two (Pp=2); FIG. 22(b) is a waveform diagram showing image data with a pixel period of three (Pp=3); FIG. 22(c) is a waveform diagram showing image data with a pixel period of four (Pp=4); and FIG. 22(d) is a waveform diagram showing image data with a pixel period of kn (Pp=kn). In the waveform diagrams, L indicates the missing pixel to be interpolated; LL indicates the adjacent pixel on the left of the missing pixel; LR indicates the adjacent pixel on the right of the missing pixel; LA indicates interpolation data generated by the left-right mean interpolation calculation circuit; and E2 to En indicate error in the interpolation data with respect to the original data.

The interpolation error in the left-right mean interpolation calculation circuit for image data with pixel periods of two, three, four, and kn (Pp=2, 3, 4, kn) will now be described.

As shown in FIGS. 22(a) to 22(d), the left-right mean interpolation calculation circuit obtains the mean value of the adjacent pixel LL on the left of the missing pixel L and the adjacent pixel LR on the right of the missing pixel as interpolation data LA for the missing pixel L. The interpolation data LA can be expressed as follows:

$$LA=(LL+LR)/2$$

In the waveform diagrams, interpolation errors E2 to En indicate the difference between the interpolation data LA and the original data for the missing pixel L.

Figure 23:
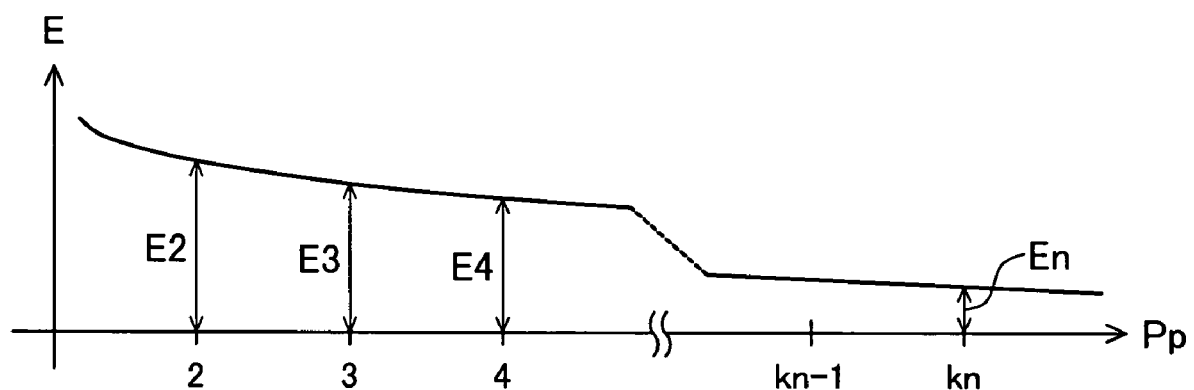
FIG. 23 shows the relationship between pixel period and interpolation error in the left-right mean interpolation calculation circuit of the pixel interpolation circuit in the fifth embodiment.

If a peak value is interpolated in each case, the interpolation error decreases as the value of the pixel period Pp increases. The relationship between pixel period and interpolation error in the left-right mean interpolation calculation circuit is shown in FIG. 23.

FIGS. 24(a) to 24(c) illustrate relationships between pixel period and interpolation error in the mean preserving interpolation calculation circuits and indicate the ranges of pixel period Pp in which the mean preserving interpolation calculation circuits with k set to two to kn (k=2 to kn) and the left-right mean interpolation calculation circuit produce the best results.

The range of pixel period Pp in which the left-right mean interpolation calculation circuit produces the best results will now be described.

FIG. 24(a) illustrates the relationship (FIG. 23) between pixel period and interpolation error in the left-right mean interpolation calculation circuit.

Ep indicates the upper limit of the visually acceptable interpolation error.

As shown in FIG. 24(a), the interpolation error E in the left-right mean interpolation calculation circuit decreases as the value of the pixel period Pp increases, so in image data with a pixel period of km+1 to kn (Pp=km+1 to kn), the interpolation error E is below the upper limit of the visually acceptable interpolation error Ep. The left-right mean interpolation calculation circuit may therefore be used for missing pixel interpolation in the range indicated by Rave, more specifically, for image data with a pixel period of km+1 to kn (Pp=km+1 to kn).

FIG. 24(b) illustrates ranges of pixel periods Pp in which the mean preserving interpolation calculation circuits with k set to two to kn (k=2 to k=kn) in FIG. 20(c) produce the best results. As shown in FIG. 24(a), the left-right mean interpolation calculation circuit may be used in missing pixel interpolation for image data with a pixel period of km+1 to kn (Pp=km+1 to kn), so the output of the left-right mean interpolation calculation circuit may be used in place of the outputs of the mean preserving interpolation calculation circuits in FIG. 17 with k set to km+1 to kn (assuming m<n). Thus, it is possible to omit the mean preserving interpolation calculation circuits with k set to km+1 to kn (assuming m<n).

The number of mean preserving interpolation calculation circuits with different parameter settings can be reduced when the mean preserving interpolation calculation circuits with k set to km+1 to kn (k=km+1 to kn) in FIG. 17 are replaced with the left-right mean interpolation calculation circuit. Thus, it is possible to reduce the circuit size of a pixel interpolation circuit applicable to image data with a wide range of repeating periods.

Figure 25:
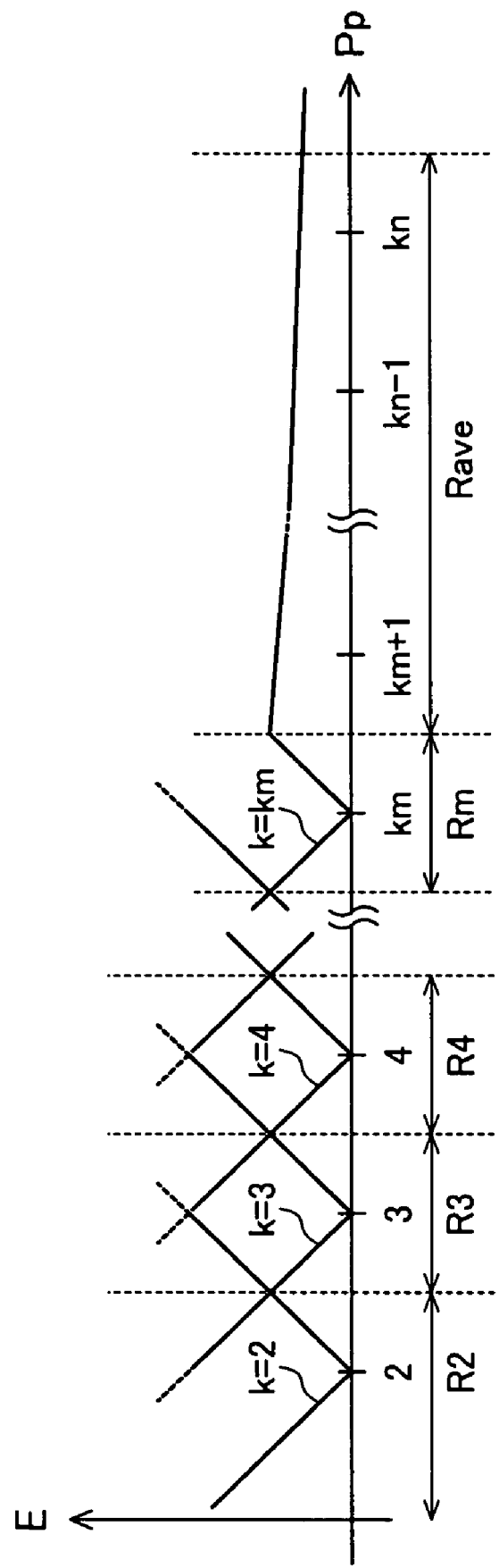
FIG. 25 shows the relationship between the parameter k and interpolation error in the pixel interpolation circuit in the fifth embodiment.

A pixel interpolation circuit that has a left-right mean interpolation calculation circuit and a plurality of interpolation calculation circuits exhibits the interpolation error characteristic in FIG. 25. In FIG. 25, as in FIG. 20(b), R2 denotes the range in which the interpolation error is least in the mean preserving interpolation calculation circuit with k set to two (k=2), and R3 to Rm denote ranges in which the interpolation error is least in the mean preserving interpolation calculation circuits with k set to three to km (k=3 to km). Rave denotes the range in which the interpolation error in the left-right mean interpolation calculation circuit is least.

Figures 26A, 26B, 26C:
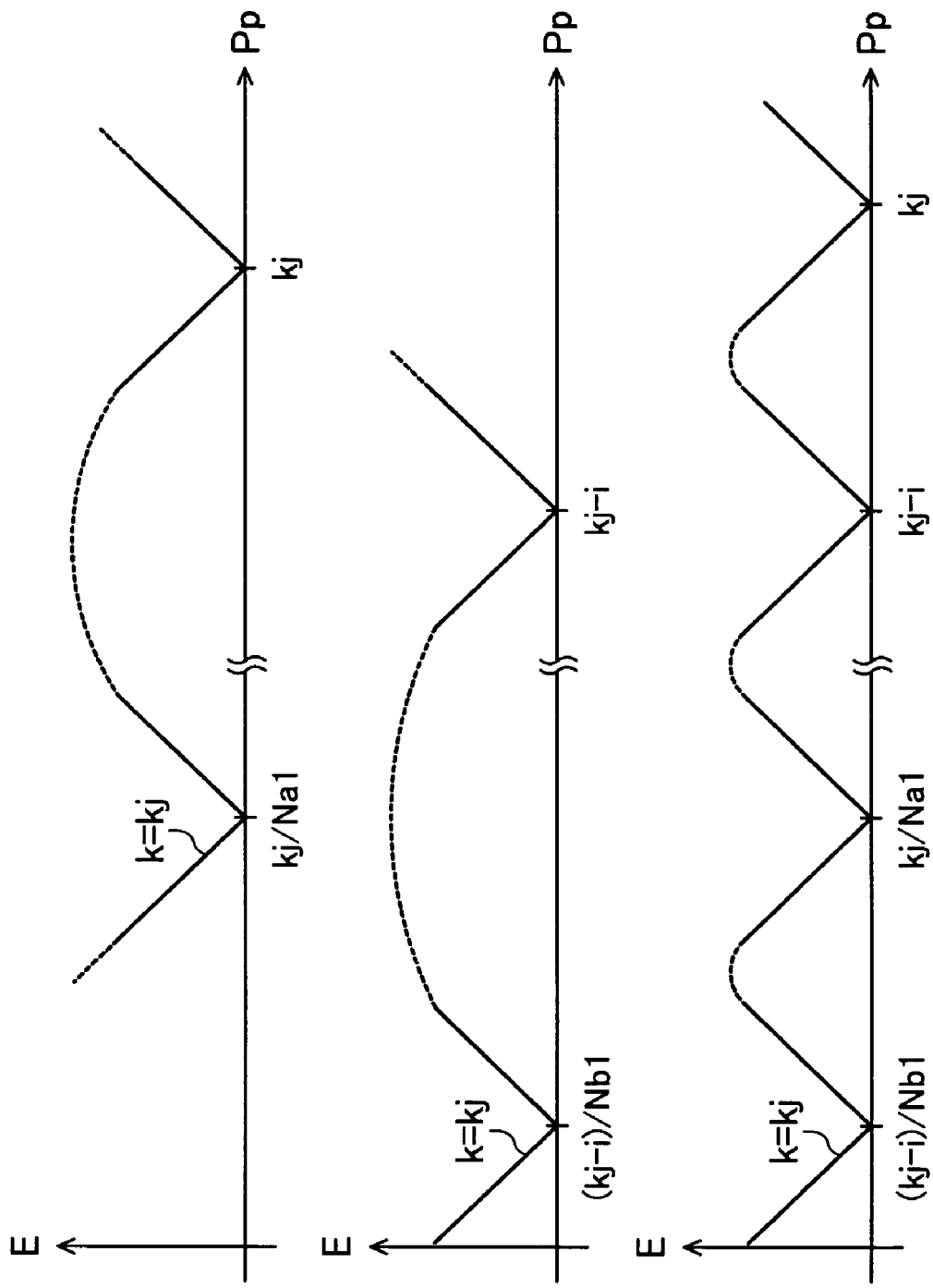
FIGS. 26(a) to 26(c) show relationships between the parameter k and interpolation error in the pixel interpolation calculation circuit in the fifth embodiment.

FIGS. 26(a) to 26(c) illustrate relationships between pixel period Pp and interpolation error in the mean preserving interpolation calculation circuit described in the second and third embodiments with k set to kj (k=kj) and with the pixel sequence including the missing pixel and pixel sequence not including the missing pixel overlapping by i pixels.

The relationship between pixel period and interpolation error will now be described.

As explained in the second and third embodiments, when the pixel sequence including a missing pixel and the pixel sequence not including the missing pixel overlap by i pixels, the mean preserving interpolation calculation circuit can correctly interpolate the missing pixel if the value of the parameter k is an integer multiple of the pixel period Pp (k=N*Pp), or if the number of pixels in the non-overlapping portions of the pixel sequence including the missing pixel and the pixel sequence not including the missing pixel (k−i) is an integer multiple of the pixel period Pp (k−i=N*Pp).

As shown in FIG. 26(a), in the mean preserving interpolation calculation circuit with k set to kj (k=kj) and with the pixel sequence including the missing pixel and the pixel sequence not including the missing pixel overlapping by i pixels, the interpolation error E becomes minimal or zero when missing pixel interpolation is carried out for image data with pixel periods of kj/Na1, . . . , kj (Pp=kj/Na1, . . . , kj) (Na1> . . . >0, Na1, . . . being divisors of kj); the interpolation error E increases as the pixel period Pp of the image data for which a missing pixel is interpolated moves away from these pixel periods of kj/Na1, kj/Na2, . . . , kj.

Moreover, as shown in FIG. 26(b), the interpolation error E also becomes minimal or zero when missing pixel interpolation is carried out for image data with a pixel period of (kj−i)/Nb1, . . . , kj−i (Pp=(kj−i)/Nb1, . . . , kj−i) (Nb1> . . . >0, Nb1, . . . being divisors of kj); the interpolation error E increases as the pixel period Pp moves away from these pixel periods of (kj−i)/Nb1, . . . , kj−i.

The relationship between pixel period Pp and interpolation error in the mean preserving interpolation calculation circuit when the pixel sequence including the missing pixel and the pixel sequence not including the missing pixel overlap by i pixels is illustrated in FIG. 26(c), which combines FIGS. 26(a) and 26(b).

FIGS. 27(a) to 27(c) each show exemplary positional relationships among the pixel sequence LC including the missing pixel and the pixel sequences NA and NB not including the missing pixel in the mean preserving interpolation calculation circuit described in the third embodiment with a pixel sequence including a missing pixel and two pixel sequences not including the missing pixel. FIG. 27(a) shows the positional relationships among the pixel sequence LC including the missing pixel and the pixel sequences NA and NB not including the missing pixel with k set to three (k=3) and i set to one (i=1); FIG. 27(b) shows the positional relationships among the pixel sequence LC including the missing pixel and the pixel sequences NA and NB not including the missing pixel with k set to five (k=5) and i set to two (i=2); and FIG. 27(c) shows the positional relationships among the pixel sequence LC including the missing pixel and the pixel sequences NA and NB not including the missing pixel with k set to kn (k=kn) and i set to (kn−1)/2 (i=(kn−1)/2).

The relationship between the parameters k and i and the pixel period Pp of the image data in which the mean preserving interpolation calculation circuit can correctly carry out missing pixel interpolation with the pixel sequence including the missing pixel and the two pixel sequences not including the missing pixel in FIGS. 27(a) to 27(c) will now be described.

As shown in FIGS. 26(a) to 26(c), when the pixel sequence including the missing pixel and the pixel sequence not including the missing pixel overlap by i pixels, the mean preserving interpolation calculation circuit with k set to kj (k=kj) can correctly carry out missing pixel interpolation for image data with a pixel period of (kj−i)/Nb1, . . . , kj−i (Pp=(kj−i)/Nb1, . . . , kj−i); thus the mean preserving interpolation calculation circuit with k set to three (k=3) and with the pixel sequence including the missing pixel and the two pixel sequences not including the missing pixel overlapping by one pixel as shown in FIG. 27(a) can correctly carry out missing pixel interpolation for image data with a pixel period of three (Pp=k=3), or with a pixel period of two (Pp=k−i=2).

Similarly, the mean preserving interpolation calculation circuit with k set to five (k=5) and with the pixel sequence including the missing pixel and the two pixel sequences not including the missing pixel overlapping by two pixels as shown in FIG. 27(b) can correctly carry out missing pixel interpolation for image data with a pixel period of five (Pp=k=5), or with a pixel period of three (Pp=k−i=3).

In the same way, the mean preserving interpolation calculation circuit with k set to kn (k=kn) and with the pixel sequence including the missing pixel and the two pixel sequences not including the missing pixel overlapping by (kn−1)/2 pixels as shown in FIG. 27(c) can correctly carry out missing pixel interpolation for image data with a pixel period of kn/Na1, . . . , kn (Pp=kn/Na1, . . . , kn), or with a pixel period of (kn−i)/Nb1, . . . , kn−i (Pp=(kn−i)/Nb1, . . . , kn−i)

Figure 28A:
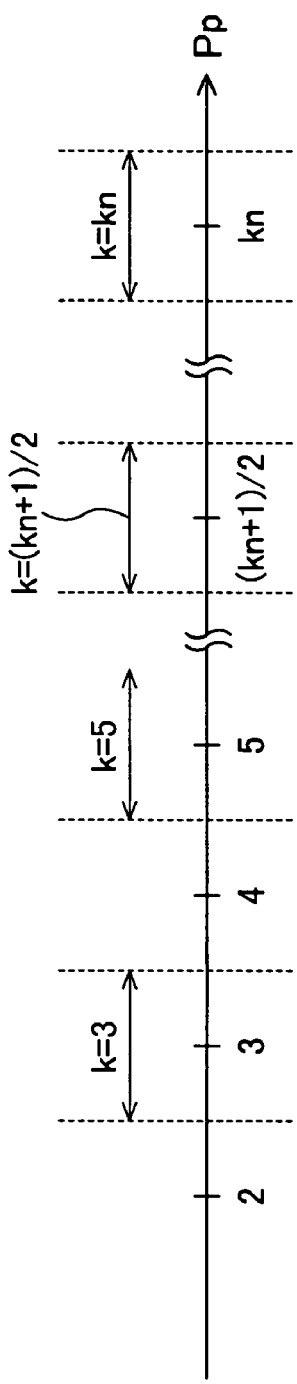
FIGS. 28(a) to 28(c) illustrate ranges in which the plurality of mean preserving interpolation calculation circuits in the pixel interpolation circuit in the fifth embodiment produce good results.
Figure 28B:
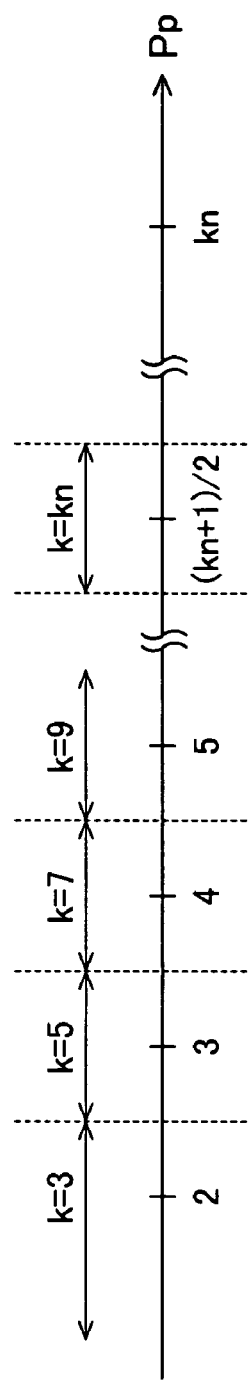
Figure 28C:
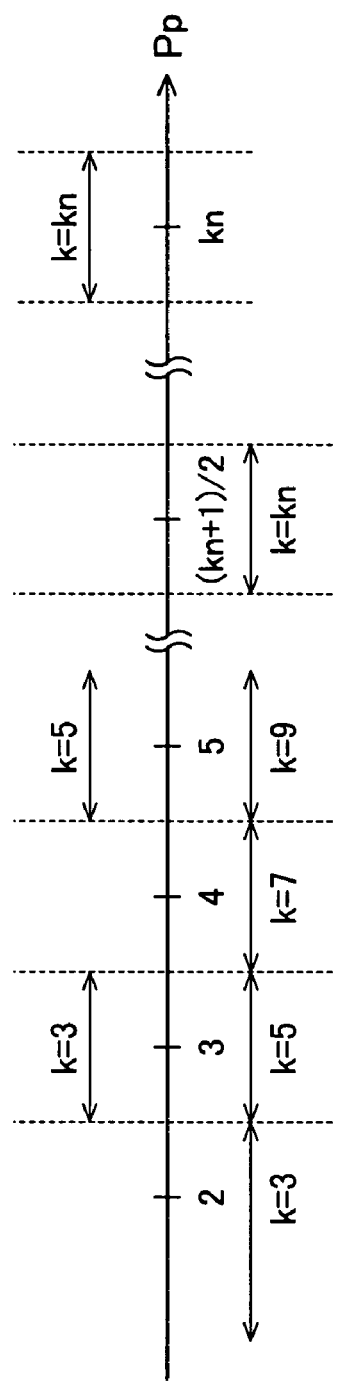

FIGS. 28(a) to 28(c) show the ranges of the pixel period Pp in which each mean preserving interpolation calculation circuit produces the best results when the pixel sequence including the missing pixel overlaps the two pixel sequences not including the missing pixel as shown in FIGS. 27(a) to 27(c).

The range of pixel period Pp in which the mean preserving interpolation calculation circuit with k set to three (k=3) produces good results is around the pixel period of three (Pp=3); the range of pixel period Pp in which the mean preserving interpolation calculation circuit with k set to five (k=5) produces good results is around the pixel period of five (Pp=5). Similarly, the ranges of pixel period Pp in which the mean preserving interpolation calculation circuits with k set to (kn+1)/2 and kn (k=(kn+1)/2, kn) produce good results are around the pixel periods of (kn+1)/2 and kn (Pp=(kn+1)/2, kn). The ranges of pixel periods in which the mean preserving interpolation calculation circuits with k set to three, five, (kn+1)/2, and kn (k=3, 5, (kn+1)/2, kn) produce good results are shown in FIG. 28(a).

Moreover, the mean preserving interpolation calculation circuit with k set to three (k=3) also produces good results around a pixel period of two (Pp=k−i=2). Similarly, the mean preserving interpolation calculation circuit with k set to five (k=5) produces good results around a pixel period of three (Pp=k−i=3). In the same way, the mean preserving interpolation calculation circuits with k set to seven, nine, and kn (k=7, 9, kn) produce good results around pixel periods of four, five, and (kn+1) (Pp=4, 5, (kn+1)/2)). The ranges of pixel periods in which the mean preserving interpolation calculation circuits with k set to three, five, seven, nine, and (kn+1)/2 (k=3, 5, 7, 9, (kn+1)/2) produce good results are shown in FIG. 28(b).

Thus, when the pixel sequence including the missing pixel overlaps the two pixel sequences not including the missing pixel, the mean preserving interpolation calculation circuits with k set to three, five, (kn+1)/2, and kn (k=3, 5, (kn+1)/2, kn) can be applied to image data in the ranges in FIG. 28(c), which shows the combined ranges in FIGS. 28(a) and 28(b).

Thus, if a left-right mean interpolation calculation circuit is added to a plurality of mean preserving interpolation calculation circuits, and if the interpolation data with the least interpolation error are selected from the data generated by these circuits, interpolation data with little interpolation error can always be output, irrespective of the pixel period.

Sixth Embodiment

Figure 29:
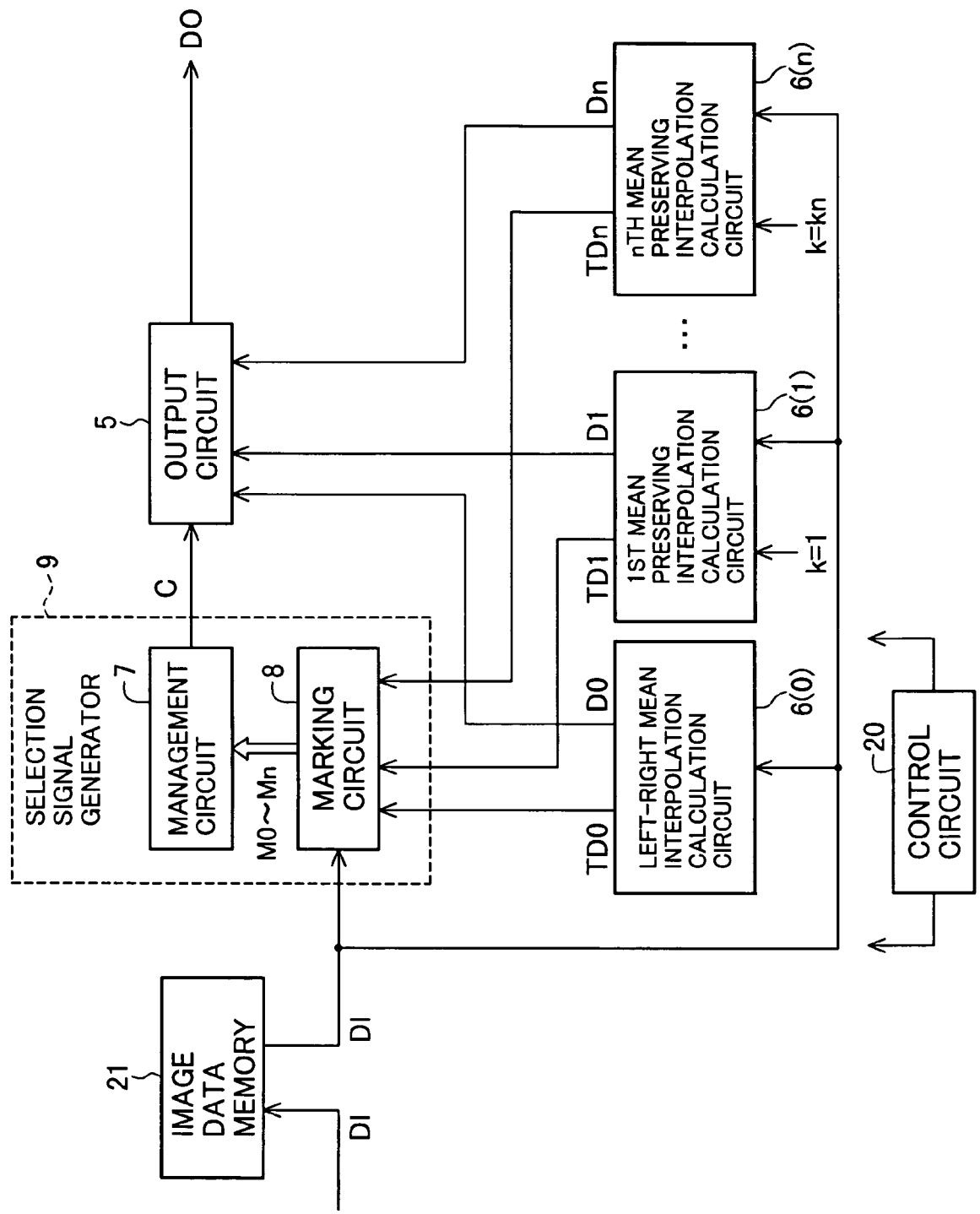
FIG. 29 is a block diagram showing the structure of a pixel interpolation circuit according to a sixth embodiment.

FIG. 29 shows the structure of a pixel interpolation circuit according to a sixth embodiment.

In the pixel interpolation circuit according to the sixth embodiment, a selection signal generator 9 for generating a selection signal for input to the output circuit, a control circuit 20, and an image data memory 21 are added to the configuration in FIG. 21 described in the fourth embodiment.

The image data memory 21 temporarily stores the input image data DI, and repeatedly outputs the same image data according to instructions from the control circuit 20.

The selection signal generator 9 generates a selection signal C for selecting the data from one of the plurality of mean preserving interpolation calculation circuits based on the original data of pixels in a neighborhood of the missing pixel and interpolation data obtained for the pixels in the neighborhood of the missing pixel by methods identical to the methods by which the interpolation data for the missing pixel are obtained.

The selection signal generator 9 in FIG. 29 comprises a management circuit 7 and a marking circuit 8.

The plurality of mean preserving interpolation calculation circuits 6(1) to 6(n) are each configured, for example, as shown in FIG. 16, or as shown more specifically in FIG. 1.

The control circuit 20 causes the incomplete total calculation circuit 19 (FIG. 16), for example, in each of the plurality of mean preserving interpolation calculation circuits to receive the pixels, other than a test non-missing pixel in a neighborhood of the missing pixel, in k pixels constituting a group of pixels including the test non-missing pixel and obtain a total sum (SL) of their values, causes the complete total calculation circuit 17 in each of the plurality of mean preserving interpolation calculation circuits to receive the k pixels constituting the group of pixels not including the test non-missing pixel and obtain a sum of their values, and causes the difference circuit 3 in each of the plurality of mean preserving interpolation calculation circuits to obtain interpolation data for the test non-missing pixel by subtracting the output of the incomplete total calculation circuit 19 from the output of the complete total calculation circuit 17.

The control circuit 20 further causes the left-right mean interpolation calculation circuit 6(0) to receive pixels adjacent to a test non-missing pixel disposed in the neighborhood of the missing pixel, obtain the mean of their values, and output the mean value as interpolation data for the test non-missing pixel.

The control circuit 20 causes a plurality of different test non-missing pixels to be processed in the above way.

The selection signal generator 9 evaluates the plurality of interpolation calculation circuits based on the interpolation data obtained by each interpolation calculation circuit for the test non-missing pixel and the original data of the test non-missing pixel, and determines the content of the selection signal so as to select the interpolation calculation circuit receiving the best evaluation.

The control circuit 20 causes the incomplete total calculation circuits 19 in the plurality of mean preserving interpolation calculation circuits 6(1) to 6(n) to receive the pixels constituting the group of pixels including the missing pixel, causes the complete total calculation circuits 17 to receive the pixels constituting the group of pixels not including the missing pixel, causes the incomplete total calculation circuits 19 and complete total calculation circuits 17 to perform mean preserving interpolation calculations for the missing pixel, causes the left-right mean interpolation calculation circuit 6(0) to receive the pixels adjacent to the missing pixel and perform a mean preserving interpolation calculation for the missing pixel, and causes the output circuit 5 to select and output the interpolation data from one of the plurality of mean preserving interpolation calculation circuits 6(0) to 6(n) according to the selection signal C with content determined as above.

For convenience of description, differing from FIGS. 17 and 21, the number of mean preserving interpolation calculation circuits in FIG. 29 is indicated as n.

The pixel interpolation circuit in FIG. 29 performs the following two processes each time input image data are supplied.

In the first process, referred to as the evaluation process, the plurality of interpolation calculation circuits are evaluated using the pixels other than the missing pixel in the supplied input image data, and the content of the selection signal C is determined according to which interpolation circuit receives the best evaluation.

In the second process, referred to as the interpolation process, interpolation is carried out by generating interpolation data for the missing pixel in the supplied input image data according to the content of the selection signal C.

The same input image data DI are used repeatedly in the evaluation process and the interpolation process; the input image data DI are temporarily stored in the image data memory 21, and then repeatedly read out according to instructions from the control circuit 20.

The interpolation calculation in the evaluation process and the interpolation calculation in the interpolation process may be carried out simultaneously and in parallel, or the interpolation calculation in the evaluation process may be carried out first and then followed by the interpolation calculation in the interpolation process. First, the case in which the interpolation calculation in the evaluation process and the interpolation calculation in the interpolation process are carried out simultaneously and in parallel will be outlined; next, the case in which the interpolation calculation in the evaluation process is followed by the interpolation calculation in the interpolation process will be described in more detail.

The input image data DI are input to the left-right mean interpolation calculation circuit 6(0), the n mean preserving interpolation calculation circuits (the first mean preserving interpolation calculation circuit 6(1), the second mean preserving interpolation calculation circuit 6(2), . . . , the nth mean preserving interpolation calculation circuit 6(n)), and the marking circuit 8. Parameters k equal to k1 to kn (k=k1 to kn) are input to the first mean preserving interpolation calculation circuit to the nth mean preserving interpolation calculation circuit, respectively. The left-right mean interpolation calculation circuit 6(0) outputs interpolation data TD0[T1] to TD0[Tm] for a plurality of test non-missing pixels (test pixels) and interpolation data D0 for the missing pixel based on the input image DI. The test interpolation data TD0[T1] to TD0[Tm] output by the left-right mean interpolation calculation circuit 6(0) are input to the marking circuit 8; the interpolation data D0 are input to the output circuit 5.

The first mean preserving interpolation calculation circuit 6(1) outputs interpolation data TD1[T1] to TD1[Tm] for the plurality of test pixels and interpolation data D1 for the missing pixel based on the input image DI and a parameter setting of k1 (k=k1). The test interpolation data TD1[T1] to TD1[Tm] are input to the marking circuit 8; the interpolation data D1 are input to the output circuit 5.

Similarly, the second mean preserving interpolation calculation circuit 6(2) to the nth mean preserving interpolation calculation circuit 6(n) output interpolation data TD2[T1] . . . TD2[Tm] to TDn[T1] . . . TDn[Tm] for the plurality of test pixels and interpolation data D2 to Dn for the missing pixel based on the input image DI and parameter settings of k2 to kn (k=k2 to k=kn). The test interpolation data TD2[T1] . . . TD2[Tm] to TDn[T1] . . . TDn[Tm] output by the second mean preserving interpolation calculation circuit 6(2) to the nth mean preserving interpolation calculation circuit 6(n) are input to the marking circuit 8; the interpolation data D2 to Dn are input to the output circuit 5.

The marking circuit 8 marks the test interpolation data TD0 output by the left-right mean interpolation calculation circuit 6(0) based on the input image DI, and outputs the result as marking data M0. The marking data M0 output by the marking circuit 8 are input to the management circuit 7.

Similarly, the marking circuit 8 marks the test interpolation data TD1[T1] . . . TD1[Tm] to TDn[T1] . . . TDn[Tm] output by the first mean preserving interpolation calculation circuit 6(1) to the nth mean preserving interpolation calculation circuit 6(n) based on the input image DI, and outputs the results as marking data M1 to Mn. The marking data M1 to Mn are input to the management circuit 7.

The management circuit 7 evaluates the marking data M0 to Mn output by the marking circuit 8 as described later, for example, and outputs a selection signal C based on the results. The selection signal C output by the management circuit 7 is input to the output circuit 5.

The output circuit 5 selects one of the interpolation data D0 to Dn output by the left-right mean interpolation calculation circuit 6(0) and the first mean preserving interpolation calculation circuit 6(1) to the nth mean preserving interpolation calculation circuit 6(n) according to the selection signal C, and outputs the selected data as output data DO.

The case in which the interpolation calculation in the evaluation process is carried out first and then followed by the interpolation calculation in the interpolation process will now be described in more detail.

First, the evaluation process will be described. In this situation, the output circuit 5 in FIG. 29 does not operate. More specifically, the interpolation data DO are not output.

FIG. 30(a) shows an input image DI and the positional relationship between the missing pixel and the test non-missing pixels (test pixels). In FIGS. 30(a) and 30(b), a circle indicates an existing pixel; a cross (X) indicates a missing pixel.

In relation to the missing pixel L, existing (non-missing) pixels (T1 to Tm) in the neighborhood of the missing pixel L are selected as test pixels (m=2k). A test pixel is a non-missing pixel in the neighborhood of the missing pixel which is assumed to be missing and for which interpolation data are generated on that assumption. FIG. 30(a) shows a one-dimensional row of k test pixels on each side of the missing pixel L.

The test pixels may be unevenly distributed on the left and right of the missing pixel, or they may be positioned on one side only. They may be distributed two-dimensionally, as shown in 30(b).

The operation of the left-right mean interpolation calculation circuit 6(0), the first mean preserving interpolation calculation circuit 6(1) to the nth mean preserving interpolation calculation circuit 6(n), and the marking circuit 8 with respect to test pixels T1 to Tm will be described with reference to FIGS. 29 and 30(a).

First, test pixel T1 is assumed to be missing, and the left-right mean interpolation calculation circuit 6(0) outputs test interpolation data TD0[T1] at the location of test pixel T1. More specifically, the left-right mean interpolation calculation circuit 6(0) obtains the mean value of the pixels adjacent to test pixel T1, and outputs the obtained value as the interpolation data for test pixel T1.

The marking circuit 8 obtains the absolute value of the difference between the value DI[T1] of the input image data DI at the location of test pixel T1 and the value of test interpolation data TD0[T1], and outputs it as marking data M0[T1]. The marking data M0[T1] can be expressed as follows:

$$M0[T1]=|TD0[T1]-DI[T1]|$$

Marking data M0[T1] having a small value show that the test interpolation data are similar to the input image, and that the calculation method of the left-right mean interpolation calculation circuit 6(0) is suitable for test pixel T1. Marking data M0[T1] having a large value show that the calculation method of the left-right mean interpolation calculation circuit 6(0) is unsuitable for test pixel T1. Marking data M0[T1] thus indicate the suitability of the left-right mean interpolation calculation circuit 6(0) for test pixel T1.

The left-right mean interpolation calculation circuit 6(0) next outputs test interpolation data TD0[T2] for test pixel T2 in the same way, assuming test pixel T2 to be missing. The marking circuit 8 obtains the absolute value of the difference between the value DI[T2] of the input image data DI at the location of test pixel T2 and the value of test interpolation data TD0[T2], and outputs it as marking data M0[T2]. The marking data M0[T2] can be expressed as follows:

$$M0[T2]=|TD0[T2]-DI[T2]|$$

Marking data M0[T2] indicate the suitability of the left-right mean interpolation calculation circuit 6(0) for test pixel T2.

Similarly, the left-right mean interpolation calculation circuit 6(0) outputs test interpolation data TD0[T3] to TD0[Tm] for the remaining test pixels T3 to Tm. The marking circuit 8 obtains the absolute values of the differences between the values of test interpolation data TD0[T3] to TD0[Tm] and the values DI[T3] to DI[Tm] of the input image data DI corresponding to each test interpolation result, and outputs the obtained values as marking data M0[T3] to M0[Tm]. The marking data M0[T3] to M0[Tm] can be expressed as follows:

$$M0[T3]=|TD0[T3]-DI[T3]|$$

$$M0[Tm]=|TD0[Tm]-DI[Tm]|$$

Marking data M0[T3] to M0[Tm] indicate the suitability of the left-right mean interpolation calculation circuit 6(0) for test pixels T3 to Tm.

The marking data relating to the test interpolation data for test pixels T1 to Tm output by the left-right mean interpolation calculation circuit 6(0) are obtained as described above.

In the same way, the first mean preserving interpolation calculation circuit 6(1) outputs test interpolation data TD1 [T1] at the location of test pixel T1, assuming test pixel T1 to be missing. The marking circuit 8 obtains the absolute value of the difference between the value DI[T1] of the input image data DI at the location of test pixel T1 and the value of test interpolation data TD1[T1], and outputs it as marking data M1[T1]. The marking data M1[T1] can be expressed as follows:

$$M1[T1]=|TD1[T1]-DI[T1]|$$

Marking data M1[T1] indicate the suitability of the first mean preserving interpolation calculation circuit 6(1) for test pixel T1.

Similarly, the first mean preserving interpolation calculation circuit 6(1) outputs test interpolation data TD1[T2] to TD1[Tm] for the remaining test pixels T2 to Tm. The marking circuit 8 obtains the absolute values of the differences between the values of test interpolation data TD1[T2] to TD1[Tm] and the values DI[T2] to DI[Tm] of the input image data DI corresponding to each test interpolation result, and outputs the obtained values as marking data M1[T2] to M1[Tm]. Marking data M1[T2] to M1[Tm] can be expressed as follows:

$$M1[T2]=|TD1[T2]-DI[T2]|$$

$$M1[Tm]=|TD1[Tm]-DI[Tm]|$$

Marking data M1[T2] to M1[Tm] indicate the suitability of the first mean preserving interpolation calculation circuit 6(1) for test pixels T2 to Tm.

In the same way, the second mean preserving interpolation calculation circuit 6(2) to the nth mean preserving interpolation calculation circuit 6(n) output test interpolation data TD2[T1] . . . TD2[Tm] to TDn[T1] . . . TDn[Tm]; the marking circuit 8 outputs marking data M2[T1] . . . M2[Tm] to Mn[T1] . . . Mn[Tm] based on the test interpolation data TD2[T1] . . . TD2[Tm] to TDn[T1] . . . TDn[Tm].

The suitablity of each of the interpolation calculation circuits, the left-right mean interpolation calculation circuit 6(0) and the first mean preserving interpolation calculation circuit 6(1) to the nth mean preserving interpolation calculation circuit 6(n), is thus determined for each of the test pixels T1 to Tm.

FIG. 31 is a table showing the marking data for each interpolation circuit with respect to test pixels T1 to Tm.

Using the absolute values of the differences between the values of the test interpolation data for the test pixels and the values of the input image data at the locations of the test pixels makes it possible to indicate the suitability of the different interpolation methods for each test pixel.

The operation of the management circuit 7 will now be described.

The management circuit 7 evaluates the suitability of the left-right mean interpolation calculation circuit 6(0) in the neighborhood of the missing pixel by adding the values of marking data M0[T1] to M0[Tm] to generate score data S0 for the left-right mean interpolation calculation circuit 6(0). The score data S0 can be expressed as follows:

$$S0=M0[T1]+M0[T2]+\ldots+M0[Tm]$$

Score data S0 having a small value show that the calculation method of the left-right mean interpolation calculation circuit 6(0) is suitable in the neighborhood of the missing pixel. Score data S0 having a large value show that the calculation method of the left-right mean interpolation calculation circuit 6(0) is unsuitable in the neighborhood of the missing pixel.

Similarly, the management circuit 7 evaluates the suitability of the first mean preserving interpolation calculation circuit 6(1) to the nth mean preserving interpolation calculation circuit 6(n) in the neighborhood of the missing pixel by adding the values of marking data M1[T1] ... M1[Tm] to Mn[T1] ... Mn[Tm] to generate score data S1 to Sn for the first mean preserving interpolation calculation circuit 6(1) to the nth mean preserving interpolation calculation circuit 6(n). Score data S1 to Sn can be expressed as follows:

$$S1=M1[T1]+M1[T2]+\ldots+M2[Tm]$$

$$Sn=Mn[T1]+Mn[T2]+\ldots+Mn[Tm]$$

Figure 32:
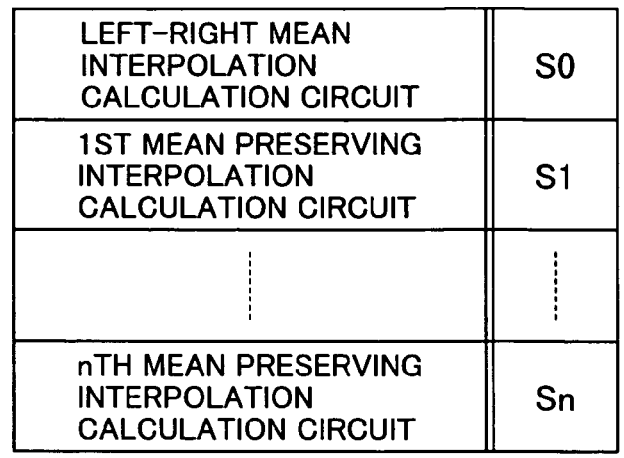
FIG. 32 is a table showing summarized evaluation results for the interpolation calculation circuits in the pixel interpolation circuit in the sixth embodiment.

FIG. 32 is a table showing score data S0 to Sn.

Adding the values of the marking data for each test pixel makes it possible to indicate the suitability of the interpolation methods in the neighborhood of the missing pixel.

If the score data of an interpolation calculation circuit have a small value, then the interpolation calculation circuit can interppolate pixels properly in the neighborhood of the missing pixel, and by inference, it can also correctly carry out interpolation for the missing pixel. The management circuit 7 determines the content of the selection signal C so as to select the interpolation data output by the interpolation calculation circuit having the score data with the smallest value among the score data S0 to Sn. The selection signal C with content determined as above is used in the output circuit 5 in the following interpolation process.

The interpolation process will now be described. In the interpolation process, the marking circuit 8 does not operate. The management circuit 7 does not operate other than to continue outputting the selection signal C with the content determined in the evaluation process. The operation of the interpolation calculation circuits 6(0) to 6(n) in the interpolation process is the same as the operation described with reference to FIG. 21. More specifically, the control circuit 20 causes the incomplete total calculation circuits in the plurality of mean preserving interpolation calculation circuits 6(1) to 6(n) to receive the pixels constituting the group of pixels including the missing pixel, causes the complete total calculation circuits to receive the pixels constituting the group of pixels not including the missing pixel, and causes the mean preserving interpolation calculation circuits to perform interpolation calculations for the missing pixel and output interpolation data D1 to Dn. The control circuit 20 further causes the left-right mean interpolation calculation circuit 6(0) to receive the pixels adjacent to the missing pixel, perform adjacent pixel mean interpolation calculation for the missing pixel, and output interpolation data D0. The control circuit 20 causes the output circuit 5 to select and output the interpolation data from one of the plurality of interpolation calculation circuits (6(0) to 6(n)) according to the selection signal C. The output circuit 5 thus selects one of the interpolation data D0 to Dn output by the left-right mean interpolation calculation circuit 6(0) and the first mean preserving interpolation calculation circuit 6(1) to the nth mean preserving interpolation calculation circuit 6(n) according to the selection signal C output by the management circuit 7, and outputs the selected data as output data DO.

When interpolation of one missing pixel has been completed in the above manner, interpolation of the next missing pixel is carried out.

The pixel interpolation circuit in FIG. 29 marks the test interpolation data output by the left-right mean interpolation calculation circuit 6(0) and the first mean preserving interpolation calculation circuit 6(1) to the nth mean preserving interpolation calculation circuit 6(n) for the pixels in the neighborhood of the missing pixel, and evaluates the results to determine the interpolation calculation method suitable for the missing pixel; it is therefore possible to interpolate the missing pixel by using an interpolation method suitable for the image in the neighborhood of the missing pixel.

A specific example will be described below.

Figure 33:
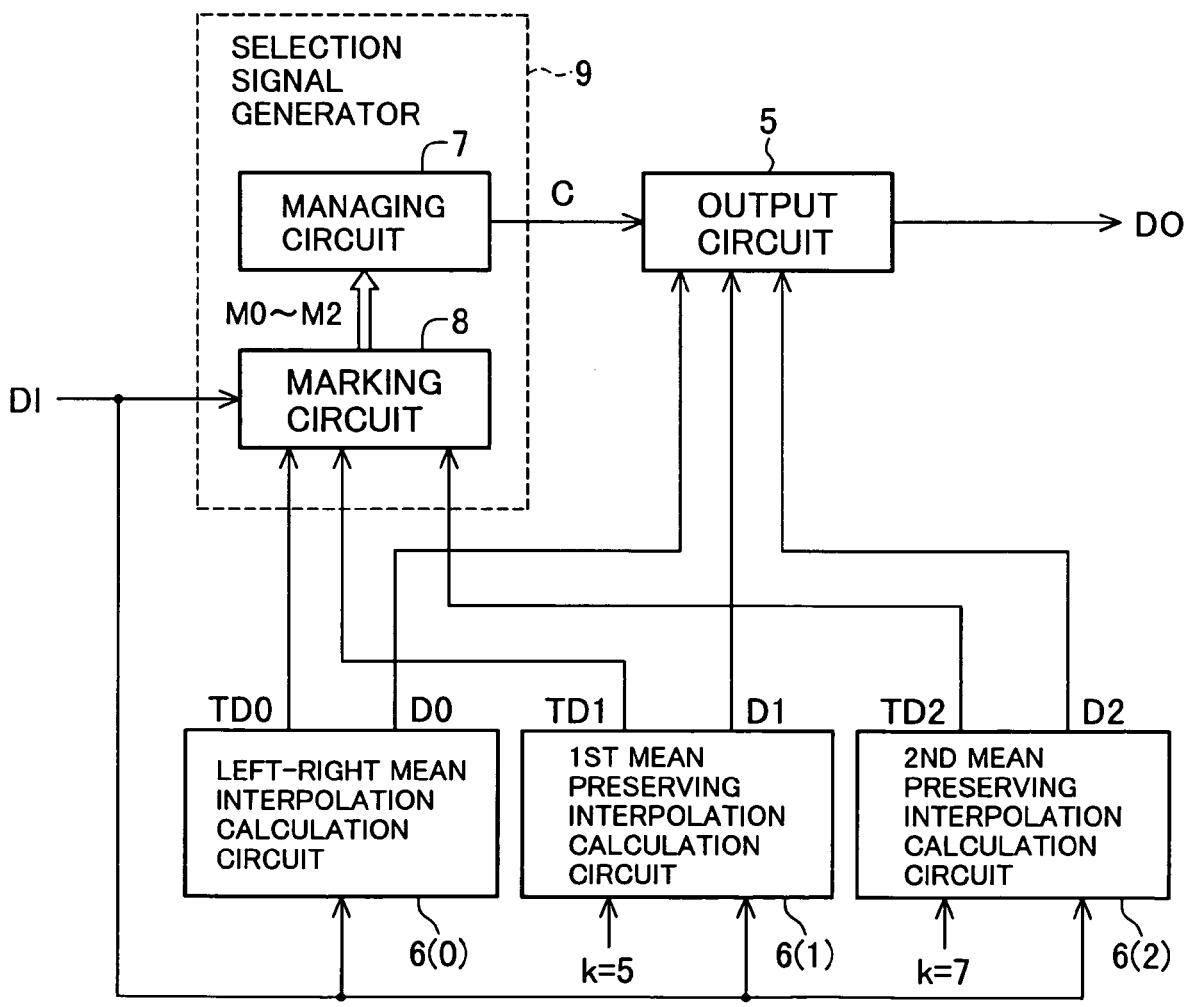
FIG. 33 is a block diagram showing a specific example of a pixel interpolation circuit in the sixth embodiment.

FIG. 33 shows the structure of a pixel interpolation circuit in which a first mean preserving interpolation calculation circuit with parameter k set to five (k=5) and a second mean preserving interpolation calculation circuit with parameter k set to seven (k=7) constitute the plurality of mean preserving interpolation calculation circuits in FIG. 29.

The structure of the exemplary pixel interpolation circuit in FIG. 33 will be described.

The exemplary pixel interpolation circuit in FIG. 33 has an output circuit 5, a left-right mean interpolation calculation circuit 6(0), a first mean preserving interpolation calculation circuit 6(1), a second mean preserving interpolation calculation circuit 6(2), a management circuit 7, and a marking circuit 8. A control circuit 20 and an image data memory 21, similar to those in 29, are also provided (not shown).

An input image DI is input to the left-right mean interpolation calculation circuit 6(0), the first mean preserving interpolation calculation circuit 6(1), the second mean preserving interpolation calculation circuit 6(2), and the marking circuit 8. The left-right mean interpolation calculation circuit 6(0) outputs interpolation data TD0 and interpolation data D0 based on the input image DI. The test interpolation data TD0 output by the left-right mean interpolation calculation circuit 6(0) are input to the marking circuit 8; the interpolation data D0 are input to the output circuit 5.

A parameter k equal to five (k=5) is input to the first mean preserving interpolation calculation circuit 6(1). The first mean preserving interpolation calculation circuit 6(1) outputs interpolation data TD1 and interpolation data D1 based on the input image DI and the parameter k set to five. The test interpolation data TD1 output by the mean preserving interpolation calculation circuit 6(1) are input to the marking circuit 8; the interpolation data D1 are input to the output circuit 5.

A parameter k equal to seven (k=7) is input to the second mean preserving interpolation calculation circuit 6(2). The second mean preserving interpolation calculation circuit 6(2) outputs interpolation data TD2 and interpolation data D2 based on the input image DI and the parameter k set to seven. The test interpolation data TD2 output by the second mean preserving interpolation calculation circuit 6(2) are input to the marking circuit 8; the interpolation data D2 are input to the output circuit 5.

The marking circuit 8 marks the test interpolation data TD0 output by the left-right mean interpolation calculation circuit 6(0) based on the input image DI, and outputs the result as marking data M0.

The marking circuit 8 marks the test interpolation data TD1 output by the first mean preserving interpolation calculation circuit 6(1) based on the input image DI, and outputs the result as marking data M1.

The marking circuit 8 marks the test interpolation data TD2 output by the second mean preserving interpolation calculation circuit 6(2) based on the input image DI, and outputs the result as marking data M2. The marking data M0 to M2 output by the marking circuit 8 are input to the management circuit 7.

The management circuit 7 outputs a selection signal C based on the marking data M0 to M2 output by the marking circuit 8. The selection signal C output by the management circuit 7 is input to the output circuit 5.

The output circuit 5 selects one of the interpolation data D0 to D2 output by the left-right mean interpolation calculation circuit 6(0), the first mean preserving interpolation calculation circuit 6(1), and the second mean preserving interpolation calculation circuit 6(2) according to the selection signal C output by the management circuit 7, and outputs the selected data as output data DO.

Figure 34A:
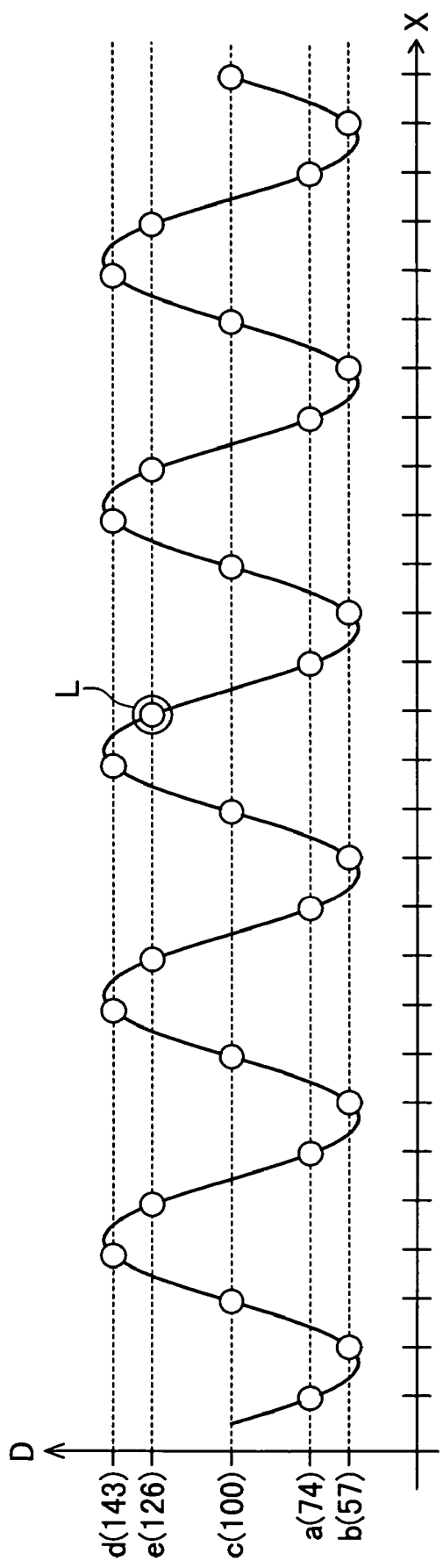
FIG. 34(a) is a waveform diagram showing exemplary pixel data processed in the pixel interpolation circuit in the sixth embodiment.
Figure 34B:
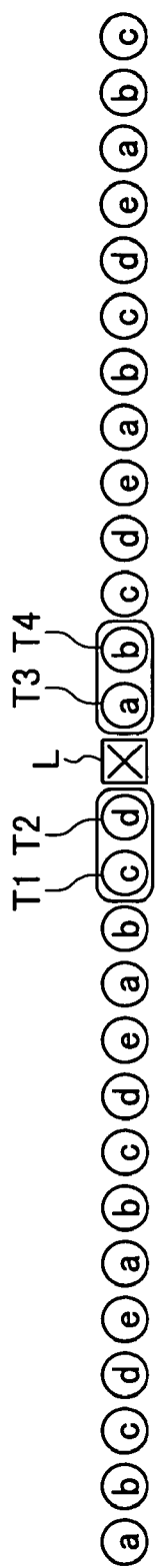
FIG. 34(b) shows a missing pixel and neighboring test pixels.

FIGS. 34(*a*) and 34(*b*) show exemplary periodic image data. FIG. 34(*a*), like FIG. 3, is a waveform diagram illustrating the relationship between pixel position and pixel intensity in image data with a pixel period of five; the data repeat the intensity values 74, 57, 100, 143, and 126 (a=74, b=57, c=100, d=143, e=126). FIG. 34(*b*) illustrates the positional relationship between the missing pixel and the test pixels. Test pixels T1 to T4 corresponding to the missing pixel L are positioned one dimensionally, two pixels each on the left and right of the missing pixel L.

Figure 35A:
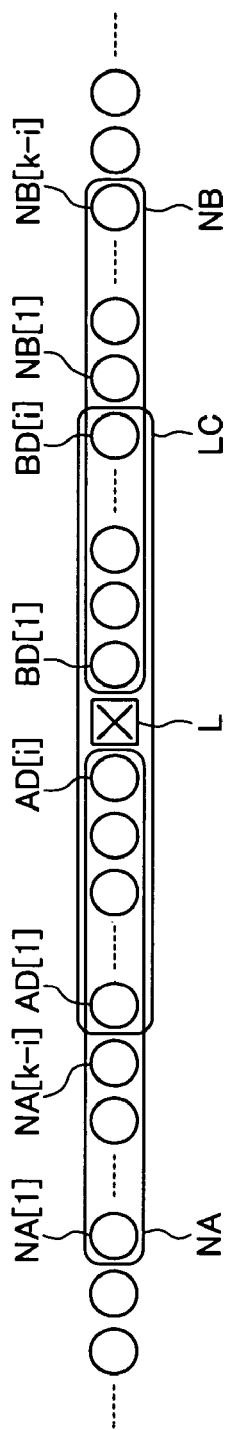
FIGS. 35(a) to 35(c) each show a pixel sequence processed in the pixel interpolation circuit in the sixth embodiment.
Figure 35B:
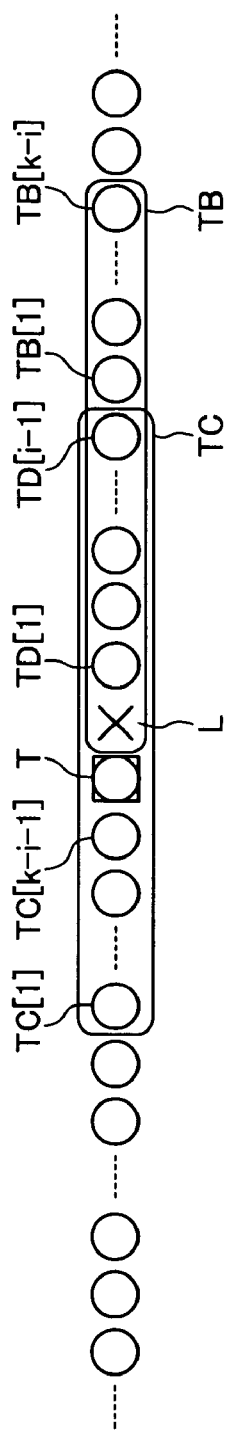
Figure 35C:
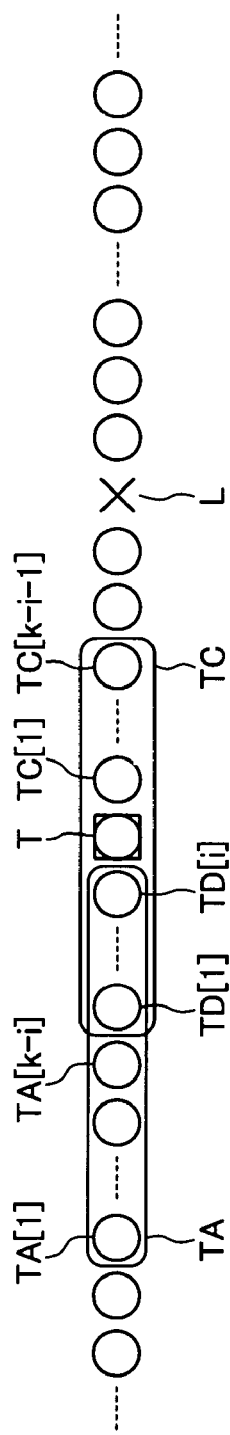
Figure 36A:
FIGS. 36(a) to 36(e) each show a missing pixel and neighboring test pixels in a series of pixels processed in the pixel interpolation circuit in the sixth embodiment.
Figure 36B:
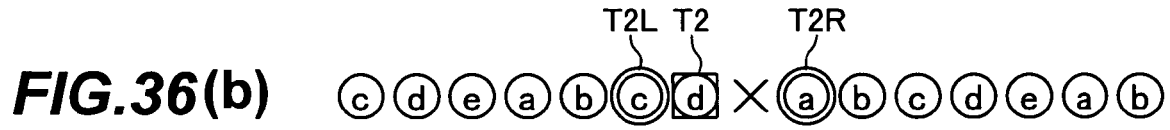
Figure 36C:
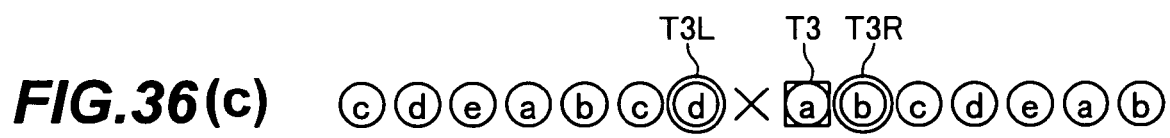
Figure 36D:
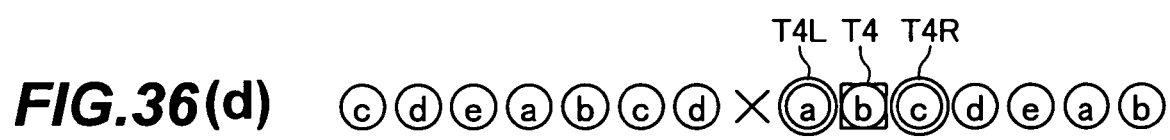
Figure 36E:
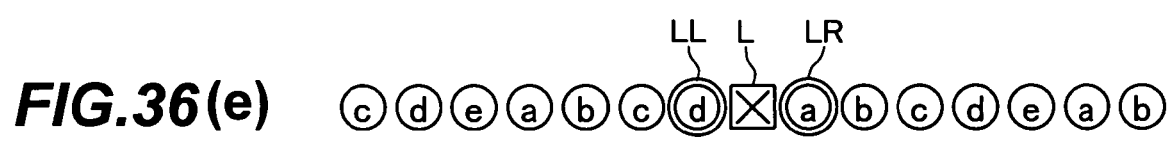

FIGS. 35(*a*) to 35(*c*) illustrate test interpolation by the mean preserving interpolation calculation circuit 12.

FIG. 35(*a*) illustrates the positional relationships among the pixel sequence LC including the missing pixel and the pixel sequences NA and NB not including the missing pixel in the mean preserving interpolation calculation circuit described in the third embodiment, in which the pixel sequence including the missing pixel overlaps the two pixel sequences not including the missing pixel. FIGS. 35(*b*) and 35(*c*) illustrate test interpolation, in which the test pixel T is assumed to be the missing pixel. FIG. 35(*b*) shows the position of the pixel sequence TB not including the test pixel when the missing pixel is included in the pixel sequence TC including the test pixel; FIG. 35(*c*) shows the position of the pixel sequence TA not including the test pixel when the missing pixel is not included in the pixel sequence TC including the test pixel.

Test interpolation by the mean preserving interpolation calculation circuit will now be described.

When pixels in the neighborhood of the missing pixel are interpolated, the mean preserving interpolation calculation circuit needs to change the interpolation method according to the position of the missing pixel. In test interpolation, only one of the two pixel sequences not including the test pixel is used.

When the missing pixel L is included in the pixel sequence TC including the test pixel T as shown in FIG. 35(*b*), the mean preserving interpolation calculation circuit needs to generate an equation taking into account the missing pixel L. If the pixel sequence TB not including the test pixel T is positioned to include the missing pixel L so that the missing pixel is included in both the pixel sequence TC with the test pixel and the pixel sequence TB without the test pixel, the value of the missing pixel cancels out in the equation, and accordingly the test interpolation data for the test pixel T can be obtained correctly. The equation is:

$$(TC[1] + \ldots + TC[k-i-1] + T + L + TD[1] + \ldots + TD[i-1])/k =$$
$$(L + TD[1] + \ldots + TD[i-1] + TB[1] + \ldots + TB[k-i])/k$$

The value given to the test pixel T is:

$$T = (TB[1] + \ldots + TB[k-i]) - (TC[1] + \ldots + TC[k-i-1])$$

When the missing pixel L is not included in the pixel sequence TC including the test pixel as shown in FIG. 35(*c*), the pixel sequences are positioned so that the pixel sequence TA not including the test pixel also does not include the missing pixel. The equation generated in the mean preserving interpolation calculation circuit is:

$$(TA[1] + \ldots + TA[k-i] + TD[1] + \ldots + TD[i])/k =$$
$$(TD[1] + \ldots + TD[i] + T + TC[1] + \ldots + TC[k-i-1])$$

The value given to the test pixel T is:

$$T = (TA[1] + \ldots + TA[k-i]) - (TC[1] + \ldots + TC[k-i-1])$$

Thus, each mean preserving interpolation calculation circuit can be correctly marked by using test interpolation methods that take into account the position of the missing pixel.

FIGS. 36(*a*) to 36(*e*) illustrate the operation of the left-right mean interpolation calculation circuit 6(0) and the marking circuit 8 with respect to test pixels T1 to T4 and the missing pixel L. FIG. 36(*a*) illustrates the calculation of test interpolation data for T1 in the left-right mean interpolation calculation circuit 6(0); FIG. 36(*b*) illustrates the calculation of test interpolation data for T2 in the left-right mean interpolation calculation circuit 6(0); FIG. 36(*c*) illustrates the calculation of test interpolation data for T3 in the left-right mean interpolation calculation circuit 6(0); FIG. 36(*d*) illustrates the calculation of test interpolation data for T4 in the left-right mean interpolation calculation circuit 6(0); and FIG. 36(*e*) illustrates the calculation of test interpolation data for the missing pixel L in the left-right mean interpolation calculation circuit 6(0).

The operation of the left-right mean interpolation calculation circuit 6(0) and the marking circuit 8 with respect to test pixels T1 to T4 and the missing pixel L will now be described.

The left-right mean interpolation calculation circuit 6(0) outputs the mean value of pixels T1L and T1R, shown in FIG. 36(*a*), as test interpolation data TD0[T1] for test pixel T1. From T1L=b=57 and T1R=d=143, it follows that the value of test interpolation data TD0[T1] is:

$$TD0[T1] = (T1L + T1R)/2 = (57 + 143)/2 = 100$$

The marking circuit 8 outputs the absolute value of the difference between the value DI[T1] of the input image data DI at the location of test pixel T1 and the value of test interpolation data TD0[T1] as marking data M0[T1]. From TD0[T1]=100 and DI[T1]=c=100, it follows that the value of marking data M0[T1] is:

$$M0[T1] = |TD0[T1] - DI[T1]| = |100 - 100| = 0$$

The left-right mean interpolation calculation circuit 6(0) outputs the mean value of pixels T2L and T2R, shown in FIG. 36(*b*), as test interpolation data TD0[T2] for test pixel T2. From T2L=c=100 and T2R=a=74, it follows that the value of test interpolation data TD0[T2] is:

$$TD0[T2]=(T2L+T2R)/2=(100+74)/2=87$$

The marking circuit 8 outputs the absolute value of the difference between the value DI[T2] of the input image data DI at the location of test pixel T2 and the value of test interpolation data TD0[T2] as marking data M0[T2]. From TD0[T2]=87 and DI[T2]=d=143, it follows that the value of marking data M0[T2] is:

$$M0[T2]=|TD0[T2]-DI[T2]|=|87-143|=56$$

The left-right mean interpolation calculation circuit 6(0) outputs the mean value of pixels T3L and T3R, shown in FIG. 36(*c*), as test interpolation data TD0[T3] for test pixel T3. From T3L=d=143 and T3R=b=57, it follows that the value of test interpolation data TD0[T3] is:

$$TD0[T3]=(T3L+T3R)/2=(143+57)/2=100$$

The marking circuit 8 outputs the absolute value of the difference between the value DI[T3] of the input image data DI at the location of test pixel T3 and the value of test interpolation data TD0[T3] as marking data M0[T3]. From TD0[T3]=100 and DI[T3]=a=74, it follows that the value of marking data M0[T3] is:

$$M0[T3]=|TD0[T3]-DI[T3]|=|100-74|=26$$

The left-right mean interpolation calculation circuit 6(0) outputs the mean value of pixels T4L and T4R, shown in FIG. 36(*d*), as test interpolation data TD0[T4] for test pixel T4. From T4L=a=74 and T4R=c=100, it follows that the value of test interpolation data TD0[T4] is:

$$TD0[T4]=(T4L+T4R)/2=(74+100)/2=87$$

The marking circuit 8 outputs the absolute value of the difference between the value DI[T4] of the input image data DI at the location of test pixel T4 and the value of test interpolation data TD0[T4] as marking data M0[T4]. From TD0[T4]=87 and DI[T4]=b=57, it follows that the value of marking data M0[T4] is:

$$M0[T4]=|TD0[T4]-DI[T4]|=|87-57|=30$$

The left-right mean interpolation calculation circuit 6(0) outputs the mean value of the pixels LL and LR adjacent to the missing pixel L, shown in FIG. 36(*e*), as interpolation data D0 for the missing pixel L. From LL=d=143 and LR=a=74, the value of interpolation data D0 is:

$$D0=(LL+LR)/2=(143+74)/2=108.5$$

FIGS. 37(*a*) to 37(*e*) illustrate the operation of the first mean preserving interpolation calculation circuit 6(1) and the marking circuit 8 with respect to test pixels T1 to T4 and the missing pixel L. FIG. 37(*a*) illustrates the calculation of test interpolation data for T1 in the first mean preserving interpolation calculation circuit 6(1); FIG. 37(*b*) illustrates the calculation of test interpolation data for T2 in the first mean preserving interpolation calculation circuit 6(1); FIG. 37(*c*) illustrates the calculation of test interpolation data for T3 in the first mean preserving interpolation calculation circuit 6(1); FIG. 37(*d*) illustrates the calculation of test interpolation data for T4 in the first mean preserving interpolation calculation circuit 6(1); and FIG. 37(*e*) illustrates the calculation of test interpolation data for the missing pixel L in the first mean preserving interpolation calculation circuit 6(1).

The operation of the first mean preserving interpolation calculation circuit 6(1) and the marking circuit 8 with respect to test pixels T1 to T4 and the missing pixel L will now be described.

As shown in FIG. 37(*a*), the first mean preserving interpolation calculation circuit 6(1) obtains test interpolation data TD1[T1] for test pixel T1 such that the mean value of the pixel sequence T1C including the test pixel T1 is equal to the mean value of the pixel sequence T1B not including the test pixel T1. From the equation $$(T1C[1] + T1C[2] + TD1[T1] + T1D[1] + L)/5 =$$
$$(T1D[1] + L + T1B[1] + T1B[2] + T1B[3])/5$$

it follows that the value of test interpolation data TD1[T1] is:

$$TD1[T1] = (T1B[1] + T1B[2] + T1B[3]) - (T1C[1] + T1C[2])$$

From $T1C[1] = a = 74$, $T1C[2] = b = 57$, $T1B[1] = a = 74$, $T1B[2] = b = 57$, and $T1B[3] = c = 100$, it follows that:

$$TD1[T1] = (74 + 57 + 100) - (74 + 57) = 100$$

The marking circuit 8 outputs the absolute value of the difference between the value DI[T1] of the input image data DI at the location of test pixel T1 and the value of test interpolation data TD1[T1] as marking data M1[T1]. From TD1[T1]=100 and DI[T1]=c=100, it follows that the value of marking data M1[T1] is:

$$M1[T1]=|TD1[T1]-DI[T1]|=|100-100|=0$$

As shown in FIG. 37(*b*), the first mean preserving interpolation calculation circuit 6(1) obtains test interpolation data TD1[T2] for test pixel T2 such that the mean value of the pixel sequence T2C including the test pixel T2 is equal to the mean value of the pixel sequence T2B not including the test pixel T2. From the equation $$(T2C[1] + T2C[2] + TD1[T2] + L + T2D[1])/5 =$$
$$(L + T2D[1] + T2B[1] + T2B[2] + T2B[3])/5$$

it follows that the value of test interpolation data TD1[T2] is:

$$TD1[T2]=(T2B[1]+T2B[2]+T2B[3])-(T2C[1]+T2C[2])$$

From T2C[1]=b=57, T2C[2]=c=100, T2B[1]=b=57, T2B[2]=c=100, and T2B[3]=d=143, it follows that:

$$TD1[T2]=(57+100+143)-(57+100)=143$$

The marking circuit 8 outputs the absolute value of the difference between the value DI[T2] of the input image data DI at the location of test pixel T2 and the value of test interpolation data TD1[T2] as marking data M1[T2]. From TD1[T2]=143 and DI[T2]=d=143, it follows that the value of marking data M1[T2] is:

$$M1[T2]=|TD1[T2]-DI[T2]|=|143-143|=0$$

Figure 37A:
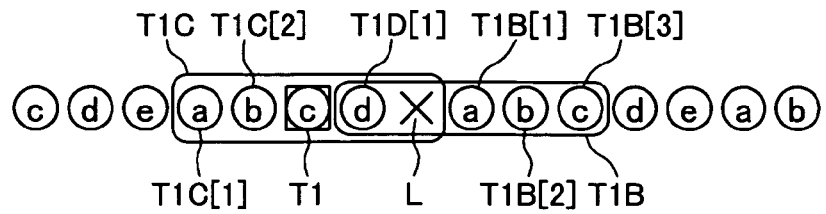
FIGS. 37(a) to 37(e) each show a missing pixel and neighboring test pixels in a series of pixels processed in the pixel interpolation circuit in the sixth embodiment.
Figure 37B:
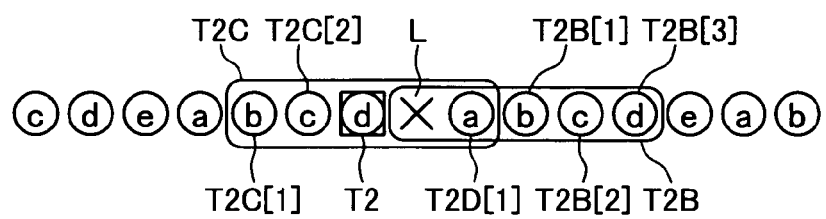
Figure 37C:
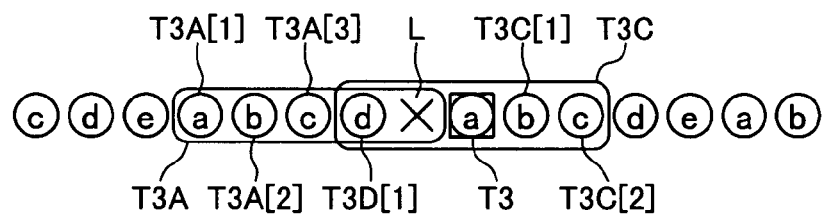

As shown in FIG. 37(c), the first mean preserving interpolation calculation circuit 6(1) obtains test interpolation data TD1[T3] for test pixel T3 such that the mean value of the pixel sequence T3C including the test pixel T3 is equal to the mean value of the pixel sequence T3A not including the test pixel T3. From the equation $$(T3A[1]+T3A[2]+T3A[3]+T3D[1]+L)/5 =$$
$$(T3D[1]+L+TD1[T3]+T3C[1]+T3C[2])/5$$

it follows that the value of test interpolation data TD1[T3] is:

$$TD1[T3]=(T3A[1]+T3A[2]+T3A[3])-(T3C[1]+T3C[2])$$

From T3C[1]=b=57, T3C[2]=C=100, T3A[1]=a=74, T3A[2]=b=57, and T3A[3]=c=100, it follows that:

$$TD1[T3]=(74+57+100)-(57+100)=74$$

The marking circuit 8 outputs the absolute value of the difference between the value DI[T3] of the input image data DI at the location of test pixel T3 and the value of test interpolation data TD1[T3] as marking data M1[T3]. From TD1[T3]=74 and DI[T3]=a=74, it follows that the value of marking data M1[T3] is:

$$M1[T3]=|TD1[T3]-DI[T3]|=|74-74|=0$$

Figure 37D:
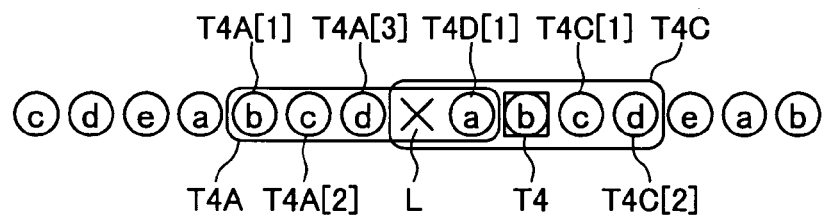

As shown in FIG. 37(d), the first mean preserving interpolation calculation circuit 6(1) obtains test interpolation data TD1[T4] for test pixel T4 such that the mean value of the pixel sequence T4C including the test pixel T4 is equal to the mean value of the pixel sequence T4A not including the test pixel T4. From the equation $$(T4A[1]+T4A[2]+T4A[3]+L+T4D[1])/5 =$$
$$(L+T4D[1]+TD1[T4]+T4C[1]+T4C[2])/5$$

it follows that the value of test interpolation data TD1[T4] is:

$$TD1[T4]=(T4A[1]+T4A[2]+T4A[3])-(T4C[1]+T4C[2])$$

From T4C[1]=c=100, T4C[2]=d=143, T4A[1]=b=57, T4A[2]=c=100, and T4A[3]=d=143, it follows that:

$$TD1[T1]=(57+100+143)-(100+143)=57$$

The marking circuit 8 outputs the absolute value of the difference between the value DI[T4] of the input image data DI at the location of test pixel T4 and the value of test interpolation data TD1[T4] as marking data M1[T4]. From TD1[T4]=57 and DI[T4]=b=57, it follows that the value of marking data M1[T4] is:

$$M1[T4]=|TD1[T4]-DI[T4]|=|57-57|=0$$

Figure 37E:
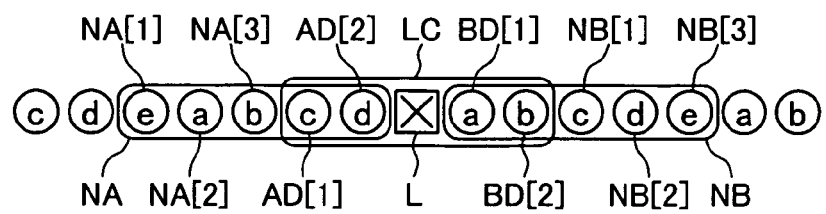

As shown in FIG. 37(e), the first mean preserving interpolation calculation circuit 6(1) obtains interpolation data D1 for the missing pixel L such that the mean value of the pixel sequence LC including the missing pixel L is equal to the mean value of the pixel sequences NA and NB not including the missing pixel L. From the equation $$(AD[1]+AD[2]+D1+BD[1]+BD[2])/5 =$$
$$((NA[1]+NA[2]+NA[3]+AD[1]+AD[2])/5 +$$
$$(BD[1]+BD[2]+NB[1]+NB[2]+NB[3])/5)/2$$

it follows that the value of interpolation data D1 is:

$$D1 = ((NA[1]+NA[2]+NA[3]+AD[1]+AD[2]) +$$
$$(BD[1]+BD[2]+NB[1]+NB[2]+NB[3]))/2 -$$
$$(AD[1]+AD[2]+BD[1]+BD[2])$$

From NA[1]=e=126, NA[2]=a=74, NA[3]=b=57, AD[1]=c=100, AD[2]=d=143, BD[1]=a=74, BD[2]=b=57, NB[1]=c=100, NB[2]=d=143, and NB[3]=e=126, it follows that:

$$D1 = ((126+74+57+100+143) +$$
$$(74+57+100+143+126))/2 -$$
$$(100+143+74+57)$$
$$= 126$$

Figure 38A:
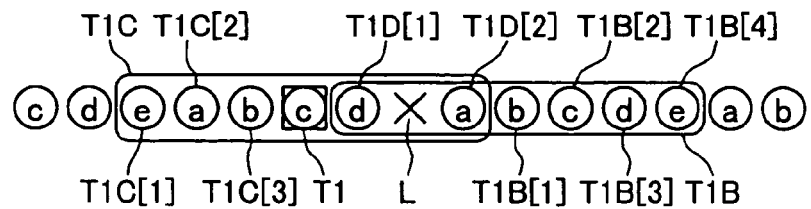
FIGS. 38(a) to 38(e) each show a missing pixel and neighboring test pixels in a series of pixels processed in the pixel interpolation circuit in the sixth embodiment.
Figure 38B:
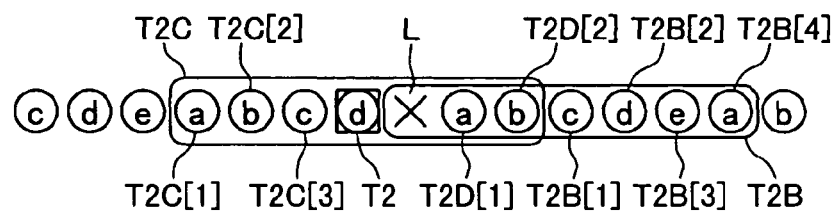
Figure 38C:
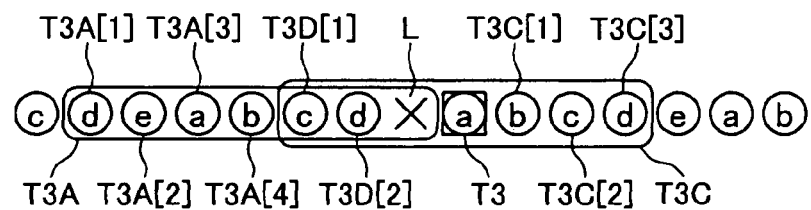
Figure 38D:
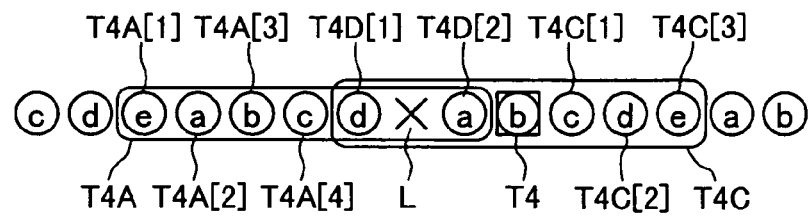
Figure 38E:
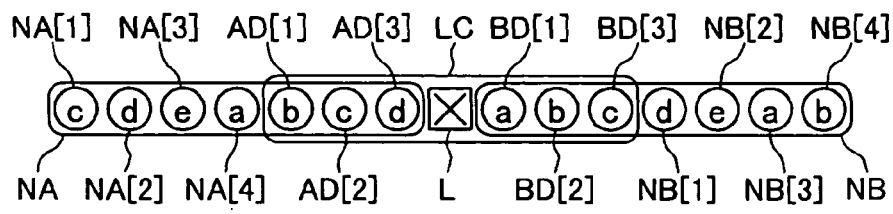

FIGS. 38(a) to 38(e) illustrate the operation of the second mean preserving interpolation calculation circuit 6(2) and the marking circuit 8 with respect to test pixels T1 to T4 and the missing pixel L. FIG. 38(a) illustrates the calculation of test interpolation data for T1 in the second mean preserving interpolation calculation circuit 6(2); FIG. 38(b) illustrates the calculation of test interpolation data for T2 in the second mean preserving interpolation calculation circuit 6(2); FIG. 38(c) illustrates the calculation of test interpolation data for T3 in the second mean preserving interpolation calculation circuit 6(2); FIG. 38(d) illustrates the calculation of test interpolation data for T4 in the second mean preserving interpolation calculation circuit 6(2); and FIG. 38(e) illustrates the calculation of test interpolation data for the missing pixel L in the second mean preserving interpolation calculation circuit 6(2).

The operation of the second mean preserving interpolation calculation circuit 6(2) and the marking circuit 8 with respect to test pixels T1 to T4 and the missing pixel L will now be described.

As shown in FIG. 38(a), the second mean preserving interpolation calculation circuit 6(2) obtains test interpolation data TD2[T1] for test pixel T1 such that the mean value of the pixel sequence T1C including the test pixel T1 is equal to the mean value of the pixel sequence T1B not including the test pixel T1. From the equation $$(T1C[1] + T1C[2] + T1C[3] + TD2[T1] + T1D[1] + L + T1D[2])/7 =$$
$$(T1D[1] + L + T1D[2] + T1B[1] + T1B[2] + T1B[3] + T1B[4])/7$$

it follows that the value of test interpolation data TD2[T1] is:

$$TD2[T1] =$$
$$(T1B[1] + T1B[2] + T1B[3] + T1B[4]) - (T1C[1] + T1C[2] + T1C[3])$$

From T1C[1]=e=126, T1C[2]=a=74, T1C[3]=b=57, T1B[1]=b=57, T1B[2]=C=100, T1B[3]=d=143, and T1B[4]=e=126, it follows that:

$$TD2[T1]=(57+100+143+126)-(126+74+57)=169$$

The marking circuit 8 outputs the absolute value of the difference between the value DI[T1] of the input image data DI at the location of test pixel T1 and the value of test interpolation data TD2[T1] as marking data M2[T1]. From TD2[T1]=169 and D1[T1]=c=100, it follows that the value of marking data M2[T1] is:

$$M2[T1]=|TD2[T1]-DI[T1]|=|169-100|=69$$

As shown in FIG. 38(*b*), the second mean preserving interpolation calculation circuit 6(2) obtains test interpolation data TD2[T2] for test pixel T2 such that the mean value of the pixel sequence T2C including the test pixel T2 is equal to the mean value of the pixel sequence T2B not including the test pixel T2. From the equation $$(T2C[1] + T2C[2] + T2C[3] + TD2[T2] + L + T2D[1] + T2D[2])/7 =$$
$$(L + T2D[1] + T2D[2] + T2B[1] + T2B[2] + T2B[3] + T2B[4])/7$$

it follows that the value of test interpolation data TD2[T2] is:

$$TD2[T2] =$$
$$(T2B[1] + T2B[2] + T2B[3] + T2B[4]) - (T2C[1] + T2C[2] + T2C[3])$$

From T2C[1]=a=74, T2C[2]=b=57, T2C[3]=c=100, T2B[1]=c=100, T2B[2]=d=143, T2B[3]=e=126, and T2B[4]=a=74, it follows that:

$$TD2[T2]=(100+143+126+74)-(74+57+100)=212$$

The marking circuit 8 outputs the absolute value of the difference between the value DI[T2] of the input image data DI at the location of test pixel T2 and the value of test interpolation data TD2[T2] as marking data M2[T2]. From TD2[T2]=212 and DI[T2]=d=143, it follows that the value of marking data M2[T2] is:

$$M2[T2]=|TD2[T2]-DI[T2]|-|212-143|=69$$

As shown in FIG. 38(*c*), the second mean preserving interpolation calculation circuit 6(2) obtains test interpolation data TD2[T3] for test pixel T3 such that the mean value of the pixel sequence T3C including the test pixel T3 is equal to the mean value of the pixel sequence T3A not including the test pixel T3. From the equation $$(T3A[1] + T3A[2] + T3A[3] + T3A[4] + T3D[1] + T3D[2] + L)/7 =$$
$$(T3D[1] + T3D[2] + L + TD2[T3] + T3C[1] + T3C[2] + T3C[3])/7$$

it follows that the value of test interpolation data TD2[T3] is:

$$TD2[T3] =$$
$$(T3A[1] + T3A[2] + T3A[3] + T3[4]) - (T3C[1] + T3C[2] + T3C[3])$$

From T3C[1]=b=57, T3C[2]=c=100, T3C[3]=d=143, T3A[1]=d=143, T3A[2]=e=126, T3A[3]=a=74, and T3A[4]=b=57, it follows that:

$$TD2[T3]=(143+126+74+57)-(57+100+143)=100$$

The marking circuit 8 outputs the absolute value of the difference between the value DI[T3] of the input image data DI at the location of test pixel T3 and the value of test interpolation data TD2[T3] as marking data M2[T3].

From TD2[T3]=100, DI[T3]=a=74, it follows that the value of marking data M2[T3] is:

$$M2[T3]=|TD2[T3]-DI[T3]|=|100-74|=26$$

As shown in FIG. 38(*d*), the second mean preserving interpolation calculation circuit 6(2) obtains test interpolation data TD2[T4] for test pixel T4 such that the mean value of the pixel sequence T4C including the test pixel T4 is equal to the mean value of the pixel sequence T4A not including the test pixel T4. From the equation $$(T4A[1] + T4A[2] + T4A[3] + T4A[4] + T4D[1] + L + T4D[2])/7 =$$
$$(T4D[1] + L + T4D[2] + TD2[T4] + T4C[1] + T4C[2] + T4C[3])/7$$

it follows that the value of test interpolation data TD2[T4] is:

$$TD2[T4] =$$
$$(T4A[1] + T4A[2] + T4A[3] + T4A[4]) - (T4C[1] + T4C[2] + T4C[3])$$

From T4C[1]=c=100, T4C[2]=d=143, T4C[3]=e=126, T4A[1]=e=126, T4A[2]=a=74, T4A[3]=b=57, and T4A[4]=c=100, it follows that:

$$TD2[T4]=(126+74+57+100)-(100+143+126)=-12$$

The marking circuit 8 outputs the absolute value of the difference between the value DI[T4] of the input image data DI at the location of test pixel T4 and the value of test interpolation data TD2[T4] as marking data M2[T4]. From TD2[T4]=−12, DI[T4]=b=57, it follows that the value of marking data M2[T4] is:

$$M2[T4]=|TD2[T4]-DI[T4]|=|-12-57|=69$$

As shown in FIG. 38(*e*), the second mean preserving interpolation calculation circuit 6(2) obtains interpolation data D2 for the missing pixel L such that the mean value of the pixel sequence LC including the missing pixel L is equal to the mean value of the pixel sequences NA and NB not including the missing pixel L. From the equation $$(AD[1] + AD[2] + AD[3] + D2 + BD[1] + BD[2] + BD[3])/7 =$$
$$((NA[1] + NA[2] + NA[3] + NA[4] + AD[1] + AD[2] + AD[3])/7 +$$
$$(BD[1] + BD[2] + BD[3] + NB[1] + NB[2] + NB[3] + NB[4])/7)/2$$

it follows that the value of interpolation data D1 is:

$$D2 = ((NA[1] + NA[2] + NA[3] + NA[4] + AD[1] + AD[2] + AD[3]) +$$
$$(BD[1] + BD[2] + BD[3] + NB[1] + NB[2] + NB[3] + NB[4]))/2 -$$
$$(AD[1] + AD[2] + AD[3] + BD[1] + BD[2] + BD[3])$$

From $NA[1] = c = 100$,
$NA[2] = d = 143$,
$NA[3] = e = 126$,
$NA[4] = a = 74$,
$AD[1] = b = 57$,
$AD[2] = c = 100$,
$AD[3] = d = 143$, BD[1]=a=74, BD[2]=b=57, BD[3]=c=100, NB[1]=d=143, NB[2]=e=126, NB[3]=a=74, and NB[4]=b=57, it follows that:

$$D1 = ((100 + 143 + 126 + 74 + 57 + 100 + 143) +$$
$$(74 + 57 + 100 + 143 + 126 + 74 + 57))/2 -$$
$$(57 + 100 + 143 + 74 + 57 + 100) = 156$$

FIG. 39 is a table showing the marking data M0 to M2 for test pixels T1 to T4.

The operation of the management circuit 7 will now be described.

The management circuit 7 generates the sum of the values of marking data M0[T1] to M0[T4] for the left-right mean interpolation calculation circuit 6(0) as score data S0. From M0[T1]=0, M0[T2]=56, M0[T3]=26, and M0[T4]=30, it follows that the value of score data S0 is:

$$S0 = M0[T1] + M0[T2] + M0[T3] + M0[T4]$$
$$= 0 + 56 + 26 + 30$$
$$= 112$$

Similarly, the management circuit 7 generates the sum of the values of marking data M1[T1] to M1[T4] as score data S1 for the first mean preserving interpolation calculation circuit 6(1). From M1[T1]=0, M1[T2]=0, M1[T3]=0, and M1[T4]=0, it follows that the value of score data S1 is:

$$S1 = M1[T1] + M1[T2] + M1[T3] + M1[T4]$$
$$= 0 + 0 + 0 + 0$$
$$= 0$$

In the same way, the management circuit 7 generates the sum of the values of marking data M2[T1] to M2[T4] as score data S2 for the second mean preserving interpolation calculation circuit 6(2). From M2[T1]=69, M2[T2]=69, M2[T3]=26, and M2[T4]=69, it follows that the value of score data S2 is:

$$S2 = M2[T1] + M2[T2] + M2[T3] + M2[T4]$$
$$= 69 + 69 + 26 + 69$$
$$= 233$$

FIG. 40 is a table showing score data S0 to S2 for the left-right mean interpolation calculation circuit 6(0), the first mean preserving interpolation calculation circuit 6(1), and the second mean preserving interpolation calculation circuit 6(2).

If the score data of an interpolation calculation circuit have a small value, then the interpolation calculation circuit can interppolate pixels properly in the neighborhood of the missing pixel, and by inference, it can also correctly carry out interpolation for the missing pixel. The management circuit 7 outputs a selection signal C so as to select the interpolation data output by the first mean preserving interpolation calculation circuit 6(1) having the score data with the smallest value (S1=0) among score data S0 to S2.

Operating according to the selection signal C output by the management circuit 7, the output circuit 5 outputs the value of interpolation data D1 (D1=126). As shown in FIG. 34(*a*), the original data value of the missing pixel L is 126; missing pixel interpolation is thus carried out with minimum error.

The pixel interpolation circuit with the configuration in FIG. 33 is able to carry out missing pixel interpolation properly because it generates test interpolation data for the three interpolation calculation circuits with respect to test pixels T1 to T4 in the neighborhood of the missing pixel L, then marks and evaluates the test interpolation data to select the one of the three interpolation calculation circuits most suitable for the image content.

An example of missing pixel interpolation by the pixel interpolation circuit with the configuration in FIG. 33 for different image data will be described.

Figure 41A:
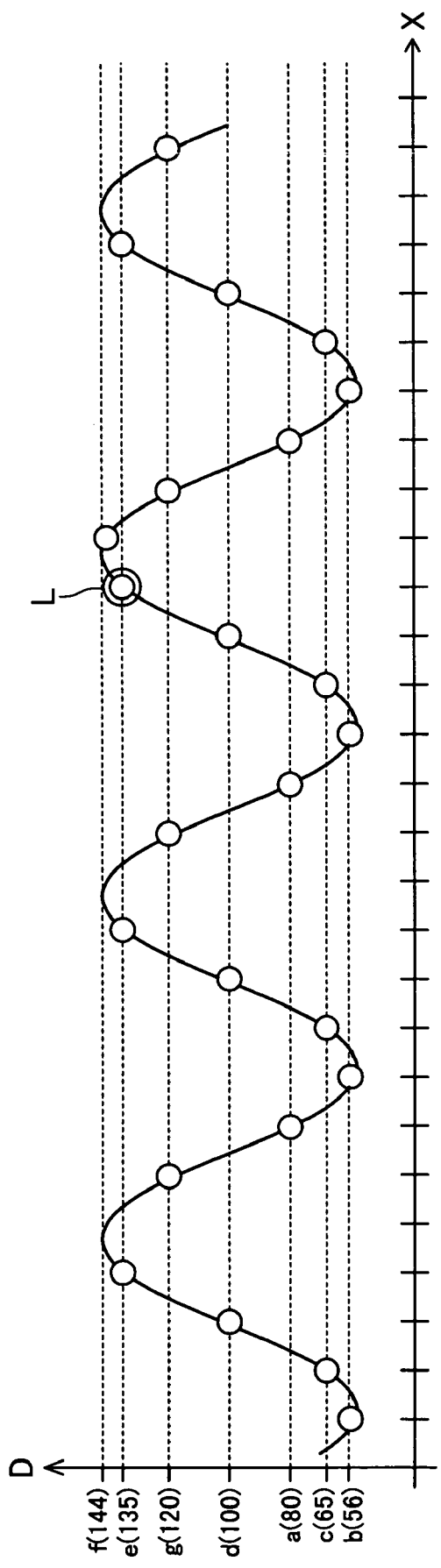
FIG. 41(a) is a waveform diagram showing exemplary pixel data processed in the pixel interpolation circuit in the sixth embodiment.
Figure 41B:
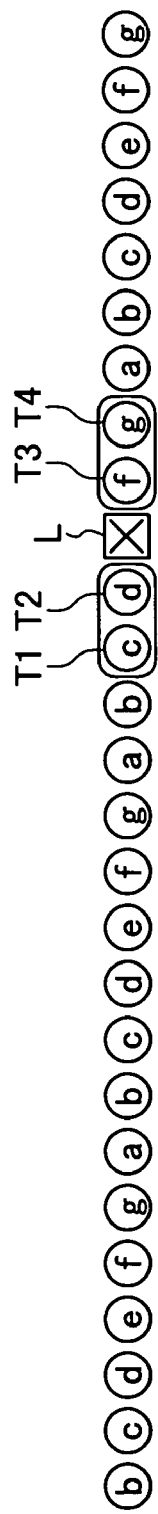
FIG. 41(b) shows a missing pixel and neighboring test pixels.

FIGS. 41(*a*) and 41(*b*) show exemplary periodic image data. FIG. 41(*a*) illustrates image data with a pixel period of seven (Pp=7) that repeat the intensity values 80, 56, 65, 100, 135, 144, and 120 (a=80, b=56, c=65, d=100, e=135, f=144, g=120). FIG. 41(*b*) illustrates the positional relationship between the missing pixel and the test pixels. Test pixels T1 to T4 corresponding to the missing pixel L are positioned one dimensionally, two pixels each on the left and right of the missing pixel L.

Test interpolation is carried out by the left-right mean interpolation calculation circuit 6(0), the first mean preserving interpolation calculation circuit 6(1), and the second mean preserving interpolation calculation circuit 6(2) with respect to the test pixels T1 to T4 in FIG. 41(*b*) in the same way as illustrated in FIGS. 36(a) to 36(e), 37(a) to 37(e), and 38(a) to 38(e), so a description will be omitted.

FIG. 42 is a table showing the marking data M0 to M2 for test pixels T1 to T4.

The operation of the management circuit 7 will now be described.

The management circuit 7 generates the sum of the values of marking data M0[T1] to M0[T4] for the left-right mean interpolation calculation circuit 6(0) as score data S0. From M0[T1]=13, M0[T2]=4.5, M0[T3]=71, and M0[T4]=8, it follows that the value of score data S0 is:

$$S0 = M0[T1] + M0[T2] + M0[T3] + M0[T4]$$
$$= 13 + 4.5 + 71 + 8$$
$$= 96.5$$

Similarly, the management circuit 7 generates the sum of the values of marking data M1[T1] to M1[T4] as score data S1 for the first mean preserving interpolation calculation circuit 6(1). From M1[T1]=143, M1[T2]=35, M1[T3]=143, and M1[T4]=35, it follows that the value of score data S1 is:

$$S1 = M1[T1] + M1[T2] + M1[T3] + M1[T4]$$
$$= 143 + 35 + 143 + 35$$
$$= 356$$

In the same way, the management circuit 7 generates the sum of the values of marking data M2[T1] to M2[T4] as score data S2 for the second mean preserving interpolation calculation circuit 6(2) From M2[T1]=0, M2[T2]=0, M2[T3]=0, and M2[T4]=0, it follows that the value of score data S2 is:

$$S2 = M2[T1] + M2[T2] + M2[T3] + M2[T4]$$
$$= 0 + 0 + 0 + 0$$
$$= 0$$

FIG. 43 is a table showing score data S0 to S2 for the left-right mean interpolation calculation circuit 6(0), the first mean preserving interpolation calculation circuit 6(1), and the second mean preserving interpolation calculation circuit 6(2).

If the score data of an interpolation calculation circuit have a small value, then the interpolation calculation circuit can interppolate pixels properly in the neighborhood of the missing pixel, and by inference, it can also correctly carry out interpolation for the missing pixel. The management circuit 7 outputs a selection signal C so as to select the interpolation data output by the second mean preserving interpolation calculation circuit 6(2) having the score data with the smallest value (S2=0) among score data S0 to S2.

The output circuit 5 outputs the value of interpolation data D2 (D2=135) according to the selection signal C output by the management circuit 7. As shown in FIG. 41(a), the original data value of the missing pixel L is 135; missing pixel interpolation is thus carried out with minimum error.

The pixel interpolation circuit with the configuration in FIG. 33 generates test interpolation data for the three interpolation calculation circuits with respect to test pixels T1 to T4 in the neighborhood of the missing pixel L, then marks and evaluates the test interpolation data to select the one of the three interpolation calculation circuits most suitable for the image content, and is accordingly able to carry out missing pixel interpolation correctly for the data in FIG. 41(a).

Another example of missing pixel interpolation by the pixel interpolation circuit with the configuration in FIG. 33 for different image data will now be described.

Figure 44A:
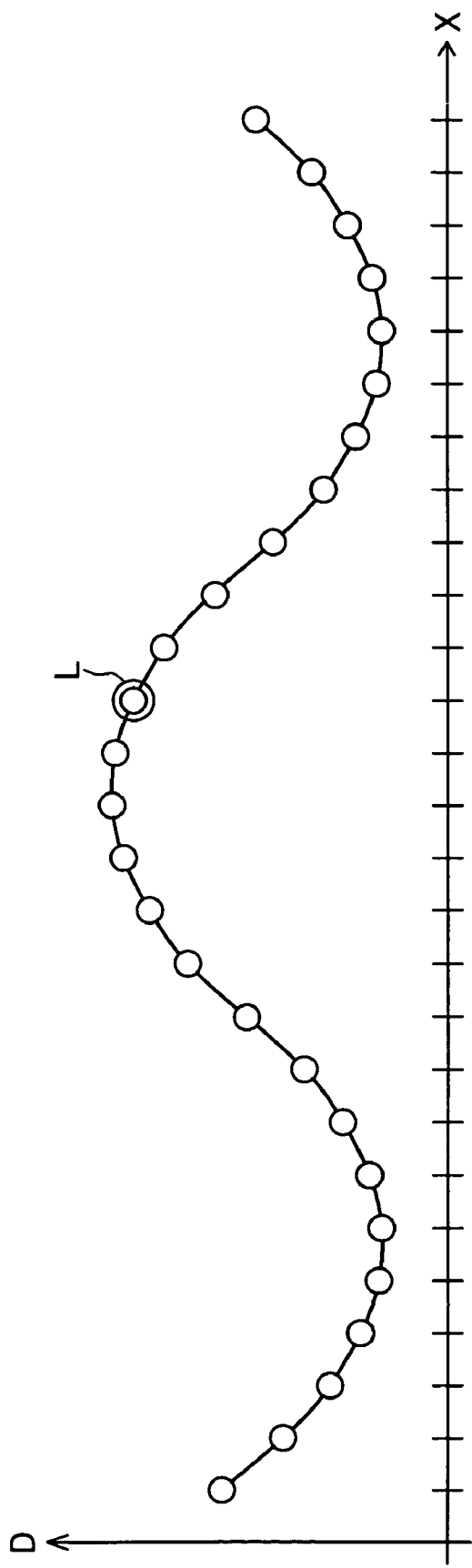
FIG. 44(a) is a waveform diagram showing exemplary pixel data processed in the pixel interpolation circuit in the sixth embodiment.
Figure 44B:
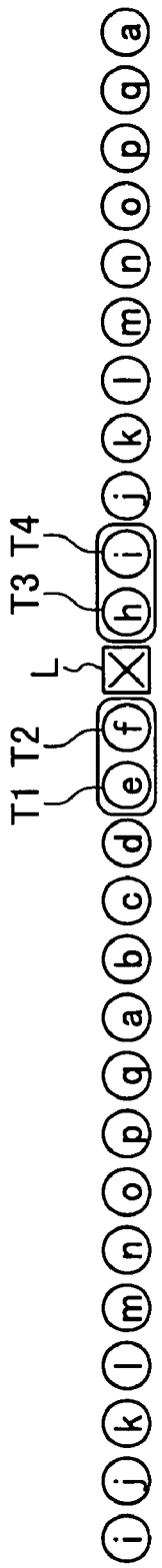
FIG. 44(b) shows a missing pixel and neighboring test pixels.

FIGS. 44(a) and 44(b) show exemplary periodic image data. FIG. 44(a) illustrates image data with a pixel period of seventeen (Pp=17) that repeat the intensity values 100, 116, 130, 140, 145, 143, 136, 124, 108, 92, 76, 64, 57, 55, 60, 70, and 84 (a=100, b=116, c=130, d=140, e=145, f=143, g=136, h=124, i=108, j=92, k=76, l=64, m=57, n=55, o=60, p=70, q=84). FIG. 44(b) illustrates the positional relationship between the missing pixel and the test pixels. Test pixels T1 to T4 corresponding to the missing pixel L are positioned one dimensionally, two pixels each on the left and right of the missing pixel L.

Test interpolation is carried out by the left-right mean interpolation calculation circuit 6(0), the first mean preserving interpolation calculation circuit 6(1), and the second mean preserving interpolation calculation circuit 6(2) with respect to the test pixels T1 to T4 in FIG. 44(b) in the same way as illustrated in FIGS. 36(a) to 36(e), 37(a) to 37(e), and 38(a) to 38(e), so a description will be omitted.

Figures 45, 46, 47:
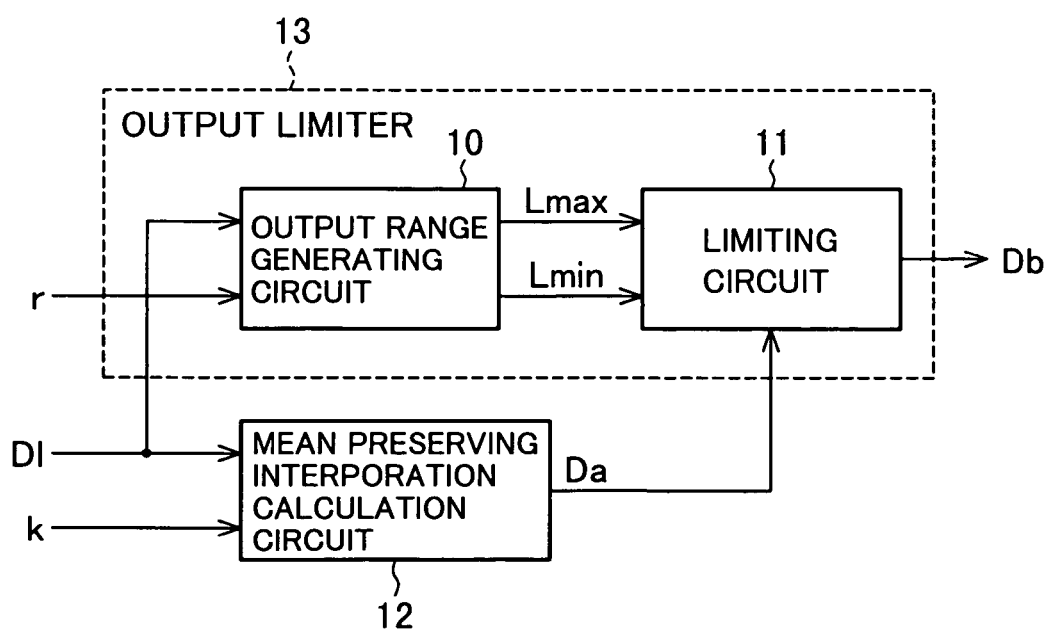
FIG. 45 is a table showing evaluation results for the interpolation calculation circuits when a plurality of test pixels are interpolated in the pixel interpolation circuit in the sixth embodiment.
FIG. 46 is a table showing summarized evaluation results for the interpolation calculation circuits in the pixel interpolation circuit in the sixth embodiment.
FIG. 47 is a block diagram showing the structure of an interpolation calculation circuit according to a seventh embodiment.

FIG. 45 is a table showing the marking data M0 to M2 for test pixels T1 to T4.

The operation of the management circuit 7 will now be described.

The management circuit 7 generates the sum of the values of marking data M0[T1] to M0[T4] for the left-right mean interpolation calculation circuit 6(0) as score data S0. From M0[T1]=3.5, M0[T2]=8.5, M0[T3]=1.5, and MO[T4]=0, it follows that the value of score data S0 is:

$$S0 = M0[T1] + M0[T2] + M0[T3] + M0[T4]$$
$$= 3.5 + 8.5 + 1.5 + 0$$
$$= 13.5$$

Similarly, the management circuit 7 generates the sum of the values of marking data M1[T1] to M1[T4] as score data S1 for the first mean preserving interpolation calculation circuit 6(1). From M1[T1]=91, M1[T2]=152, M1[T3]=91, and M2[T4]=152, it follows that the value of score data S1 is:

$$S1 = M1[T1] + M1[T2] + M1[T3] + M1[T4]$$
$$= 91 + 152 + 91 + 152$$
$$= 486$$

In the same way, the management circuit 7 generates the sum of the values of marking data M2[T1] to M2[T4] as score data S2 for the second mean preserving interpolation calculation circuit 6(2). From M2[T1]=191, M2[T2]=269, M2[T3]=86, and M2[T4]=191, it follows that the value of score data S2 is:

$$S2 = M2[T1] + M2[T2] + M2[T3] + M2[T4]$$
$$= 191 + 269 + 86 + 191$$
$$= 737$$

FIG. 46 is a table showing score data S0 to S2 for the left-right mean interpolation calculation circuit 6(0), the first mean preserving interpolation calculation circuit 6(1), and the second mean preserving interpolation calculation circuit 6(2).

If the score data of an interpolation calculation circuit have a small value, then the interpolation calculation circuit can interppolate pixels properly in the neighborhood of the missing pixel, and by inference, it can also correctly carry out interpolation for the missing pixel. The management circuit 7 outputs a selection signal C so as to select the interpolation data output by the left-right mean interpolation calculation circuit 6(0) having the score data with the smallest value (S0=13.5) among score data S0 to S2.

The output circuit 5 outputs the value of interpolation data D0 (D0=133.5) according to the selection signal C output by the management circuit 7. The original data value of the missing pixel L shown in FIG. 44(*a*) is 136; missing pixel interpolation is thus carried out with minimum error.

The pixel interpolation circuit with the configuration in FIG. 33 generates test interpolation data for the three interpolation calculation circuits with respect to test pixels T1 to T4 in the neighborhood of the missing pixel L, then marks and evaluates the test interpolation data to select the one of the three interpolation calculation circuits most suitable for the image content, and is accordingly able to carry out missing pixel interpolation correctly for the data in FIG. 44(*a*).

The selection signal generator 9 consisting of the management circuit 7 and the marking circuit 8 thus generates a selection signal for selecting the interpolation data of the interpolation calculation circuit suitable for the image data, and so interpolation error is minimalized irrespective of the periodicity of the image data.

Because the selection signal generator 9 obtains the interpolation data for the test pixels by using the interpolation calculation circuits (including the incomplete total calculation circuit 19 and the complete total calculation circuit 17, for example) used for obtaining the interpolation data for the missing pixel, evaluation by test pixels can be carried out with no great increase in the circuit size.

The left-right mean interpolation calculation circuit 6(0) may be omitted in the pixel interpolation circuit in FIG. 29. In this case, the mean preserving interpolation calculation circuits 6(1) to 6(n) are evaluated, and one of their outputs is selected.

Seventh Embodiment

FIG. 47 shows the structure of an interpolation calculation circuit according to a seventh embodiment. The interpolation calculation circuit according to the seventh embodiment has the mean preserving interpolation calculation circuit described in the first to the third embodiments and an additional output limiter 13 for limiting the output of the mean preserving interpolation calculation circuit. The output limiter 13, comprising an output range generating circuit 10 and a limiting circuit 11, limits the interpolation error in the mean preserving interpolation calculation circuit due to noise and the like.

Figure 48:
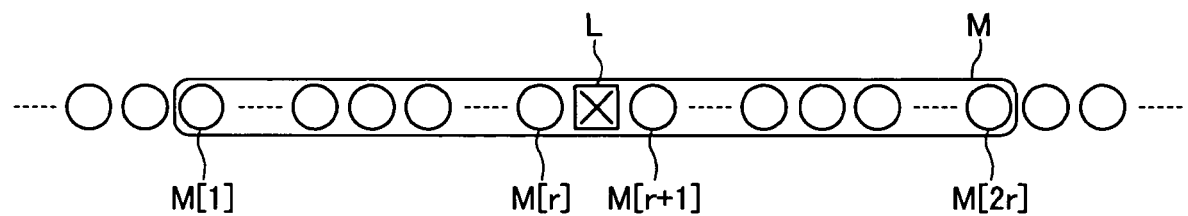
FIG. 48 shows a pixel sequence processed in the interpolation calculation circuit in the seventh embodiment.

FIG. 48 shows a portion of an input image DI and the positional relationship between the missing pixel and the range of reference data.

The structure and operation of the interpolation calculation circuit according to the seventh embodiment will now be described.

The interpolation calculation circuit according to the seventh embodiment has an output range generating circuit 10, a limiting circuit 11, and a mean preserving interpolation calculation circuit 12. The input image DI is input to the output range generating circuit 10 and the mean preserving interpolation calculation circuit 12. A parameter k is input to the mean preserving interpolation calculation circuit 12. The mean preserving interpolation calculation circuit outputs pre-limitation data Da based on the input image DI and the parameter k. The pre-limitation data Da are input to the limiting circuit 11.

Externally provided data that specify the reference data range r are input to the output range generating circuit 10. The output range generating circuit 10 generates a maximum output value Lmax and a minimum output value Lmin based on r pixels on the right and r pixels on the left of a missing pixel in the input image DI. The maximum output value Lmax can be expressed as follows:

$$Lmax=max(M[1], \ldots, M[r], M[r+1], \ldots, M[2r])$$

where $max(M[1], \ldots, M[r], M[r+1], \ldots, M[2r])$ is a function for obtaining the maximum value of pixels $M[1], M[r+1], \ldots, M[2r]$. The maximum output value Lmax is input to the limiting circuit 11.

The minimum output value Lmin can be expressed as follows:

$$Lmin=min(M[1], \ldots, M[r], M[r+1], \ldots, M[2R])$$

where $min(M[1], \ldots, M[r], M[r+1], \ldots, M[2r])$ is a function that obtains the minimum value of pixels $M[1], M[r+1], \ldots, M[2r]$. The minimum output value Lmin is input to the limiting circuit 11.

The limiting circuit 11 limits the value of the pre-limitation data Da based on the maximum output value Lmax and the minimum output value Lmin, and outputs the result as post-limitation data Db. The post-limitation data Db can be represented as follows:

If Da<Lmin then Db=Lmin,
If Lmin≦Da≦Lmax then Db=Da,
If Lmax<Db then Db=Lmax

The interpolation calculation circuit according to the seventh embodiment can limit the output of the mean preserving interpolation calculation circuit to the range of the intensity values of the 2r pixels in the neighborhood of the missing pixel.

A specific example will be described below.

Figure 49:
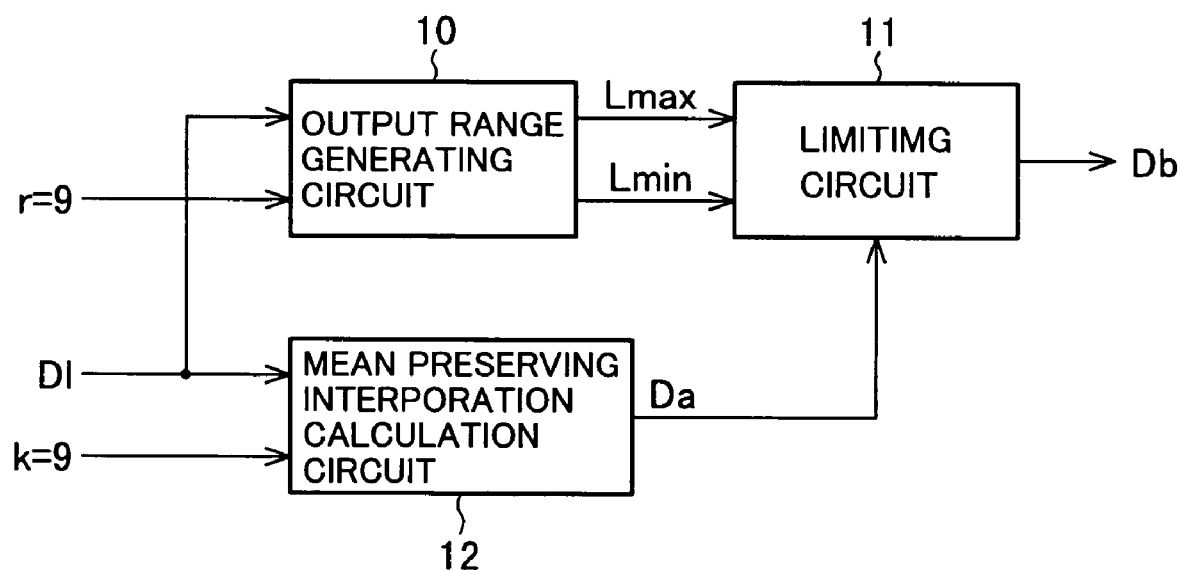
FIG. 49 is another block diagram showing the structure of the interpolation calculation circuit in the seventh embodiment.

FIG. 49 shows an exemplary structure of the interpolation calculation circuit according to the seventh embodiment.

Figure 50:
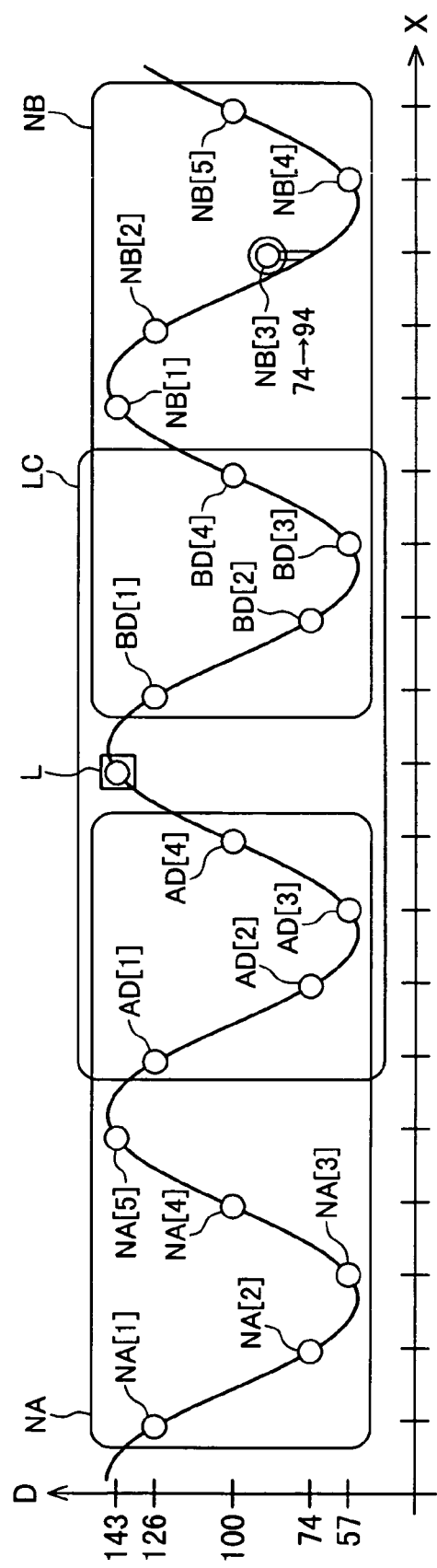
FIG. 50 is a waveform diagram showing exemplary pixel data processed in the interpolation calculation circuit in the seventh embodiment.

FIG. 50 shows image data with a pixel period of five (Pp=5). In FIG. 50, the value of pixel NB[3] is changed from 74 to 94 due to noise.

The structure and operation of the interpolation calculation circuit in FIG. 49 will now be described.

The input image DI is input to the mean preserving interpolation calculation circuit and the output range generating circuit. A parameter k equal to nine (k=9) is input to the mean preserving interpolation calculation circuit 12. The mean preserving interpolation calculation circuit 12 obtains interpolation data for the missing pixel L such that the mean value of the pixel sequence LC including the missing pixel is equal to the mean value of the two pixel sequences NA and NB not including the missing pixel. The equation is:

$$(AD[1]+AD[2]+AD[3]+AD[4]+L+BD[1]+BD[2]+BD[3]+BD[4])/9 =$$
$$((NA[1]+NA[2]+NA[3]+NA[4]+NA[5]+AD[1]+AD[2]+AD[3]+AD[4])/9+(BD[1]+BD[2]+BD[3]+BD[4]+NB[1]+NB[2]+NB[3]+NB[4]+NB[5])/9)/2$$

Therefore, the value of the missing pixel L is:

$$L = ((NA[1]+NA[2]+NA[3]+NA[4]+NA[5]+AD[1]+AD[2]+AD[3]+AD[4])+(BD[1]+BD[2]+BD[3]+BD[4]+NB[1]+NB[2]+NB[3]+NB[4]+NB[5]))/2-$$
$$(AD[1]+AD[2]+AD[3]+AD[4]+L+BD[1]+BD[2]+BD[3]+BD[4])$$

From $NA[1] = 126$, $NA[2] = 74$, $NA[3] = 57$, $NA[4] = 100$,
$NA[5] = 143$, $AD[1] = 126$, $AD[2] = 74$, $AD[3] = 57$, $AD[4] = 100$,
$BD[1] = 126$, $BD[2] = 74$, $BD[3] = 57$, $BD[4] = 100$, $NB[1] = 143$,
$NB[2] = 126$, $NB[3] = 94$, $NB[4]57$, and $NB[5] = 100$, follows that:

$$L = ((126+74+57+100+143+126+74+57+100)+$$
$$(126+74+57+100+143+126+94+57+100))/2-$$
$$(126+74+57+100+126+74+57+100) = 153$$

The value of the interpolation data for the missing pixel L is taken as the value of pre-limitation data Da. The pre-limitation data Da are input to the limiting circuit 11.

A reference data range r equal to nine (r=9) is input to the output range generating circuit. The output range generating circuit 10 outputs the maximum value of the nine pixels on the right and nine pixels on the left of the missing pixel L in the input image DI as the maximum output value Lmax. The maximum output value Lmax is:

Lmax=143

The maximum output value Lmax is input to the limiting circuit.

The output range generating circuit 10 outputs the minimum value of the nine pixels on the right and nine pixels on the left of the missing pixel L in the input image DI as the minimum output value Lmin. The minimum output value Lmin is:

Lmin=57

The minimum output value Lmin is input to the limiting circuit 11.

The limiting circuit 11 corrects and limits the value of the pre-limitation data Da based on the maximum output value Lmax and the minimum output value Lmin, and outputs the result as post-limitation data Db. From Da=153, Lmax=143, and Lmin=57, it follows that:

Lmax<Da

Therefore, the value of post-limitation data Db is:

Db=Lmax=143

As shown in FIG. 50, the original data value of the missing pixel L is 143, so the post-limitation data Db are free of error (|143−143|=0), whereas the pre-limitation data Da are in error by |153−143|=10. Limiting the output range of the mean preserving interpolation calculation circuit thus reduces the interpolation error.

Eighth Embodiment

Although the interpolation calculation circuits that carry out missing-pixel interpolation by mean preserving interpolation calculations are described in the first to third embodiments as hardware structures, it is also possible to carry out the missing-pixel interpolation using software, or by a combination of software and hardware.

Figure 51:
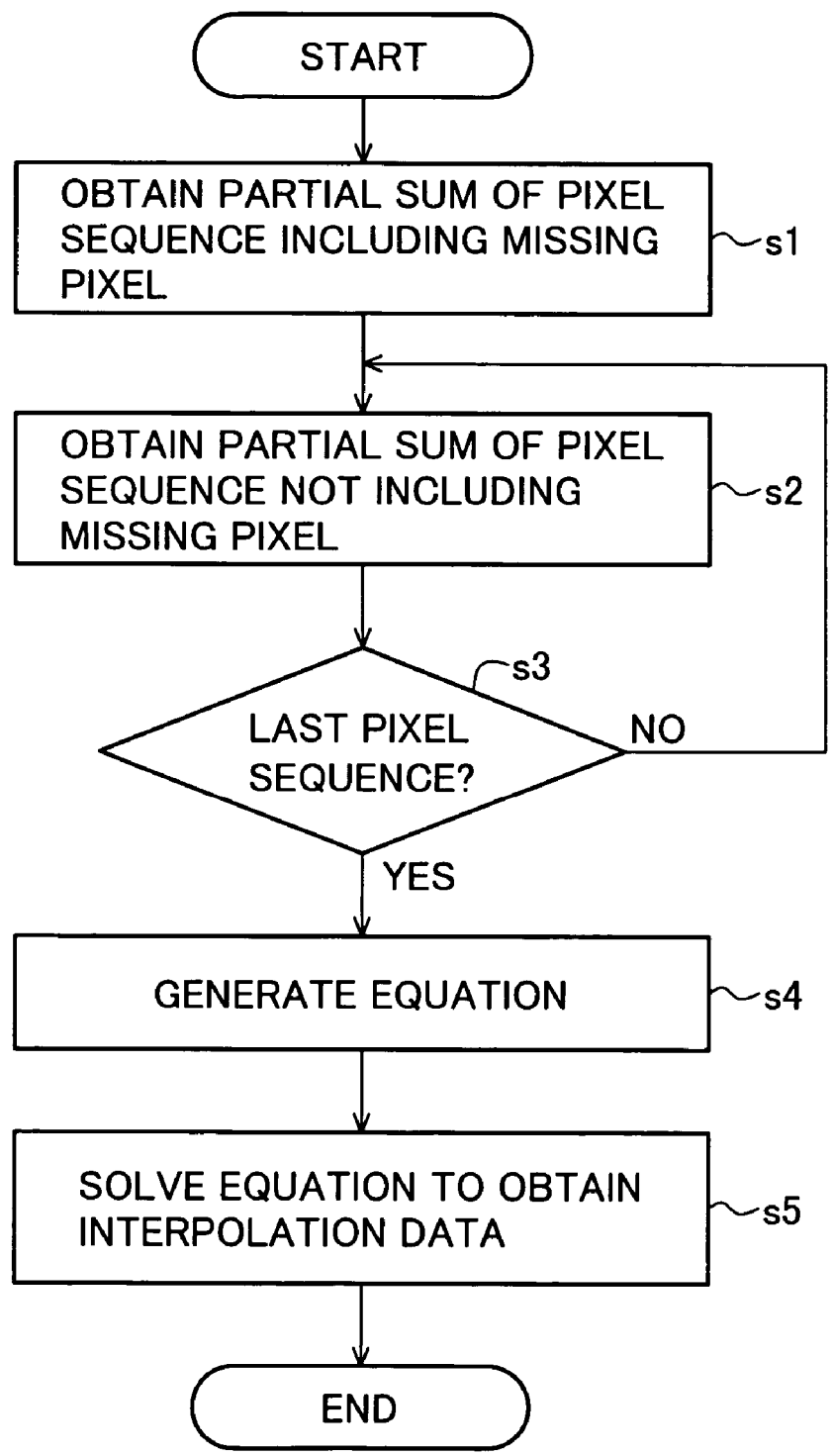
FIG. 51 is a flowchart illustrating a processing procedure in a pixel interpolation method according to an eighth embodiment.

FIG. 51 is a flowchart illustrating missing-pixel interpolation using software (an interpolation calculation method).

The steps in the flowchart will be described with reference to FIG. 2.

In step s1, partial sum data (corresponding to SL in the first embodiment) of the pixel sequence LC including the missing pixel are generated.

In step s2, partial sum data (corresponding to SA in the first embodiment) of the pixel sequence NA not including the missing pixel are generated.

When there are a plurality of pixel sequences not including the missing pixel as shown in FIG. 13, step s2 is repeated to generate partial sum data for each pixel sequence (step s3).

In step s4, an equation that makes the mean value of the pixel sequence including the missing pixel equal to the mean value of the pixel sequence not including the missing pixel is generated based on the partial sum data (corresponding to SA) generated in step s1 and the partial sum data (corresponding to SL) generated in step s2.

In step s5, the equation generated in step s4 is solved (for example, by subtracting the value of the data corresponding to SL from the value of the data corresponding to SA) to obtain the interpolation data for the missing pixel.

The processes in each step have been described in detail in the first to third embodiments, so a further description will be omitted.

Ninth Embodiment

Although the pixel interpolation circuit that carries out missing-pixel interpolation by performing mean preserving interpolation calculations in combination with an adjacent pixel mean interpolation calculation is described in the sixth embodiment as a hardware structure, it is also possible to carry out the missing-pixel interpolation using software, or by a combination of software and hardware.

Figure 52:
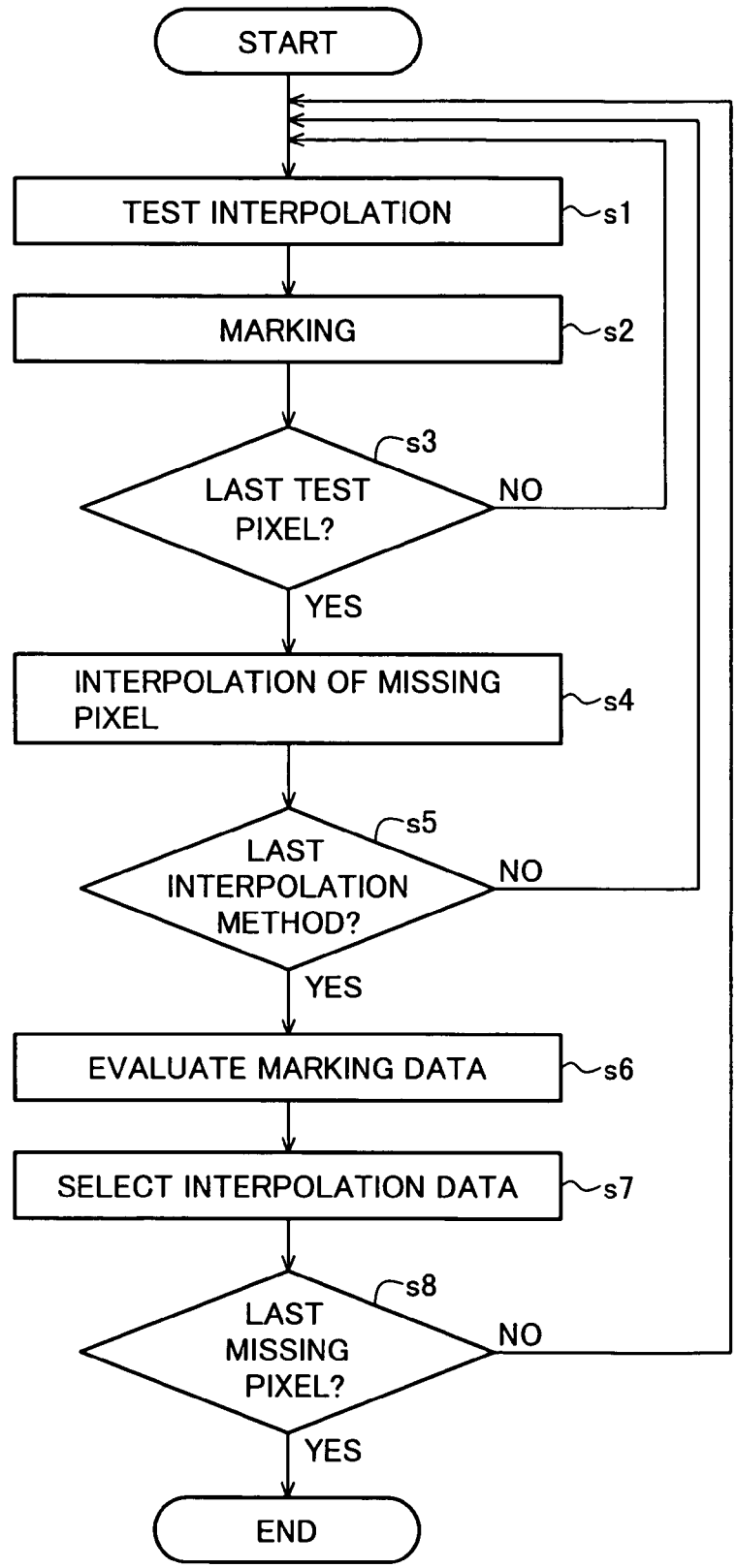
FIG. 52 is a flowchart illustrating a processing procedure in a pixel interpolation method according to a ninth embodiment.

FIG. 52 is a flowchart illustrating missing-pixel interpolation using software (a pixel interpolation method).

The steps in the flowchart will be described with reference to FIG. 30(a).

In step s1, test interpolation data for test pixel T1 (corresponding to TD0[T1] in the sixth embodiment) are generated using the adjacent pixel mean interpolation calculation method.

In step s2, marking data (corresponding to M0[T1] in the sixth embodiment) are generated by taking the absolute value of the difference between the value of the input image data DI at the location of test pixel T1 (corresponding to DI[T1] in the sixth embodiment) and the value of the test interpolation data generated in step s1.

Next, step s1 is repeated to generate test interpolation data for test pixel T2 (corresponding to TDO[T2] in the sixth embodiment) using the adjacent pixel mean interpolation calculation method.

In step s2, marking data (corresponding to M0[T2] in the sixth embodiment) are generated by taking the absolute value of the difference between the value of the input image data DI at the location of test pixel T2 (corresponding to DI[T2] in the sixth embodiment) and the value of the test interpolation data generated in step s1.

Similarly, the procedure in steps s1 and s2 is repeated for test pixels T3 to Tm (step s3). Marking data for all test pixels T1 to Tm are thus obtained using the adjacent pixel mean interpolation calculation method.

In step s4, interpolation data for the missing pixel L are generated using the adjacent pixel mean interpolation calculation method.

Next, step s1 is repeated to generate test interpolation data for test pixel T1 (corresponding to TD1[T1] in the sixth embodiment) using the first mean preserving interpolation calculation method.

In step s2, marking data (corresponding to M1[T1] in the sixth embodiment) are generated by taking the absolute value of the difference between the value of the input image data DI at the location of test pixel T1 (corresponding to DI[T1] in the sixth embodiment) and the value of the test interpolation data generated in step s1.

Next, step s1 is repeated to generate test interpolation data for test pixel T2 (corresponding to TD1[T2] in the sixth embodiment) using the first mean preserving interpolation calculation method.

In step s2, marking data (corresponding to M1[T2] in the sixth embodiment) are generated by taking the absolute value of the difference between the value of the input image data DI at the location of test pixel T2 (corresponding to DI[T2] in the sixth embodiment) and the value of the test interpolation data generated in step s1.

Similarly, the procedure in steps s1 and s2 is repeated for test pixels T3 to Tm (step s3). Marking data for all test pixels T1 to Tm are thus obtained using the first mean preserving interpolation calculation method.

In step s4, interpolation data for the missing pixel L are generated using the first mean preserving interpolation calculation method.

The procedure in steps s1 to s4 is repeated in the same way using the second mean preserving interpolation calculation method to the nth mean preserving interpolation calculation method (step s5). Marking data for all test pixels T1 to Tm and the interpolation data for the missing pixel L are obtained using the adjacent pixel mean interpolation calculation method and each of the first to nth mean preserving interpolation calculation methods.

In step s6, scoring data for the adjacent pixel mean interpolation calculation method and each of the first to nth mean preserving interpolation calculation methods (corresponding to S0 to Sn in the sixth embodiment) are generated by adding up the marking data for each interpolation calculation method.

In step s7, the interpolation data for interpolating the missing pixel are selected based on the scoring data generated in step s6.

The procedure in the above steps s1 to s7 is repeated until all missing pixels have been processed (step s8).

The processes in each step have been described in detail in the sixth embodiment, so a description will be omitted.

Although the pixels are lined up horizontally in each of the embodiments described above and the adjacent pixel mean interpolation calculation is carried out by obtaining the mean of the values of the pixels on the left and right of the missing pixel or test non-missing pixel, if the pixels are lined up vertically, interpolation data are generated by obtaining the mean of the values of the pixels above and below the missing pixel or test non-missing pixel. The generic term 'adjacent pixel mean interpolation calculation' refers to both the horizontal and the vertical interpolation calculations.

What is claimed is:

1. A mean preserving interpolation calculation circuit that obtains interpolation data for a missing pixel such that a mean value of a sequence of pixels constituting a group of pixels including the missing pixel is equal to a mean value of another sequence of pixels constituting a group of pixels not including the missing pixel, wherein the number of pixels constituting the group of pixels including the missing pixel and the number of pixels constituting the group of pixels not including the missing pixel are each k, k being a positive integer.

2. The mean preserving interpolation calculation circuit of claim 1, comprising:

an incomplete total calculation circuit for obtaining a total of values of the pixels other than the missing pixel in the k pixels constituting the group of pixels including the missing pixel;

a complete total calculation circuit for obtaining a total of values of the k pixels constituting the group of pixels not including the missing pixel; and a difference circuit for obtaining interpolation data for the missing pixel by subtracting an output of the complete total calculation circuit from an output of the incomplete total calculation circuit.

3. The mean preserving interpolation calculation circuit of claim 2, wherein the complete total calculation circuit comprises:

a first complete summing circuit for obtaining a sum of values of k pixels constituting a first group of pixels not including the missing pixel;

a second complete summing circuit for obtaining a sum of values of k pixels constituting a second group of pixels not including the missing pixel; and an averaging circuit for obtaining a mean of an output of the first complete summing circuit and an output of the second complete summing circuit.

4. The mean preserving interpolation calculation circuit of claim 2, wherein each said group of pixels constitutes a portion of a periodically varying series of pixels, none of the pixels constituting the group of pixels not including the missing pixel are among the pixels constituting the group of pixels including the missing pixel, and said k is set to a value substantially equal to a period of pixel variation represented by a number of pixels, or to an integer multiple thereof.

5. The mean preserving interpolation calculation circuit of claim 2, wherein each said group of pixels constitutes a portion of a periodically varying series of pixels, i pixels, i being a positive integer in the pixels constituting the group of pixels not including the missing pixel coincide with i pixels in the pixels constituting the group of pixels including the missing pixel, and said k or a value obtained by subtracting said i from said k is set to a value substantially equal to a period of pixel variation represented by a number of pixels, or to an integer multiple thereof.

6. A pixel interpolation circuit comprising: a mean preserving interpolation calculation circuit that obtains interpolation data for a missing pixel such that a mean value of a sequence of pixels constituting a group of pixels including the missing pixel is equal to a mean value of another sequence of pixels constituting a group of pixels not including the missing pixel, wherein the number of pixels constituting the group of pixels including the missing pixel and the number of pixels constituting the group of pixels not including the missing pixel are each k, k being a positive integer; and a circuit using maximum and minimum values of pixels in a neighborhood of the missing pixel to limit the output range of the interpolation data obtained by the mean preserving interpolation calculation circuit.

7. A pixel interpolation circuit comprising: a plurality of mean preserving interpolation calculation circuits each obtaining interpolation data for a missing pixel such that a mean value of a sequence of pixels constituting a group of pixels including the missing pixel is equal to a mean value of another sequence of pixels constituting a group of pixels not including the missing pixel, wherein the number of pixels constituting the group of pixels including the missing pixel and the number of pixels constituting the group of pixels not including the missing pixel are each k, k being a positive integer, wherein each of the plurality of mean preserving interpolation calculation circuits comprises;
   an incomplete total calculation circuit for obtaining a total of values of the pixels other than the missing pixel in the k pixels constituting the group of pixels including the missing pixel;
   a complete total calculation circuit for obtaining a total of values of the k pixels constituting the group of pixels not including the missing pixel; and
   a difference circuit for obtaining interpolation data for the missing pixel by subtracting an output of the complete total calculation circuit from an output of the incomplete total calculation circuit, wherein
   each said group of pixels constitutes a portion of a periodically varying series of pixels, i pixels, i being a positive integer, in the pixels constituting the group of pixels not including the missing pixel coincide with i pixels in the pixels constituting the group of pixels including the missing pixel, and said k or a value obtained by subtracting said i from said k is set to a value substantially equal to a period of pixel variation represented by a number of pixels, or to an integer multiple thereof, and wherein each of the mean preserving interpolation calculation circuits have different values of said k or (k−i), and wherein the pixel interpolation circuit further comprising an output circuit, the plurality of mean preserving interpolation calculation circuits generating respective interpolation data for the missing pixel, the output circuit selecting one of the interpolation data output by the plurality of mean preserving interpolation calculation circuits and outputting the selected data as the interpolation data for the missing pixel.

8. The pixel interpolation circuit of claim 7, further comprising an adjacent pixel mean interpolation calculation circuit for generating the mean value of pixels adjacent to the missing pixel as interpolation data, wherein
   the output circuit selects one of the interpolation data output by the plurality of mean preserving interpolation calculation circuits and the adjacent pixel mean interpolation calculation circuit and outputs the selected data as the interpolation data for the missing pixel.

9. The pixel interpolation circuit of claim 8, further comprising a selection signal generator generating a selection signal for selecting one of the data from the plurality of mean preserving interpolation calculation circuits and the adjacent pixel mean interpolation calculation circuit based on original data of a pixel in a neighborhood of the missing pixel and interpolation data obtained for the pixel in the neighborhood of the missing pixel by methods identical to the methods by which the interpolation data for the missing pixel are obtained.

10. The pixel interpolation circuit of claim 9, further comprising:
   a control circuit causing
   the incomplete total calculation circuit in each of the plurality of mean preserving interpolation calculation circuits to receive pixels, other than a test non-missing pixel in a neighborhood of the missing pixel, in k pixels constituting a group of pixels including the test non-missing pixel, and obtain a total sum of their values,
   the complete total calculation circuit in each of the plurality of mean preserving interpolation calculation circuits to receive k pixels constituting a group of pixels not including the test non-missing pixel and obtain a sum of their values,
   the difference circuit in each of the plurality of mean preserving interpolation calculation circuits to obtain interpolation data for the test non-missing pixel by subtracting an output of the incomplete total calculation circuit from an output of the complete total calculation circuit, and
   the adjacent pixel mean interpolation calculation circuit to receive pixels adjacent to a test non-missing pixel disposed in a neighborhood of the missing pixel, the test non-missing pixel being non-adjacent to the missing pixel, and output their mean value as interpolation data for the test non-missing pixel,
   wherein,
   the selection signal generator evaluates each of the plurality of mean preserving interpolation calculation circuits and the adjacent pixel mean interpolation calculation circuit, based on the interpolation data obtained by each of the mean preserving interpolation circuits and the adjacent pixel mean interpolation calculation circuit for the test non-missing pixel and original data of the test non-missing pixel, and determines content of the selection signal so as to select one of the mean preserving interpolation calculation circuits and the adjacent pixel mean interpolation calculation circuit receiving the best evaluation, and
   the control circuit causes the incomplete total calculation circuit in each of the plurality of mean preserving interpolation calculation circuits to receive the pixels constituting the group of pixels including the missing pixel, causes the complete total calculation circuit in each of the plurality of mean preserving interpolation calculation circuits to receive the pixels constituting the group of pixels not including the missing pixel, causes the adjacent pixel mean interpolation calculation circuit to receive the pixels adjacent to the missing pixel, and causes the output circuit to select and output the interpolation data from one of the mean preserving interpolation calculation circuits and the adjacent pixel interpolation calculation circuit according to the selection signal with content determined as above.

11. The pixel interpolation circuit of claim 7, further comprising a selection signal generator generating a selection signal for selecting one of the data from the plurality of mean preserving interpolation calculation circuits based on original data of a pixel in a neighborhood of the missing pixel and interpolation data obtained for the pixel in the neighborhood of the missing pixel by methods identical to the methods by which the interpolation data for the missing pixel are obtained.

12. The pixel interpolation circuit of claim 11, further comprising:
a control circuit causing
the incomplete total calculation circuit in each of the plurality of mean preserving interpolation calculation circuits to receive pixels, other than a test non-missing pixel in a neighborhood of the missing pixel, in k pixels constituting a group of pixels including the test non-missing pixel, and obtain a total sum of their values,
the complete total calculation circuit in each of the plurality of mean preserving interpolation calculation circuits to receive k pixels constituting a group of pixels not including the test non-missing pixel and obtain a sum of their values, and
the difference circuit in each of the plurality of mean preserving interpolation calculation circuits to obtain interpolation data for the test non-missing pixel by subtracting an output of the incomplete total calculation circuit from an output of the complete total calculation circuit,
wherein,
the selection signal generator evaluates each of the plurality of mean preserving interpolation calculation circuits, based on the interpolation data obtained by each of the mean preserving interpolation calculation circuits for the test non-missing pixel and original data of the test non-missing pixel, and determines content of the selection signal so as to select the mean preserving interpolation calculation circuit receiving the best evaluation, and
the control circuit causes the incomplete total calculation circuit in each of the plurality of mean preserving interpolation calculation circuits to receive the pixels constituting the group of pixels including the missing pixel, causes the complete total calculation circuit in each of the plurality of mean preserving interpolation calculation circuits to receive the pixels constituting the group of pixels not including the missing pixel, and causes the output circuit to select and output the interpolation data from one of the mean preserving interpolation calculation circuits according to the selection signal with content determined as above.

13. A mean preserving interpolation calculation method that obtains interpolation data for a missing pixel such that a mean value of a sequence of pixels constituting a group of pixels including the missing pixel is equal to a mean value of another sequence of pixels constituting a group of pixels not including the missing pixel, wherein the number of pixels constituting the group of pixels including the missing pixel and the number of pixels constituting the group of pixels not including the missing pixel are each k, k being a positive integer.

14. The mean preserving interpolation calculation method of claim 13, comprising:
an incomplete total calculation step for obtaining a total of values of the pixels other than the missing pixel in the k pixels constituting the group of pixels including the missing pixel;
a complete total calculation step for obtaining a total of values of the k pixels constituting the group of pixels not including the missing pixel; and
a difference step for obtaining interpolation data for the missing pixel by subtracting an output of the complete total calculation step from an output of the incomplete total calculation step.

15. The mean preserving interpolation calculation method of claim 13, wherein the complete total calculation step comprises:
a first complete summing step for obtaining a sum of values of k pixels constituting a first group of pixels not including the missing pixel;
a second complete summing step for obtaining a sum of values of k pixels constituting a second group of pixels not including the missing pixel; and
an averaging step for obtaining a mean of an addition result of the first complete summing step and an addition result of the second complete summing step.

16. The mean preserving interpolation calculation method of claim 14, wherein
each said group of pixels constitutes a portion of a periodically varying series of pixels, none of the pixels constituting the group of pixels not including the missing pixel are among the pixels constituting the group of pixels including the missing pixel, and said k is set to a value substantially equal to a period of pixel variation represented by a number of pixels, or to an integer multiple thereof.

17. The mean preserving interpolation calculation method of claim 14, wherein each said group of pixels constitutes a portion of a periodically varying series of pixels i pixels, i being a positive integer in the pixels constituting the group of pixels not including the missing pixel coincide with i pixels in the pixels constituting the group of pixels including the missing pixel, and said k or a value obtained by subtracting said i from said k is set to a value substantially equal to a period of pixel variation represented by a number of pixels, or to an integer multiple thereof.

18. A pixel interpolation method comprising: a mean preserving interpolation calculation step that obtains interpolation data for a missing pixel such that a mean value of a sequence of pixels constituting a group of pixels including the missing pixel is equal to a mean value of another sequence of pixels constituting a group of pixels not including the missing pixel, wherein the number of pixels constituting the group of pixels including the missing pixel and the number of pixels constituting the group of pixels not including the missing pixel are each k, k being a positive integer; and a step of using maximum and minimum values of pixels in a neighborhood of the missing pixel to limit the output range of the interpolation data obtained by the mean preserving interpolation calculation step.

19. A pixel interpolation method comprising:
a plurality of mean preserving interpolation calculation steps each obtaining interpolation data for a missing pixel such that a mean value of a sequence of pixels constituting a group of pixels including the missing pixel is equal to a mean value of another sequence of pixels constituting a group of pixels not including the missing pixel, wherein the number of pixels constituting the group of pixels including the missing pixel and the number of pixels constituting the group of pixels not including the missing pixel are each k, k being a positive integer: wherein each of the mean preserving interpolation calculation steps comprises: an incomplete total calculation step for obtaining a total of values of the pixels other than the missing pixel in the k pixels constituting the group of pixels including the missing pixel; a complete total calculation step for obtaining a total of values of the k pixels constituting the group of pixels not including the missing pixel; and a difference step for obtaining interpolation data for the missing pixel by subtracting an output of the complete total calculation step from an output of the incomplete total calculation step, wherein each said group of pixels constitutes a portion of a periodically varying series of pixels, i pixels, i being a positive integer, in the pixels constituting the group of pixels not including the missing pixel coincide with i pixels in the pixels constituting the group of pixels including the missing pixel, and said k or a value obtained by subtracting said i from said k is set to a value substantially equal to a period of pixel variation represented by a number of pixels, or to an integer multiple thereof: and wherein each of the mean preserving interpolation calculation step is performed with different values of said k or (k−i), each time generating interpolation data for the missing pixel, and the output step selects one of the interpolation data output by the plurality of mean preserving interpolation calculation steps and outputs the selected data as the interpolation data for the missing pixel.

20. The interpolation method of claim 19, further comprising an adjacent pixel mean interpolation calculation step for generating the mean value of pixels adjacent to the missing pixel as interpolation data, wherein the output step selects one of the interpolation data output in the plurality of mean preserving interpolation calculation steps and the adjacent pixel mean interpolation calculation step and outputs the selected data as the interpolation data for the missing pixel.

* * * * *